United States Patent [19]
Kimoto et al.

[11] Patent Number: 5,434,883
[45] Date of Patent: Jul. 18, 1995

[54] ADAPTIVE EQUALIZERS

[75] Inventors: Takashi Kimoto; Yoshinori Yaginuma; Kazuo Asakawa; Shigemi Nagata, all of Kawasaki, Japan

[73] Assignee: Fujitsu Limited, Kawasaki, Japan

[21] Appl. No.: 824,604

[22] Filed: Jan. 23, 1992

[30] Foreign Application Priority Data

Jan. 23, 1991 [JP] Japan .................. 3-006272
Feb. 14, 1991 [JP] Japan .................. 3-021005

[51] Int. Cl.⁶ .................................. H03H 7/30
[52] U.S. Cl. .................... 375/231; 375/232; 333/18
[58] Field of Search ............ 375/12, 13, 14; 333/18, 333/28 R; 364/724.19, 724.2; 395/2.11

[56] References Cited

U.S. PATENT DOCUMENTS

| | | | |
|---|---|---|---|
| 4,430,743 | 2/1984 | Watanabe | 375/13 |
| 4,868,850 | 9/1989 | Kaku et al. | 375/13 |
| 5,127,051 | 6/1992 | Chan et al. | 375/13 X |

FOREIGN PATENT DOCUMENTS 0052362 5/1982 European Pat. Off. .
0454445 10/1991 European Pat. Off. .

OTHER PUBLICATIONS

Shahid Qureshi, "Adaptive Equalization", *IEEE Communications Magazine*, vol. 20, No. 2, pp. 9–16, Mar. 1982, New York, USA.

Gavin J. Gibson et al., "Multilayer Perceptron Structures Applied to Adaptive Equalisers for Data Communications", *IEEE International Conference on Acoustic, Speech and Signal Processing*, Glasgow, vol. 2, pp. 1183–1186, May 1989.

S. Siu et al., "Decision Feedback Equalisation using neural Network Structures and Performance Comparison With Standard Architecture", *IEE Proceedings I. Solid–State and Electronic Devices*, vol. 137, No. 4, Part I, 221–225, Aug. 1990, Great Britain.

Sheng-De Wang et al., "Self–Adaptive Neural Architectures for Control Apparatus", *International Joint Conference on Neural Networks*, vol. 3, pp. 309–314, Jun. 17, 1990, San Diego, Calif., USA.

Dan Haesloop et al., "A Neural Network Structure For System Identification", *Proceedings of the 1990 American Control Conference*, vol. 3, pp. 2460–2465, May 23, 1990, San Diego, Calif., USA.

*Patent Abstracts of Japan*, vol. 14, No. 413 (E-974), Sep. 6, 1990 (JP 2156786).

*Patent Abstracts of Japan*, vol. 4, No. 104 (E-19), Jul. 25, 1980, (JP 55-064,447).

Primary Examiner—Stephen Chin
Assistant Examiner—Tesfaldet Bocure
Attorney, Agent, or Firm—Staas & Halsey

[57] ABSTRACT

An adaptive equalizer detects characteristics of a transmission line in radio and cable communications and equalizes received signals by using the detected results. Equalization is for not only linear distortion but also nonlinear distortion in accordance with variation of characteristics of the transmission line. The adaptive equalizer includes a characteristic detection unit 11 for detecting real part and imaginary parts of a transfer function by using an output signal corresponding to an input signal of an object to be equalized to compensate for deterioration, for example a transmission line; and an equalizing unit 12 for equalizing an output signal of the object to be equalized 10 in accordance with an unknown input signal by using the detected result of the characteristic detection unit 11.

33 Claims, 63 Drawing Sheets

| ρ | | 0 | 0.4 | 0.8 | |
|---|---|---|---|---|---|
| φ' | | 0 | $\frac{\pi}{2}$ | π | 3/2*π |
| τ' | | 0 | 0.4T | 0.8T | |

T: ONE PERIOD OF DIGITAL SIGNAL

Fig. 16

| | INPUT SIGNAL | | | | | | | | | | | | | | | | | | | | | | | | | | | | | | | TEACHER SIGNAL | |
|---|---|---|---|---|---|---|---|---|---|---|---|---|---|---|---|---|---|---|---|---|---|---|---|---|---|---|---|---|---|---|---|---|---|
| | IDEAL SIGNAL (I) | | | | | | | | DEMODULATED SIGNAL (I) | | | | | | | | IDEAL SIGNAL (Q) | | | | | | | | DEMODULATED SIGNAL (Q) | | | | | | | | X | Y |
| 1 | 0 | 0 | 0 | 0 | 1 | 1 | 1 | 1 | 0.80 | 0.78 | 0.67 | 0.46 | 0.22 | 0.09 | 0.13 | 0.38 | 0 | 0 | 0 | 0 | 0 | 0 | 0 | 0 | 0.59 | 0.63 | 0.74 | 0.79 | 0.64 | 0.51 | 0.54 | 0.57 | 0.25 | 0.50 |
| 2 | 0 | 0 | 1 | 1 | 1 | 1 | 1 | 0 | 0.78 | 0.67 | 0.46 | 0.22 | 0.09 | 0.13 | 0.38 | 0.62 | 0 | 0 | 0 | 0 | 0 | 0 | 0 | 1 | 0.63 | 0.74 | 0.79 | 0.64 | 0.51 | 0.54 | 0.57 | 0.34 | 0.25 | 0.50 |
| 3 | 0 | 0 | 1 | 1 | 1 | 1 | 0 | 0 | 0.67 | 0.46 | 0.22 | 0.09 | 0.13 | 0.38 | 0.62 | 0.58 | 0 | 0 | 0 | 0 | 0 | 0 | 1 | 1 | 0.74 | 0.79 | 0.64 | 0.51 | 0.54 | 0.57 | 0.34 | 0.14 | 0.25 | 0.50 |
| 4 | 0 | 1 | 1 | 1 | 1 | 0 | 0 | 0 | 0.46 | 0.22 | 0.09 | 0.13 | 0.38 | 0.62 | 0.58 | 0.51 | 0 | 0 | 0 | 0 | 0 | 1 | 1 | 1 | 0.79 | 0.64 | 0.51 | 0.54 | 0.57 | 0.34 | 0.14 | 0.08 | 0.25 | 0.50 |
| 5 | 0 | 0 | 0 | 0 | 1 | 1 | 1 | 1 | 0.81 | 0.79 | 0.66 | 0.41 | 0.19 | 0.13 | 0.14 | 0.30 | 0 | 0 | 0 | 0 | 0 | 0 | 0 | 0 | 0.59 | 0.62 | 0.75 | 0.77 | 0.58 | 0.45 | 0.45 | 0.39 | 0.20 | 0.50 |
| 6 | 0 | 0 | 1 | 1 | 1 | 1 | 1 | 0 | 0.79 | 0.66 | 0.41 | 0.19 | 0.13 | 0.14 | 0.30 | 0.53 | 0 | 0 | 0 | 0 | 0 | 0 | 0 | 1 | 0.62 | 0.75 | 0.77 | 0.58 | 0.45 | 0.45 | 0.39 | 0.20 | 0.20 | 0.50 |
| 7 | 0 | 0 | 1 | 1 | 1 | 1 | 0 | 0 | 0.66 | 0.41 | 0.19 | 0.13 | 0.14 | 0.30 | 0.53 | 0.53 | 0 | 0 | 0 | 0 | 0 | 0 | 1 | 1 | 0.75 | 0.77 | 0.58 | 0.45 | 0.45 | 0.39 | 0.20 | 0.08 | 0.20 | 0.50 |
| 8 | 0 | 1 | 1 | 1 | 1 | 0 | 0 | 0 | 0.41 | 0.19 | 0.13 | 0.14 | 0.30 | 0.53 | 0.53 | 0.45 | 0 | 0 | 0 | 0 | 0 | 1 | 1 | 1 | 0.77 | 0.58 | 0.45 | 0.45 | 0.39 | 0.20 | 0.08 | 0.12 | 0.20 | 0.50 |

| | | I0 | I1 | I2 | I3 | I4 | I5 | I6 | I7 | I8 | I9 | I10 | I11 |
|---|---|---|---|---|---|---|---|---|---|---|---|---|---|
| 1 | IDEAL SIGNAL (I) | 0 | 0 | 0 | 0 | 1 | 1 | 1 | 1 | 0 | 0 | 0 | 0 |
| | DEMODULATED WAVEFORM (I) | 0 | 0 | 0 | 0 | 1 | 1 | 1 | 1 | 0 | 0 | 0 | 0 |
| | IDEAL SIGNAL (Q) | 0 | 0 | 0 | 0 | 0 | 0 | 0 | 0 | 1 | 1 | 1 | 1 |
| | DEMODULATED WAVEFORM (Q) | Q0 | Q1 | Q2 | Q3 | Q4 | Q5 | Q6 | Q7 | Q8 | Q9 | Q10 | Q11 |
| 2 | IDEAL SIGNAL (I) | 0 | 0 | 0 | 0 | 1 | 1 | 1 | 1 | 0 | 0 | 0 | 0 |
| | DEMODULATED WAVEFORM (I) | I0 | I1 | I2 | I3 | I4 | I5 | I6 | I7 | I8 | I9 | I10 | I11 |
| | IDEAL SIGNAL (Q) | 0 | 0 | 0 | 0 | 0 | 0 | 0 | 0 | 1 | 1 | 1 | 1 |
| | DEMODULATED WAVEFORM (Q) | Q0 | Q1 | Q2 | Q3 | Q4 | Q5 | Q6 | Q7 | Q8 | Q9 | Q10 | Q11 |
| 3 | IDEAL SIGNAL (I) | 0 | 0 | 0 | 0 | 1 | 1 | 1 | 1 | 0 | 0 | 0 | 0 |
| | DEMODULATED WAVEFORM (I) | I0 | I1 | I2 | I3 | I4 | I5 | I6 | I7 | I8 | I9 | I10 | I11 |
| | IDEAL SIGNAL (Q) | 0 | 0 | 0 | 0 | 0 | 0 | 0 | 0 | 1 | 1 | 1 | 1 |
| | DEMODULATED WAVEFORM (Q) | Q0 | Q1 | Q2 | Q3 | Q4 | Q5 | Q6 | Q7 | Q8 | Q9 | Q10 | Q11 |
| 4 | IDEAL SIGNAL (I) | 0 | 0 | 0 | 0 | 1 | 1 | 1 | 1 | 0 | 0 | 0 | 0 |
| | DEMODULATED WAVEFORM (I) | I0 | I1 | I2 | I3 | I4 | I5 | I6 | I7 | I8 | I9 | I10 | I11 |
| | IDEAL SIGNAL (Q) | 0 | 0 | 0 | 0 | 0 | 0 | 0 | 0 | 1 | 1 | 1 | 1 |
| | DEMODULATED WAVEFORM (Q) | Q0 | Q1 | Q2 | Q3 | Q4 | Q5 | Q6 | Q7 | Q8 | Q9 | Q10 | Q11 |

Fig. 24A

| | INPUT SIGNAL | | TEACHER SIGNAL | | |
|---|---|---|---|---|---|
| | DEMODULATED SIGNAL (I) | DEMODULATED SIGNAL (Q) | X | Y | I | Q |
| 1 | 0.80 0.78 0.67 0.46 0.22 0.09 0.13 0.38 | 0.59 0.63 0.74 0.79 0.64 0.51 0.54 0.57 | 0.25 | 0.50 | 1 | 0 |
| 2 | 0.78 0.67 0.46 0.22 0.09 0.13 0.38 0.62 | 0.63 0.74 0.79 0.64 0.51 0.54 0.57 0.34 | 0.25 | 0.50 | 1 | 0 |
| 3 | 0.67 0.46 0.22 0.09 0.13 0.38 0.62 0.58 | 0.74 0.79 0.64 0.51 0.54 0.57 0.34 0.14 | 0.25 | 0.50 | 1 | 0 |
| 4 | 0.46 0.22 0.09 0.13 0.38 0.62 0.58 0.51 | 0.79 0.64 0.51 0.54 0.57 0.34 0.14 0.08 | 0.25 | 0.50 | 1 | 0 |
| 5 | 0.81 0.79 0.66 0.41 0.19 0.13 0.14 0.30 | 0.59 0.62 0.75 0.77 0.58 0.45 0.45 0.39 | 0.20 | 0.50 | 1 | 0 |
| 6 | 0.79 0.66 0.41 0.19 0.13 0.14 0.30 0.53 | 0.62 0.75 0.77 0.58 0.45 0.45 0.39 0.20 | 0.20 | 0.50 | 1 | 0 |
| 7 | 0.66 0.41 0.19 0.13 0.14 0.30 0.53 0.53 | 0.75 0.77 0.58 0.45 0.45 0.39 0.20 0.08 | 0.20 | 0.50 | 1 | 0 |
| 8 | 0.41 0.19 0.13 0.14 0.30 0.53 0.53 0.45 | 0.77 0.58 0.45 0.45 0.39 0.20 0.08 0.12 | 0.20 | 0.50 | 1 | 0 |

Fig. 31A

| TIME | 0 | 1 | 2 | 3 | 4 | 5 | 6 | 7 | 8 | 9 | 10 | 11 | 12 |
|---|---|---|---|---|---|---|---|---|---|---|---|---|---|
| DIGITAL SIGNAL | 0 | 0 | 1 | 1 | 0 | 0 | 1 | 1 | 0 | 1 | 1 | 1 | 1 |

Fig. 31B

| TIME | 6.0 | 6.1 | 6.2 | 6.3 | 7.0 | 7.1 | 7.2 | 7.3 | 8.0 | 8.1 | 8.2 | 8.3 | 9.0 | 9.1 | 9.2 | 9.3 | 10.0 | 10.1 | 10.2 | 10.3 | 11.0 | 11.1 | 11.2 | 11.3 | 12.0 |
|---|---|---|---|---|---|---|---|---|---|---|---|---|---|---|---|---|---|---|---|---|---|---|---|---|---|
| RECEIVED SIGNAL | 1 | 1 | 1 | 1 | 1 | 0 | 0 | 0 | 0 | 0 | 0 | 0 | 1 | 1 | 1 | 1 | 1 | 1 | 1 | 1 | 1 | 1 | 1 | 1 | 1 |
| TS TIMING SIGNAL t7 | 0 | 1 | 1 | 1 | 1 | 1 | 1 | 1 | 1 | 1 | 1 | 0 | 0 | 0 | 0 | 0 | 0 | 1 | 1 | 1 | 1 | 1 | 1 | 1 | 1 |
| t6 | 0 | 0 | 1 | 1 | 1 | 1 | 1 | 1 | 1 | 1 | 1 | 1 | 0 | 0 | 0 | 0 | 0 | 0 | 1 | 1 | 1 | 1 | 1 | 1 | 1 |
| t5 | 0 | 0 | 0 | 1 | 1 | 1 | 1 | 1 | 1 | 1 | 1 | 1 | 1 | 0 | 0 | 0 | 0 | 0 | 0 | 1 | 1 | 1 | 1 | 1 | 1 |
| CHARACTERISTIC DETECTION N.N. t4 | 0 | 0 | 0 | 0 | 1 | 1 | 1 | 1 | 1 | 1 | 1 | 1 | 1 | 1 | 0 | 0 | 0 | 0 | 0 | 0 | 1 | 1 | 1 | 1 | 1 |
| t3 | 0 | 0 | 0 | 0 | 0 | 1 | 1 | 1 | 1 | 1 | 1 | 1 | 1 | 1 | 1 | 0 | 0 | 0 | 0 | 0 | 0 | 1 | 1 | 1 | 1 |
| t2 | 0 | 0 | 0 | 0 | 0 | 0 | 1 | 1 | 1 | 1 | 1 | 1 | 1 | 1 | 1 | 1 | 0 | 0 | 0 | 0 | 0 | 0 | 1 | 1 | 1 |
| t1 | 0 | 0 | 0 | 0 | 0 | 0 | 0 | 1 | 1 | 1 | 1 | 1 | 1 | 1 | 1 | 1 | 1 | 0 | 0 | 0 | 0 | 0 | 0 | 1 | 1 |
| t0 | 0 | 0 | 0 | 0 | 0 | 0 | 0 | 0 | 1 | 1 | 1 | 1 | 1 | 1 | 1 | 1 | 1 | 1 | 0 | 0 | 0 | 0 | 0 | 0 | 1 |
| EQUALIZING N.N. t7 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| t6 | 0 | 1 | 1 | 1 | 1 | 1 | 1 | 1 | 1 | 1 | 1 | 1 | 0 | 0 | 0 | 0 | 0 | 0 | 1 | 1 | 1 | 1 | 1 | 1 | 1 |
| t5 | 0 | 0 | 1 | 1 | 1 | 1 | 1 | 1 | 1 | 1 | 1 | 1 | 1 | 0 | 0 | 0 | 0 | 0 | 0 | 1 | 1 | 1 | 1 | 1 | 1 |
| t4 | 0 | 0 | 0 | 1 | 1 | 1 | 1 | 1 | 1 | 1 | 1 | 1 | 1 | 1 | 0 | 0 | 0 | 0 | 0 | 0 | 1 | 1 | 1 | 1 | 1 |
| t3 | 0 | 0 | 0 | 0 | 1 | 1 | 1 | 1 | 1 | 1 | 1 | 1 | 1 | 1 | 1 | 0 | 0 | 0 | 0 | 0 | 0 | 1 | 1 | 1 | 1 |
| t2 | 0 | 0 | 0 | 0 | 0 | 1 | 1 | 1 | 1 | 1 | 1 | 1 | 1 | 1 | 1 | 1 | 0 | 0 | 0 | 0 | 0 | 0 | 1 | 1 | 1 |
| t1 | 0 | 0 | 0 | 0 | 0 | 0 | 1 | 1 | 0 | 0 | 0 | 0 | 0 | 0 | 0 | 0 | 1 | 1 | 1 | 1 | 1 | 1 | 1 | 0 | 1 |
| t0 | 0 | 0 | 0 | 0 | 0 | 0 | 0 | 1 | 1 | 0 | 0 | 0 | 0 | 0 | 0 | 0 | 0 | 1 | 1 | 1 | 1 | 1 | 1 | 1 | 1 |
| EQUALIZED OUTPUT | 0 | 0 | 0 | 0 | 0 | 0 | 0 | 0 | 1 | 1 | 0 | 0 | 0 | 0 | 0 | 0 | 0 | 0 | 1 | 1 | 1 | 1 | 1 | 1 | 1 |

| PHASE DIFFE-RENCE φ | 0 | 1/2π | π | 3/2π |
|---|---|---|---|---|
| unit 1 | 1 | 0 | 0 | 0 |
| unit 2 | 0 | 1 | 0 | 0 |
| unit 3 | 0 | 0 | 1 | 0 |
| unit 4 | 0 | 0 | 0 | 1 |

| AMPLITUDE RATIO | PHASE DIFFERENCE | INPUT 0 (X) | INPUT 1 (Y) | OUTPUT 0 | OUTPUT 1 | OUTPUT 2 | OUTPUT 3 |
|---|---|---|---|---|---|---|---|
| 0.80 | 0 | 1.80 | 0.00 | 1 | 0 | 0 | 0 |
| 0.80 | pi/2 | 1.00 | -0.80 | 0 | 1 | 0 | 0 |
| 0.80 | pi | 0.20 | 0.00 | 0 | 0 | 1 | 0 |
| 0.80 | 3pi/2 | 1.00 | 0.80 | 0 | 0 | 0 | 1 |
| 0.40 | 0 | 1.40 | 0.00 | 1 | 1 | 0 | 0 |
| 0.40 | pi/2 | 1.00 | -0.40 | 0 | 1 | 0 | 0 |
| 0.40 | pi | 0.60 | 0.00 | 0 | 0 | 1 | 0 |
| 0.40 | 3pi/2 | 1.00 | 0.40 | 0 | 0 | 0 | 1 |

| | INPUT SIGNAL | | | | | | | |
|---|---|---|---|---|---|---|---|---|
| | DEMODULATED SIGNAL (I) | | | | | | | |
| 1 | 0.80 | 0.78 | 0.67 | 0.46 | 0.22 | 0.09 | 0.13 | 0.38 |
| 2 | 0.78 | 0.67 | 0.46 | 0.22 | 0.09 | 0.13 | 0.38 | 0.62 |
| 3 | 0.67 | 0.46 | 0.22 | 0.09 | 0.13 | 0.38 | 0.62 | 0.58 |
| 4 | 0.46 | 0.22 | 0.09 | 0.13 | 0.38 | 0.62 | 0.58 | 0.51 |
| 5 | 0.81 | 0.79 | 0.66 | 0.41 | 0.19 | 0.13 | 0.14 | 0.30 |
| 6 | 0.79 | 0.66 | 0.41 | 0.19 | 0.13 | 0.14 | 0.30 | 0.53 |
| 7 | 0.66 | 0.41 | 0.19 | 0.13 | 0.14 | 0.30 | 0.53 | 0.53 |
| 8 | 0.41 | 0.19 | 0.13 | 0.14 | 0.30 | 0.53 | 0.53 | 0.45 |

| DEMODULATED SIGNAL (Q) | | | | | | | | TEACHER SIGNAL | |
|---|---|---|---|---|---|---|---|---|---|
| | | | | | | | | X | Y |
| 0.59 | 0.63 | 0.74 | 0.79 | 0.64 | 0.51 | 0.54 | 0.57 | 0.25 | 0.50 |
| 0.63 | 0.74 | 0.79 | 0.64 | 0.51 | 0.54 | 0.57 | 0.34 | 0.25 | 0.50 |
| 0.74 | 0.79 | 0.64 | 0.51 | 0.54 | 0.57 | 0.34 | 0.14 | 0.25 | 0.50 |
| 0.79 | 0.64 | 0.51 | 0.54 | 0.57 | 0.34 | 0.14 | 0.08 | 0.25 | 0.50 |
| 0.59 | 0.62 | 0.75 | 0.77 | 0.58 | 0.45 | 0.45 | 0.39 | 0.20 | 0.50 |
| 0.62 | 0.75 | 0.77 | 0.58 | 0.45 | 0.45 | 0.39 | 0.20 | 0.20 | 0.50 |
| 0.75 | 0.77 | 0.58 | 0.45 | 0.45 | 0.39 | 0.20 | 0.08 | 0.20 | 0.50 |
| 0.77 | 0.58 | 0.45 | 0.45 | 0.39 | 0.20 | 0.08 | 0.12 | 0.20 | 0.50 |

| | INPUT | | | | | | | |
|---|---|---|---|---|---|---|---|---|
| | X(w,t) | X(w,t-1) | X(w,t-2) | X(w,t-3) | X(w,t-4) | X(w,t-5) | X(w,t-6) | X(w,t-7) |
| 1 | 0.18 | 0.35 | 0.36 | 0.2 | 0.13 | 0.31 | 0.11 | 0.19 |
| 2 | 0.2 | 0.12 | 0.31 | 0.38 | 0.11 | 0.33 | 0.17 | 0.4 |
| 3 | 0.25 | 0.05 | 0.14 | 0.34 | 0.2 | 0.1 | 0.28 | 0.34 |
| 4 | 0.26 | 0.09 | 0.09 | 0.09 | 0.21 | 0.23 | 0.50 | 0.18 |

| | | | | | | | | TEACHER SIGNAL | |
|---|---|---|---|---|---|---|---|---|---|
| Y(w,t) | Y(w,t-1) | Y(w,t-2) | Y(w,t-3) | Y(w,t-4) | Y(w,t-5) | Y(w,t-6) | Y(w,t-7) | X(w) | Y(w) |
| 0.62 | 0.49 | 0.49 | 0.5 | 0.4 | 0.54 | 0.56 | 0.4 | 0.25 | 0.5 |
| 0.54 | 0.62 | 0.37 | 0.63 | 0.64 | 0.6 | 0.41 | 0.39 | 0.25 | 0.5 |
| 0.35 | 0.56 | 0.62 | 0.37 | 0.63 | 0.58 | 0.65 | 0.49 | 0.2 | 0.5 |
| 0.42 | 0.35 | 0.57 | 0.4 | 0.45 | 0.55 | 0.59 | 0.57 | 0.2 | 0.5 |

| | | |
|---|---|---|
| TRAINING SEQUENCE | I | 00001111 0000... |
| | Q | 11110000 0000... |
| EQUALIZED DIGITAL SIGNAL | I | 00000101 0000... |
| | Q | 11110100 0000... |
| DETERMINED RESULT | | 00001010 0000... |

| | INPUT SIGNAL | | | TEACHER SIGNAL | |
|---|---|---|---|---|---|
| | DEMODULATED SIGNAL (I) | DEMODULATED SIGNAL (Q) | X(ω),Y(ω) | I | Q |
| 1 | 0.81 0.79 0.66 0.41 0.19 0.13 0.14 0.30 | 0.59 0.62 0.75 0.77 0.58 0.45 0.45 0.39 | 0.25 0.55 | 1 | 0 |
| 2 | 0.79 0.66 0.41 0.19 0.13 0.14 0.30 0.53 | 0.62 0.75 0.77 0.58 0.45 0.45 0.39 0.20 | 0.23 0.50 | 1 | 0 |
| 3 | 0.66 0.41 0.19 0.13 0.14 0.30 0.53 0.53 | 0.75 0.77 0.58 0.45 0.45 0.39 0.20 0.08 | 0.23 0.55 | 1 | 0 |
| 4 | 0.41 0.19 0.13 0.14 0.30 0.53 0.53 0.45 | 0.77 0.58 0.45 0.45 0.39 0.20 0.08 0.12 | 0.22 0.51 | 1 | 0 |

ADAPTIVE EQUALIZERS

The present invention relate to equalizers for compensating deterioration of signals over transmission lines of communication systems, and in particular, to adaptive equalizers for detecting characteristics of transmission lines in radio and cable communications and for equalizing received signals by using the detected results.

As the information society grows, cable and radio communication networks are being widely constructed and serviced all over the world and information exchange using communication technologies is becoming increasingly dependent on this important social infrastructure. In the information society, as well as voice signals or picture signals in conventional TV broadcasting, radio broadcasting, and telephone communication, information which remarkably affects our society such as business information exchanged among companies, banking online information, and so forth are transmitted through communication networks. For such important information, accurate and error-free transmission means which are not affected by characteristics of transmission lines must be established.

Particularly, in digital mobile communications for car telephones and so forth, a compensation technique for rapidly varying multi-path fading is becoming an important requirement. Thus, an adaptive equalizing technique for adaptively equalizing deterioration of a signal over a transmission line in accordance with time-by-time variation of characteristics should be established.

A conventional radio transmission line comprises a radio device and a transmission line. The radio device further comprises a transmission filter, a reception filter, a modulator, a demodulator, a transmitter, and a receiver. The characteristics of the transmission line vary depending on weather conditions, buildings, and so forth between the transmitter and the receiver. Causes of signal deterioration include linear and nonlinear distortion generated from constructional devices of the system and two-wave interfered fading generated from the transmission line as linear distortion. Although the distortion generated from devices for mobile radio communication is stable with respect to time, the distortion of a propagation path generated over the transmission line between the mobile station and the ground station becomes selective fading which varies with time. In accordance with this variation, the distortion of the signals over the transmission line should be adaptively equalized.

FIG. 1A is a schematic showing the concept of a mobile communication. In the figure, a mobile communication is performed between a mobile station 1 and a ground station 2. The direct wave is directly propagated between the mobile station 1 and the ground station 2. The reflected wave is reflected by an obstacle 3 such as a building, a mountain, ground, or the like. Thus, fading occurs between the direct wave and the reflected wave. In particular, when a mobile station moves at high speed in mobile communication or the like, the amplitude ratio, propagation delay time, and phase difference between the direct wave and the reflected wave rapidly vary. Thus, the deterioration of the signals should be adaptively and rapidly equalized in accordance with this variation.

FIG. 1B is a block diagram showing a construction of a transversal type equalizer of an equalizer as a related art. The transversal type equalizer demodulates a received signal supplied from the transmission line by using a demodulator 4. Thereafter, the demodulated signal is continuously supplied to a tapped delay line 5. Each coefficient adjustment device 7 multiplies an output of each delay device 6 by a coefficient. An adder 8 adds output signals from the coefficient adjustment devices 7 and outputs the result. By adjusting the coefficient of each coefficient adjustment device 7 in accordance with the degree of distortion of the propagation path and the constructional devices of the radio unit, the distortions are removed.

The conventional transversal type equalizer shown in FIG. 1B is effective against linear distortion. However, when nonlinear distortion occurs over a transmission line or when a nonlinear circuit is used in a demodulation system, received signals are not properly equalized.

In addition, as a filter which is effective against nonlinear distortion, an equalizer using a neural network is known. However, since such an equalizer requires a long learning time, it cannot perform an adaptive process. Therefore, it is not effective against variation of the characteristics of a transmission line. Thus, when the characteristics of the transmission line rapidly vary, as in multi-path fading, this equalizer is not effective.

SUMMARY OF THE INVENTION

Therefore, an object of the present invention is to provide a function for detecting characteristics of a transmission line and equalizing a signal by using the detected result and thereby adaptively equalizing both linear and nonlinear distortions of the signal.

A feature of the present invention resides in an adaptive equalizer, comprising characteristic detection means for detecting a characteristic of an object to be equalized by using an output signal in accordance with a known input signal of the object to be equalized as a deterioration compensation of the output signal; and equalizing means for equalizing an output signal of the object to be equalized in accordance with an unknown input signal by using the detected result of the characteristic detection means.

BRIEF DESCRIPTION OF THE DRAWINGS

FIG. 16 is a table showing transmission line parameters in a simulation for generating learning data;

FIG. 18 is a table showing an example of learning data of the characteristic detection neural network;

FIG. 19 are tables used to describe countermeasures against waveform distortion for learning data of a characteristic detection neural network;

FIGS. 31A and 31B are timing charts showing a signal equalizing process in accordance with the embodiment of FIG. 28;

FIG. 35 is a table showing an example of learning data for use in a control neural network;

FIG. 36 is a table showing an example of learning data of a control neural network where amplitude ratio and phase difference are varied;

FIG. 44 is a schematic diagram showing an example of learning data of the characteristic detection neural network;

FIG. 50 is a table showing an example of learning data of the post-process neural network;

FIG. 57 is a schematic diagram showing an example of a determining of an equalizing error;

FIG. 58 is a schematic showing an example of a learning pattern generated by the determination of an equalizing error;

DETAILED DESCRIPTION OF THE INVENTION

FIGS. 2 to 5 are block diagrams for explaining theories of the present invention. These figures are block diagrams of adaptive equalizers for detecting characteristics of an object to be equalized where a known input signal is inputted and for compensating the output signal. The object to be equalized is for example a transmission line.

Figure 1A:
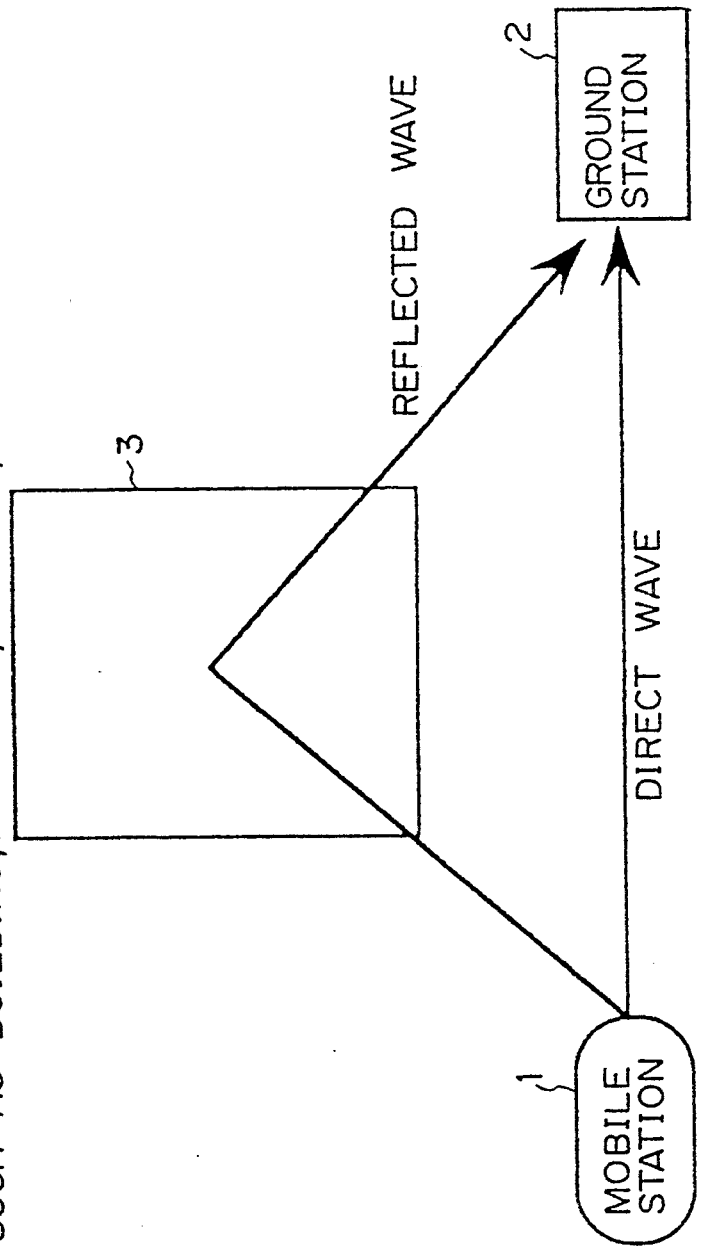
FIG. 1A is a schematic drawing of two-wave interfered fading in a mobile communication system in accordance with the present inventions.
Figure 1B:
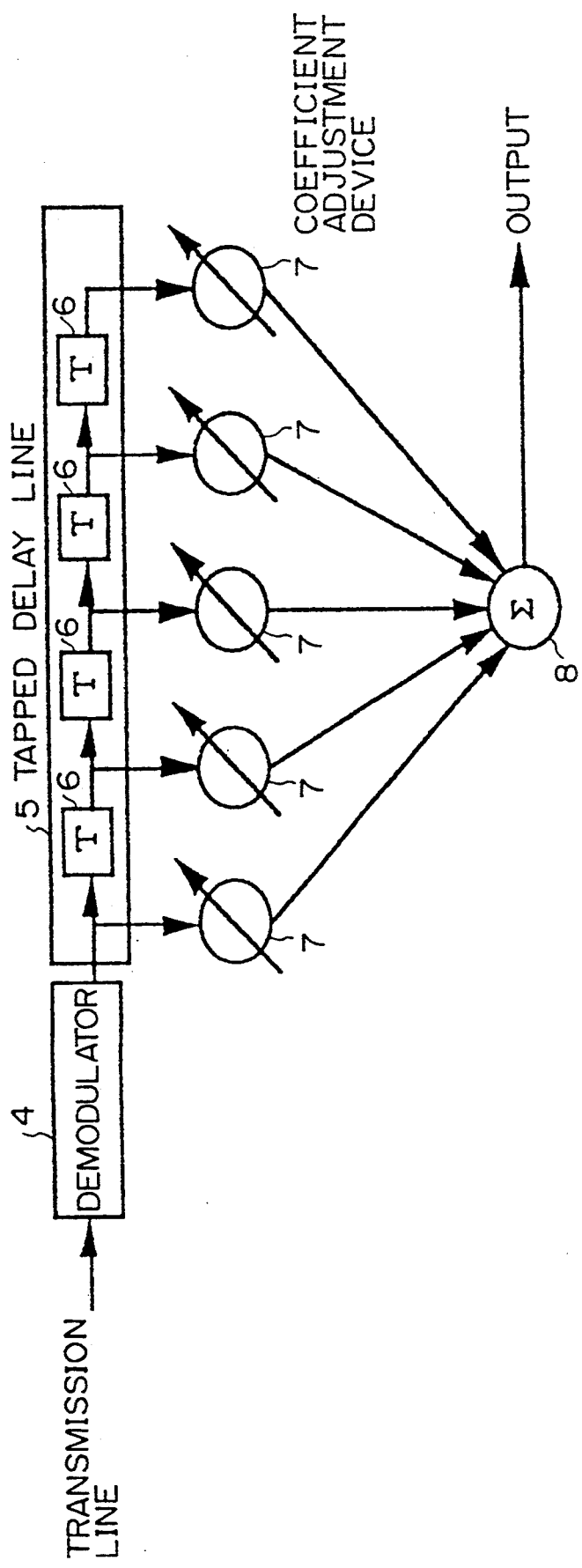
FIG. 1B is a block diagram showing an example of a transversal type equalizer.
Figure 2:
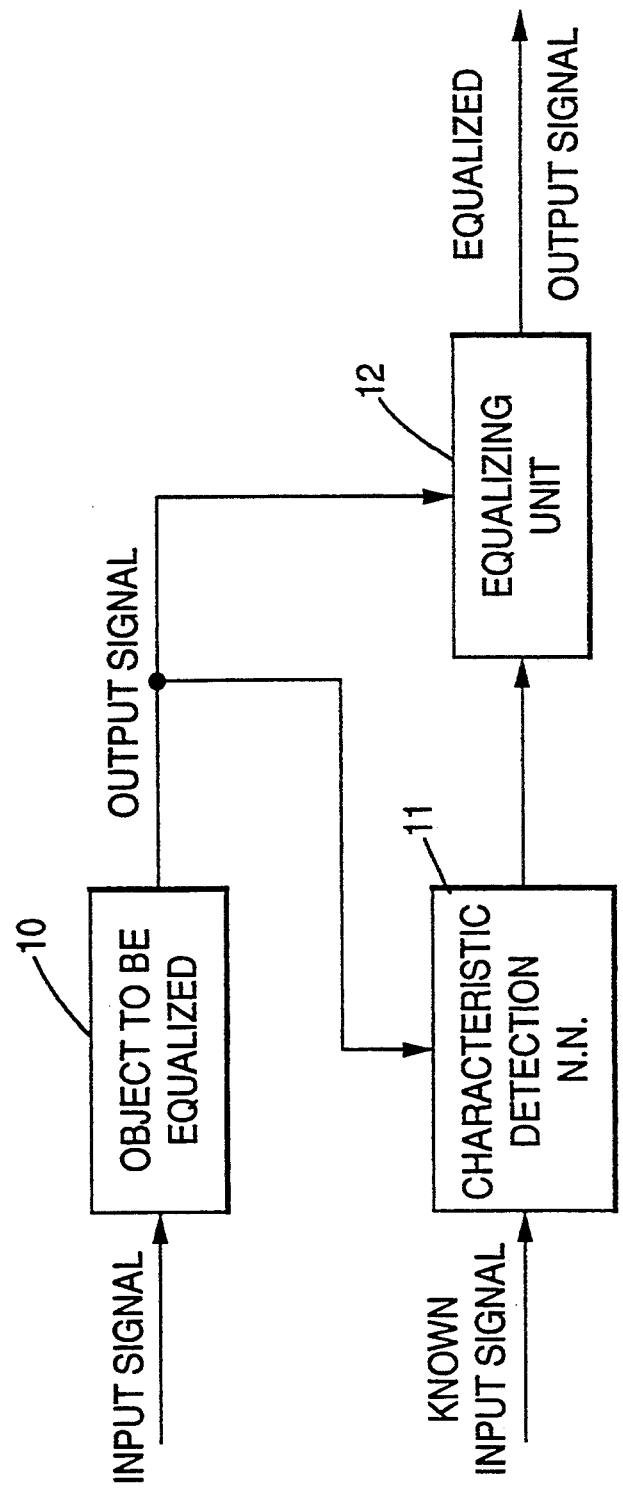
FIG. 2 is a block diagram for explaining the theory of the first and third embodiments of the invention.

FIG. 2 is a block diagram for explaining a theory of the first and third embodiment of the invention. In the first embodiment of the invention, a characteristic detection unit 11 detects characteristics such as a transfer function of an object to be equalized 10, for example a transmission line, which is to be equalized to compensate deterioration of an output signal. The characteristics are detected by comparing a known input signal with an output signal of the object to be equalized 10 corresponding to the known input signal in the characteristic detection unit 11. An equalizing unit 12 equalizes an output signal of the object to be equalized 10 corresponding to an unknown input signal by using the detected result of the characteristic detection unit 11.

Figure 3:
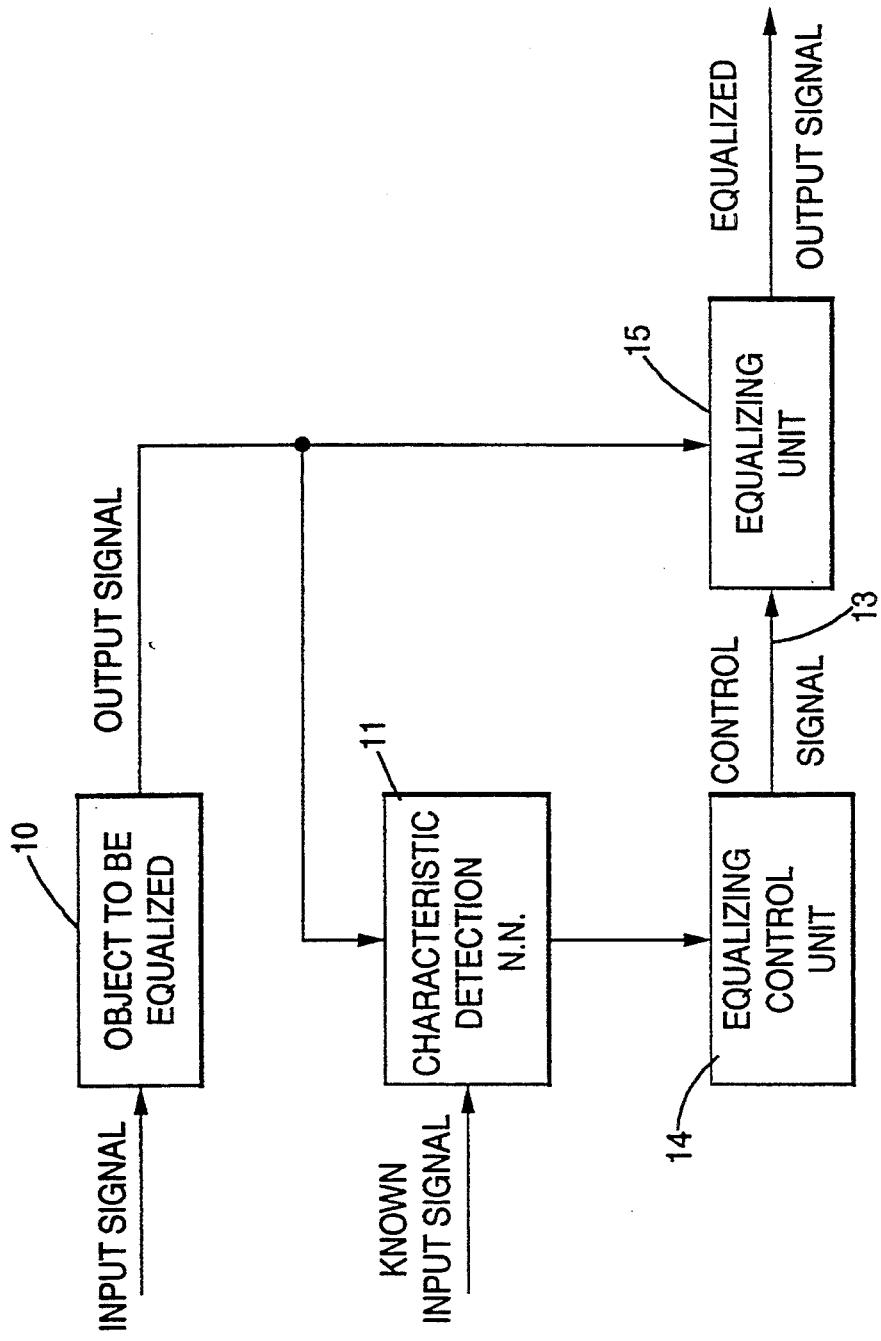
FIG. 3 is a block diagram for explaining the theory of the second embodiment of the invention.

FIG. 3 is a block diagram for explaining a theory of the second embodiment of the invention. In FIG. 3, a characteristic detection unit 11 detects characteristics of an object to be equalized 10 in the same manner as in the first embodiment of the invention. An equalizing control unit 14 uses the detected result of the characteristic detection unit 11 and outputs a control signal for equalizing an output signal of the object to be equalized 10 corresponding to an unknown input signal. An equalizing unit 15 equalizes the output signal of the object to be equalized 10 corresponding to an unknown input signal in accordance with the control signal output by the equalizing control unit 14. The equalizing unit 15 comprises for example a plurality of equalizing circuits and a weighting addition circuit for weighting and adding the output signals of the equalizing circuit. The equalizing control unit 14 outputs a control signal 13 corresponding to each output signal of the plurality of equalizing circuits. Thus, the output signals of the plurality of equalizing circuits are weighted and the sum thereof is outputted as an equalized output signal.

FIG. 2 also explains the theory of the third embodiment of the invention. As in the first embodiment of the invention, in the third embodiment of the invention, the characteristic detection unit 11 is for example a neural network. The characteristic detection unit 11 detects characteristics such as a transfer function of the object to be equalized 10, for example, a transmission line, which is to be equalized to compensate for deterioration of an output signal, by using an output signal in accordance with a known input signal of the object to be equalized 10. However, in the first embodiment of the invention, values of the internal state of the neural network as the characteristic detection unit 11, for example the weight of internal linkage, are constant regardless of the signal pattern of the known input signal. In contrast, in the third embodiment of the invention, the weight of the internal linkage is switched in accordance with the signal pattern of the known input signal. Thereby, the neural network forming characteristic detection means 11 effectively executes a learning process. As in the first embodiment of the invention, an equalizing unit 12 equalizes an output signal of the object to be equalized 10 corresponding to an unknown input signal by using the detected result of the characteristic detection means 11 and outputs an equalized output signal.

Figure 4:
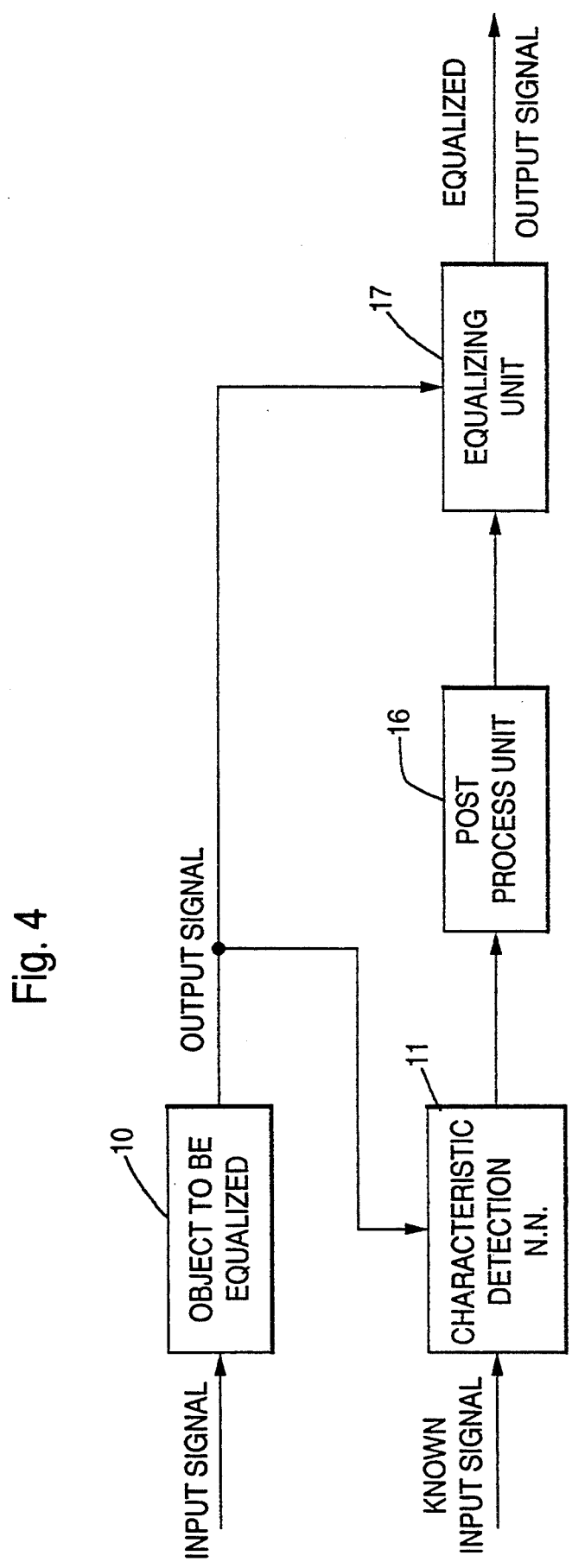
FIG. 4 is a block diagram for explaining the theory of the fourth embodiment of the invention.

FIG. 4 is a block diagram for explaining the theory of the fourth embodiment of the invention. In FIG. 4, a characteristic detection unit 11 is for example a neural network, as in the third embodiment of the invention. The characteristic detection unit 11 detects characteristics of an object to be equalized 10. However, unlike in the third embodiment of the invention, the weight as an internal state value of the neural network is not switched in accordance with the signal pattern of an input signal. The characteristics are detected while the weight of the internal linkage is not changed.

A post-process unit 16 successively stores the result detected by the characteristic detection unit 11 by using output signals of an object to be equalized 10 which are outputted in a time series manner and performs a post-process on the detected result of the characteristics being stored, for example, an average value of transfer functions. The post-process unit 16 is constructed of for example a shift register and a neural network. An equalizing unit 17 equalizes an output signal of the object to be equalized 10 by using an Output signal of the post-process unit 16 as the detected result of the characteristics of the object to be equalized 10. The equalizing unit 17 is also constructed of for example a neural network.

Figure 5:
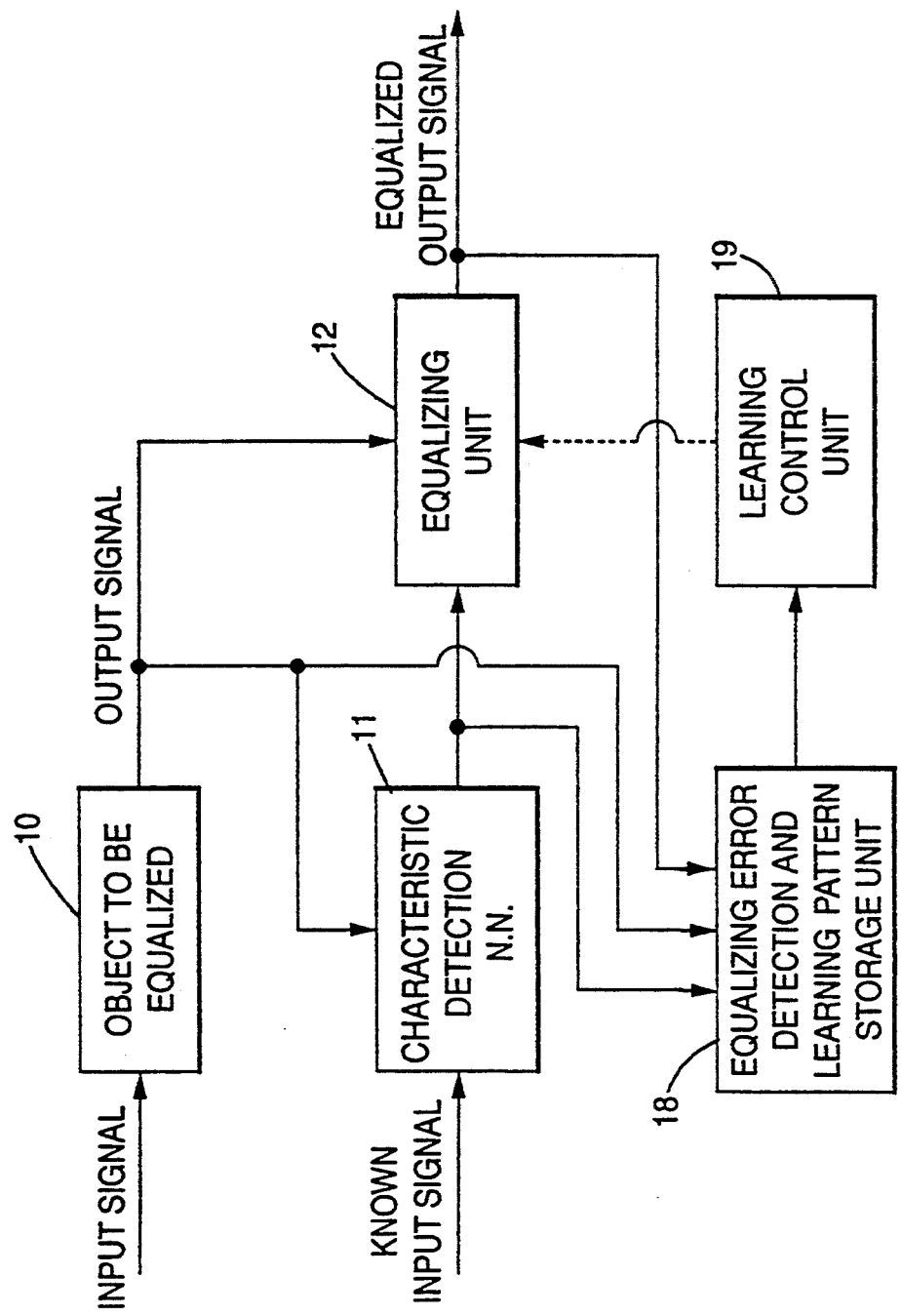
FIG. 5 is a block diagram for explaining the theory of the fifth embodiment of the invention.

FIG. 5 is a block diagram for explaining the theory of the fifth embodiment of the invention. The operations of a characteristic detection unit 11 and an equalizing unit 12 of the fifth embodiment of the invention are the same as those of the first embodiment of the invention.

An equalizing error detection and learning pattern storage unit 18 compares a known input signal to an object to be equalized 10 with an output signal of an equalizing unit 12. When this detection and storage unit 18 detects an equalizing error, it stores the output signal, the detected result of the characteristic detection unit 11 and the known input signal which is a correct output signal to be output from the equalizing unit 12, as a learning pattern.

A learning control means 19 causes the equalizing unit 12, for example a neural network, to learn by using a learning pattern stored in the equalizing error detection and learning pattern storage unit 18 while the object to be equalized 10 is not outputting a signal, for example, while the transmission line as the object to be equalized 10 is not being used.

In the present invention, when data is transmitted over a transmission line in a packet format, a known bit train named a training sequence or a recognition signal is placed at the beginning of a packet. This bit train is used as a known input signal for detecting characteristics of the object to be equalized 10, for example the transmission line. By using the relation between this input signal and the output signal of the object to be equalized 10, the characteristic detection unit 11, for example the neural network, detects the characteristics of the transmission line, for example the real part and the imaginary part of a transfer function thereof.

In the first embodiment of the invention shown in FIG. 2, by using for example the real part and the imaginary part of a transfer function detected by a neural network forming characteristic detection means 11, the equalizing unit 12 equalizes an output signal of the transmission line corresponding to an unknown input signal. The equalizing unit 12 is also formed of for example a neural network.

In the second embodiment of the invention shown in FIG. 3, by using an output signal of a neural network forming characteristic detection means 11, a control signal for equalizing an output signal of an object to be equalized 10 corresponding to an unknown input signal is outputted. This control signal provides a weight signal to weight each output signal of a plurality of equalizing circuits forming equalizing means 15. The weighted results of output signals of the plurality of equalizing circuits are added and outputted as an equalized output signal. Each equalizing circuit is also constructed of a neural network.

In the third embodiment of the invention shown in FIG. 2, a neural network forming characteristic detection means 11 switches weight of the neural network as a characteristic detection parameter, in accordance with a bit pattern of a training sequence which is a known signal and detects the real part and the imaginary part of a transfer function. Thereby, an output signal of the transmission line corresponding to an unknown input signal is equalized.

In the fourth embodiment of the invention shown in FIG. 4, a bit train of a training sequence is shifted for example bit by bit and input to a characteristic detection unit 11. The detected result of each bit train is stored in, for example, a shift register. For the stored result, a post-process, for example an averaging process, is performed. Thereafter, by using the result of the post-process, an output signal of the object to be equalized 10 corresponding to an unknown input signal is equalized. Thereby, in comparison with the construction where the detected result of characteristics is used one time, the accuracy of the detection of characteristics can be improved.

In the fifth embodiment of the invention shown in FIG. 5, as in the first embodiment of the invention, a characteristic detection unit 11 detects characteristics of an object to be equalized 10. By using the detected result, an output signal of the object to be equalized 10 corresponding to an unknown input signal is equalized. At the same time, an equalizing error detection and learning pattern storage unit 18 compares a known input signal of an object to be equalized 10 with an output signal of an equalizing unit 12. When the storage means 18 detects an equalizing error, it stores the output signal, the detected result of the characteristic detection unit 11, and a correct output signal of the object to be equalized 10 as a learning pattern. For example, while no communication takes place on the transmission line, the equalizing unit 12 performs a learning process by using this learning pattern.

In the above description, a training sequence placed at the beginning of a packet is used as the known input signal of the object to be equalized 10. However, when fading takes place at very high speed, even while one packet is being received, the characteristics of the transmission line may vary. To meet such a situation, according to the present invention, even after a signal in accordance with a training sequence is received, characteristics can be continuously detected. To continuously detect characteristics assuming that an equalized output signal of the adaptive equalizer corresponding to an unknown input signal is correct (as a known signal), a characteristic detection control device is provided in a preceding stage of the characteristic detection unit 11 shown in FIGS. 2 to 5 (the first to fifth embodiments of the invention).

The characteristic detection control device supplies a known input signal and an output signal of an object to be equalized 10 to a characteristic detection unit 11 while a training sequence corresponding to the known input signal is inputted to the object to be equalized 10. After the input of the training sequence is completed, while an unknown input signal 8, i.e., transmission data is being inputted to the object to be equalized 10, the characteristic detection control device supplies both an output signal of the equalizing means 12 as a signal instead of the known input signal and an output signal of the object to be equalized 10 to the characteristic detection unit 11. Thereby, the characteristic detection unit 11 continuously detects the characteristics.

As described above, according to the present invention, by detecting transfer characteristics of an object to be equalized, for example, a transfer function and by using the detected result, an output signal can be equalized in accordance with the transfer characteristics which vary each time.

EMBODIMENTS

Figure 6:
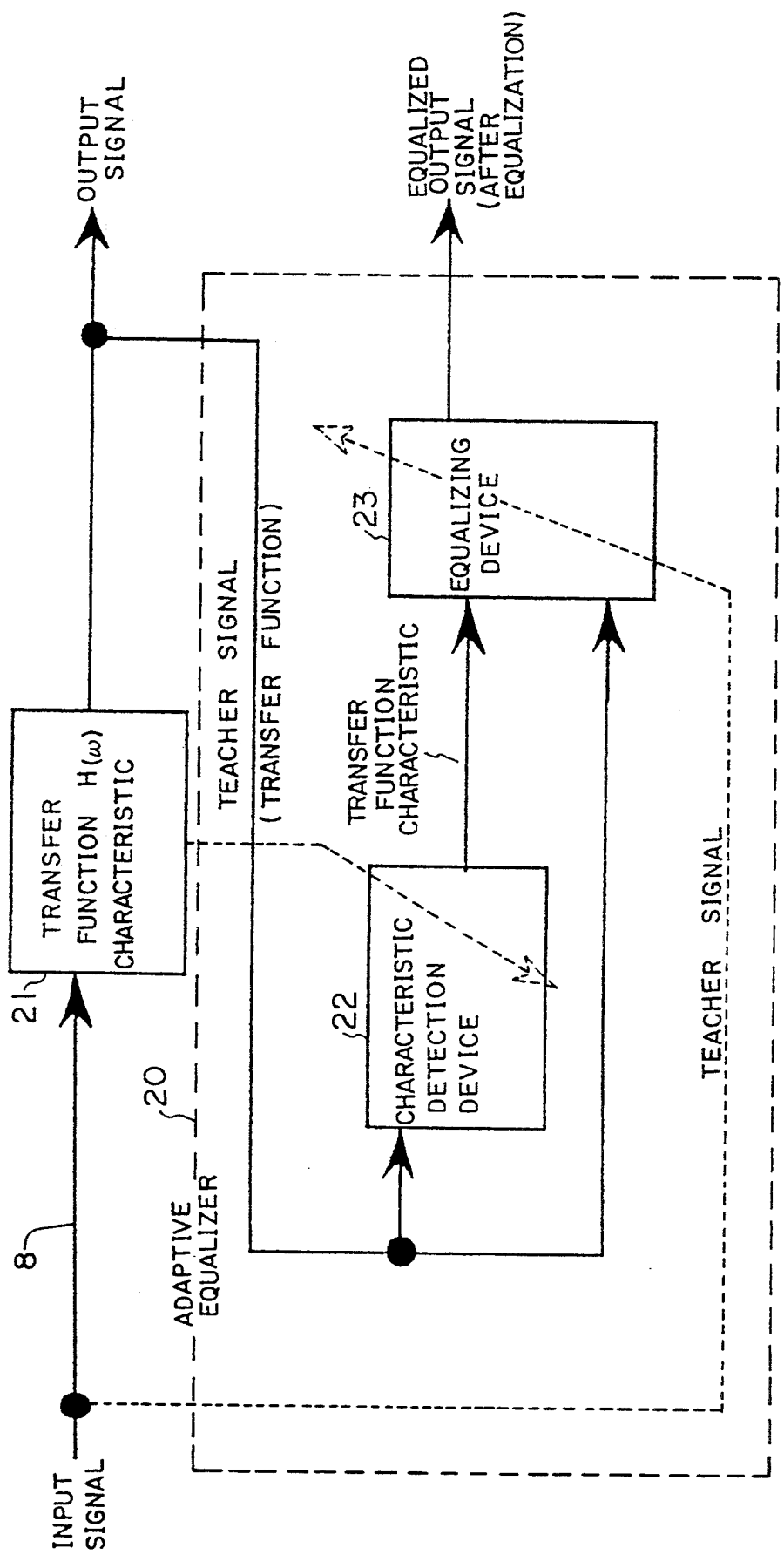
FIG. 6 is a block diagram showing the construction of an adaptive equalizer in accordance with the first embodiment of the invention.

FIG. 6 is a block diagram showing a construction of an adaptive equalizer in accordance with the first embodiment of the invention. In FIG. 6, the adaptive equalizer 20 comprises a characteristic detection device 22 for detecting a transfer characteristic, for example, transfer function H ($\omega$) of an object to be equalized 21; and an equalizing device 23 for equalizing an output signal of the object to be equalized 21 by using the transfer function characteristic being detected.

In FIG. 6, the characteristic detection device 22 and the equalizing device 23 are for example neural networks. The characteristic detection device 22 learns with the transfer function of the object to be equalized 21 using a teacher signal. The equalizing device 23 learns with an input signal of the object to be equalized 21 as a teacher signal.

Figure 7A:
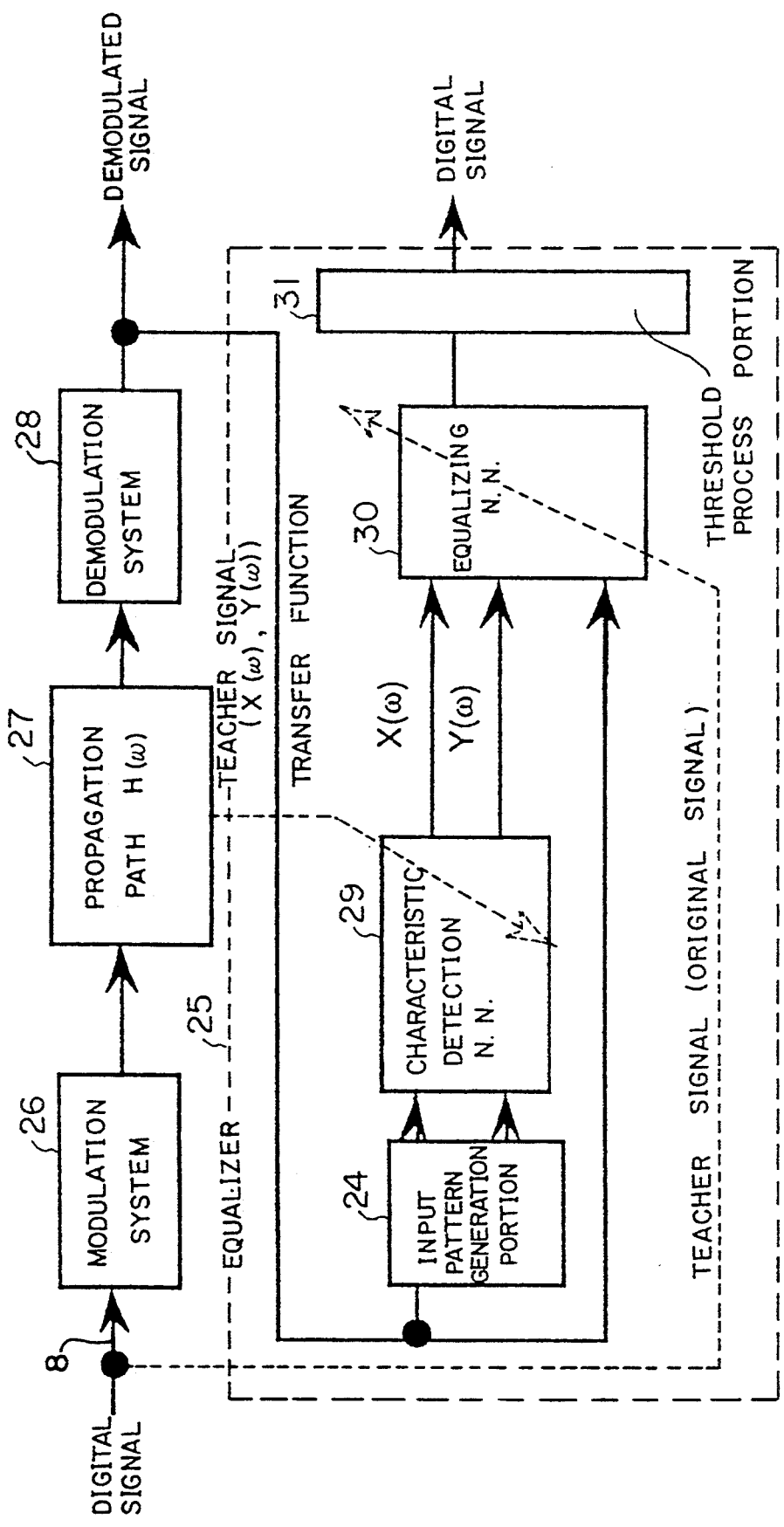
FIG. 7A is a block diagram showing the construction of an adaptive equalizer in accordance with the first embodiment of the invention.

FIG. 7A is a block diagram showing the construction of the adaptive equalizer in accordance with the first embodiment of the invention. In FIG. 7A, the object to be equalized 21 of FIG. 6 comprises a modulation system 26, a propagation path 27, and a demodulation system 28. The adaptive equalizer 25 comprises an input pattern generation portion 24, which will be described later in detail; a characteristic detection neural network 29, which is equivalent to the characteristic detection device 22 of FIG. 6; an equalizing neural network 30, which is equivalent to the equalizing device 23 of FIG. 6; and a threshold process portion 31. The characteristic detection neural network 29 detects a real part X ($\omega$) and a imaginary part Y ($\omega$) of each transfer function of the overall transmission system comprising the modulation system 26, the propagation path 27, and the demodulation system 28 (hereinafter, the overall transmission system is named the transmission line) by using known digital signals which are provided by an input signal of the characteristic detection neural network 29 and a demodulation signal of the demodulation system 28 corresponding to the input signal, namely the output signal of the demodulation system 28. The equalizing neural network 30 equalizes the demodulation signal which is outputted from the demodulation system 28 by using the detected result from the detection neural network 29. The threshold process portion 31 converts the equalized result into digital data of 03 s and 1's in accordance with a proper threshold value and outputs the resultant data as a digital signal which is an equalized output signal.

Figure 7B:
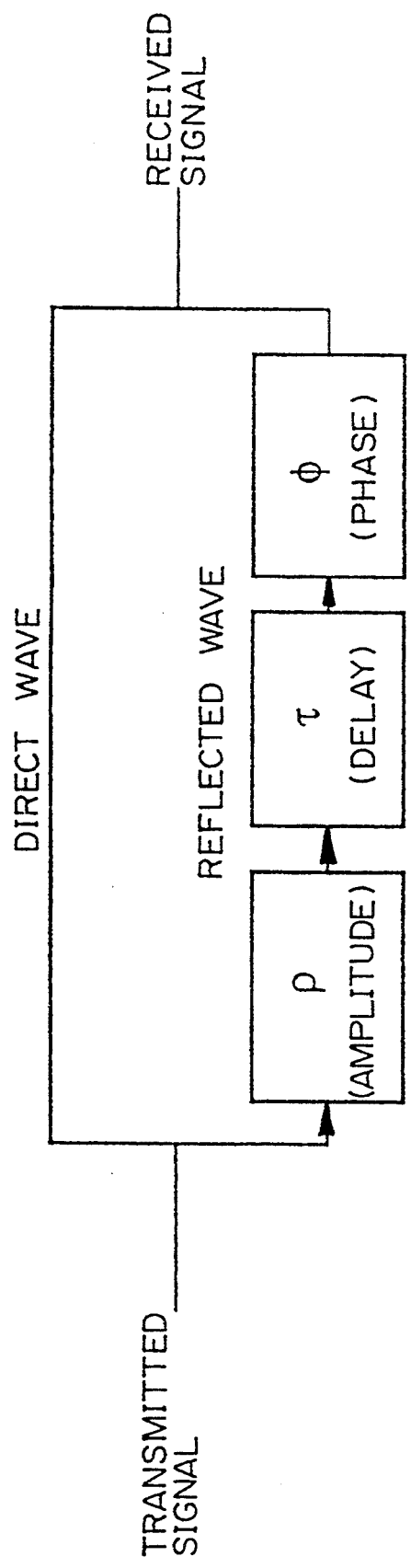
FIG. 7B is a schematic diagram showing a model of the propagation path in accordance with the first embodiment of the invention.

FIG. 7B shows a model of the propagation path 27 of FIG. 7A. Generally, in line-of-sight microwave communication, the propagation path is described as an interfered fading model of two waves: a direct wave and a reflected wave. When the amplitude ratio of the reflected wave to the direct wave is $\rho$, the propagation delay time of the reflected wave compared to the direct wave is $\tau$, and the initial phase difference between the reflected wave and the direct wave is $\phi$, the transfer function of the transmission line can be expressed by the following equations. Ideally, since the transfer function of the modulation system 26 and that of the demodulation system 28 are offset, it is possible to consider the transfer function of the propagation path 27 as that of the entire transmission line.

Equation 1

$$H(\omega) = A(1 + \rho e^{-j\omega \tau}) \quad (1)$$
$$= X(\omega) + jY(\omega)$$
$$X(\omega) = A(1 + \rho \cos(\omega\tau - \phi)) \quad (2)$$
$$Y(\omega) = A\rho \sin(\omega\tau - \phi) \quad (3)$$

When $\tau' = 2n\pi/\omega$ (n is any integer), by using $\phi'(0 \leq \phi \leq 2\pi)$ which satisfies the relation of $\omega\tau - \phi = \omega\tau' - \phi'$, the above equations can be transformed as follows.

$$X(\omega) = A(1 + \rho\cos(\phi')) \quad (4)$$

$$Y(\omega) = A\rho\sin(\phi') \quad (5)$$

As described above, $\rho$, $\tau'$, and $\phi'$ are obtained by using the original $\rho$, $\tau$, and $\phi$. Thereafter, by using equations (4) and (5), the real part and the imaginary part of the transfer function can be calculated. Thus, when the characteristic detection neural network 29 detects the transfer function, the phase difference of the reflected wave and the direct wave over the transmission line and the amplitude ratio thereof are obtained as characteristics.

Figure 8:
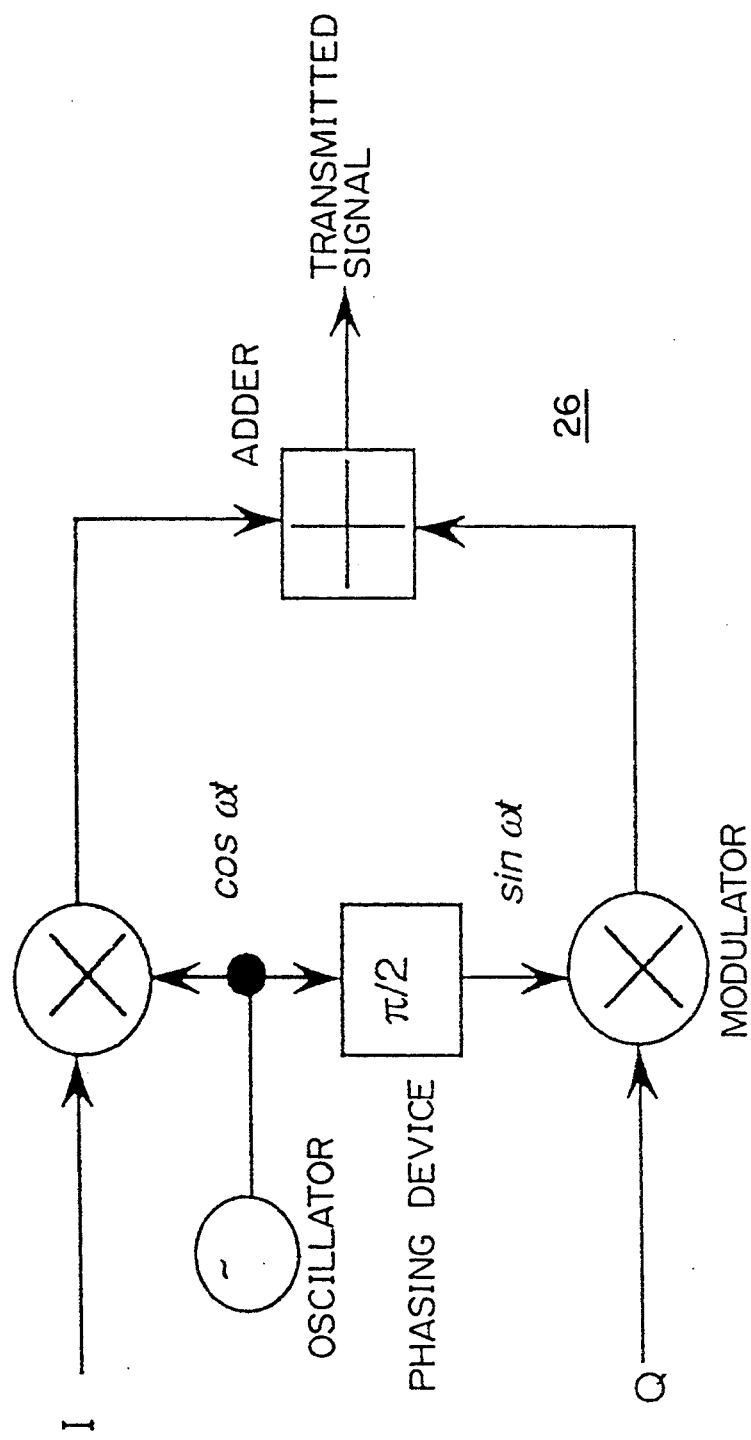
FIG. 8 is a block diagram showing the construction of a modulation system of an embodiment of the adaptive equalizer of FIG. 7A.

FIG. 8 is a block diagram showing the construction of the modulation system 26 in accordance with the embodiment of FIG. 7A. In FIG. 8, by orthogonally modulating input signals of two channels of I and Q, the resultant signal is transmitted over the transmission line as a transmitted signal. The signal of the I channel is equivalent to a detector output where a carrier component obtained from a received wave is used as a reference signal in for example, a demodulation state and the signal of the Q channel is equivalent to a detector output of a signal that the phase of a carrier component is advanced by $\pi/2$.

Figure 9:
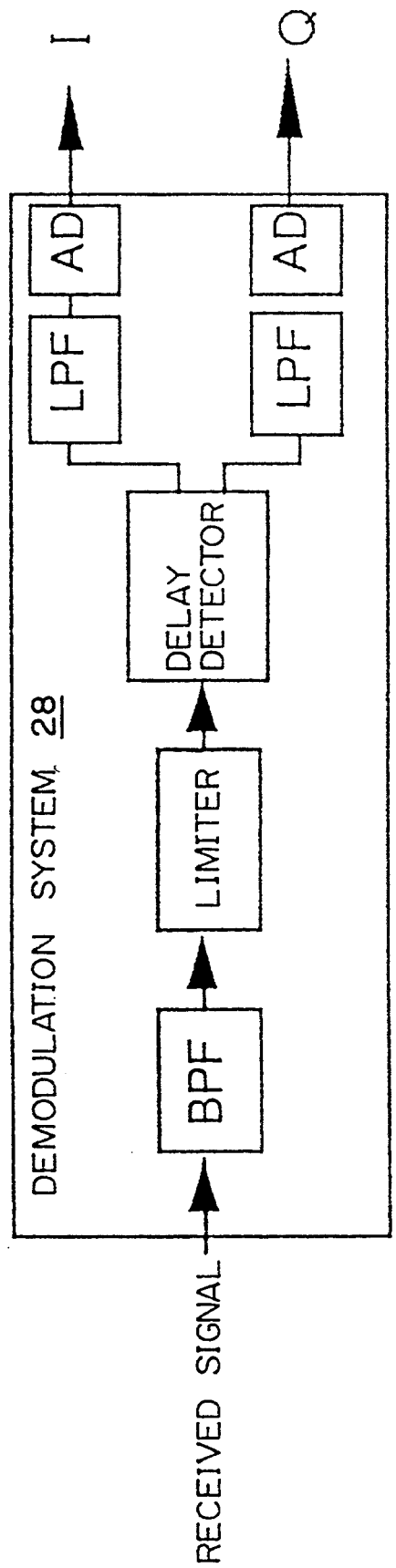
FIG. 9 is a block diagram showing the construction of a demodulation system of an embodiment of the adaptive equalizer of FIG. 7A.

FIG. 9 is a block diagram showing the construction of the demodulation system 28 of FIG. 7A. This demodulation system restores the received signal by using detection such as synchronous detection or delay detection. In FIG. 9, BPF is a band pass filter, LPF is a low pass filter, and AD is an analog/digital converter. The demodulation system 28 quadruply oversamples the received analog signal and converts the signal into a digital signal.

Figure 10:
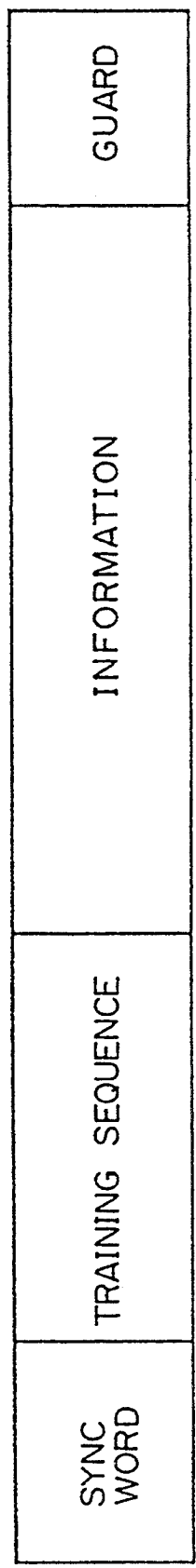
FIG. 10 is a schematic diagram showing the packet format of an embodiment in accordance with the present invention.

FIG. 10 is a packet format of data transmitted over a transmission line of an embodiment of the present invention. At the beginning of each packet, a known bit train consisting of for example 16 bits is placed. This bit train is named a training sequence. By using this bit train, the characteristics of a transmission line are detected. An information portion is data which is really transmitted. Since this embodiment relates to a digital mobile phone system, signals for use are constructed of binary values of 0's and 1's. A SYNC word and a guard are special codes representing the beginning and the end of each packet, respectively.

Figure 11:
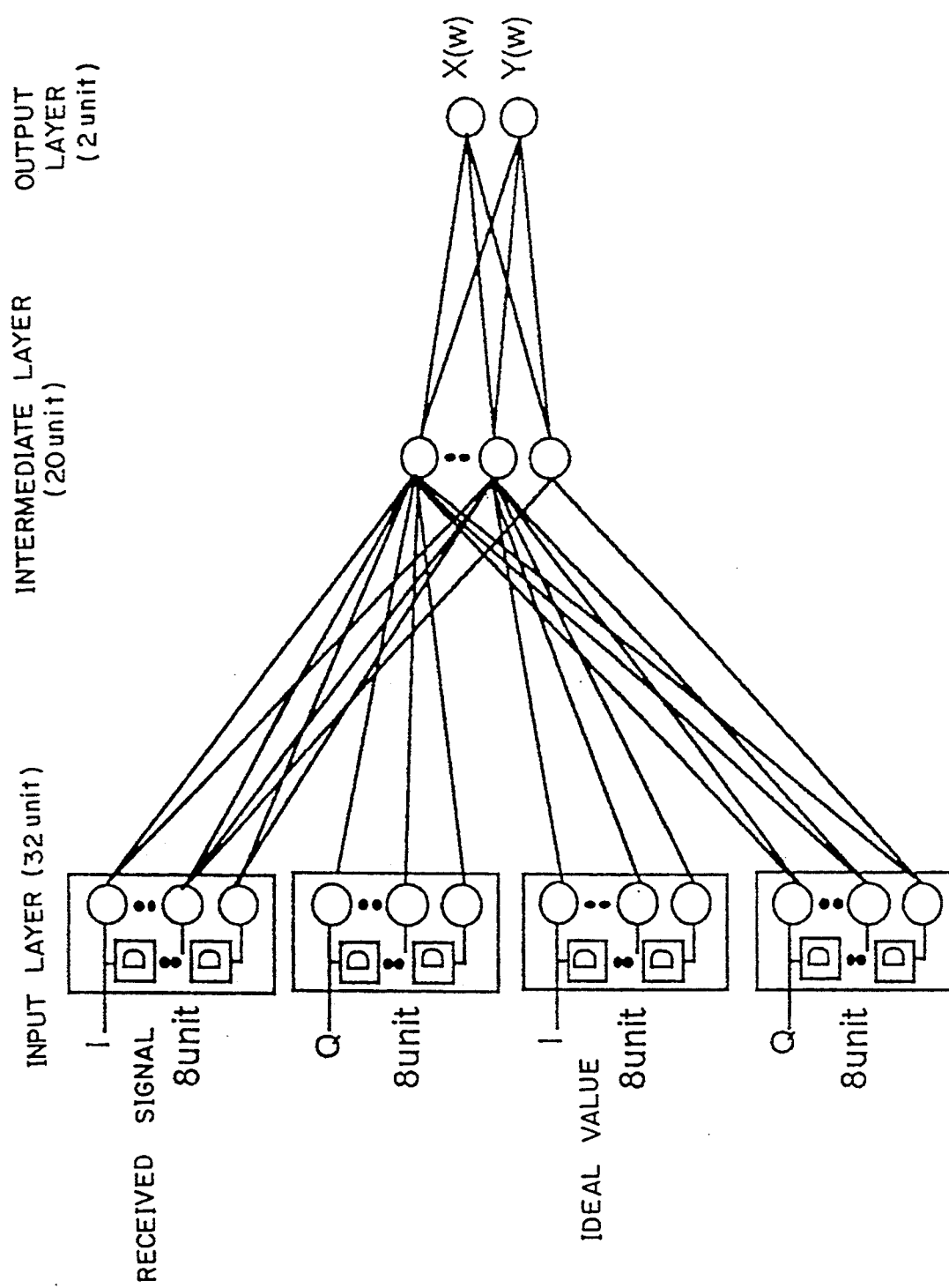
FIG. 11 is a schematic diagram showing the characteristic detection neural network of an embodiment of the adaptive equalizer of FIG. 6.

FIG. 11 is a schematic diagram showing a characteristic detection neural network 29 of an embodiment of the adaptive equalizer of FIG. 7A. In FIG. 11, the characteristic detection neural network 29 is a three-layered neural network where each layer is fully linked. There are 32 input units. An output signal of the demodulation system 28 is inputted to 16 input units, obtained as an output signal. A bit train of the training sequence shown in FIG. 10 is inputted to the remaining 16 input units as an ideal output value. There are two units in the output layer. These units output the real part and the imaginary part of the transfer function of the transmission line. There are, e.g., 20 units in the intermediate layer. This number of units in the intermediate layer has been experimentally determined.

In FIG. 11, the bit train of the training sequence at the beginning of each packet and the bit train of the received signal are inputted to each unit of the input layer through a delay device D (shift register) of both the I and Q channels, each bit train consisting of eight bits. In accordance with the input pattern, the characteristic detection neural network compares the known training sequence with the actual received signal. Thus, the characteristic detection neural network detects the transfer function of the transmission line and outputs the real part X ($\omega$) and the imaginary part Y ($\omega$) thereof.

Figure 12:
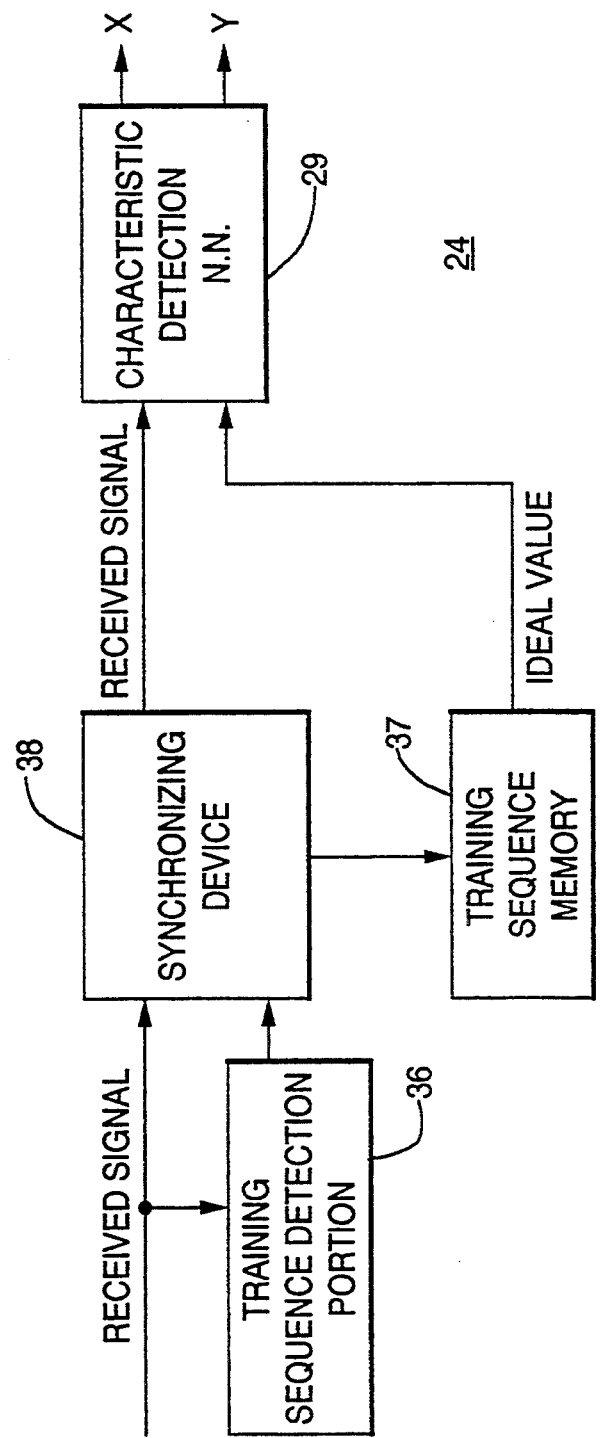
FIG. 12 is a block diagram showing the construction of an embodiment of an input pattern generation portion in the characteristic detection neural network.

FIG. 12 is a block diagram showing the construction of an embodiment of an input pattern generation portion 24 for the characteristic detection neural network 29 in FIG. 7A. In FIG. 12, the input pattern generation portion comprises a training sequence detection portion 36 for detecting a training sequence of a packet from a received signal; a training sequence memory 37 for storing a bit train of a training sequence; and a synchronizing device 38 for synchronizing a received signal with an ideal value stored in the training sequence memory 37 in accordance with an output signal of the training sequence detection portion 36 and outputting the resultant signal to the characteristic detection neural network 29.

Figure 13:
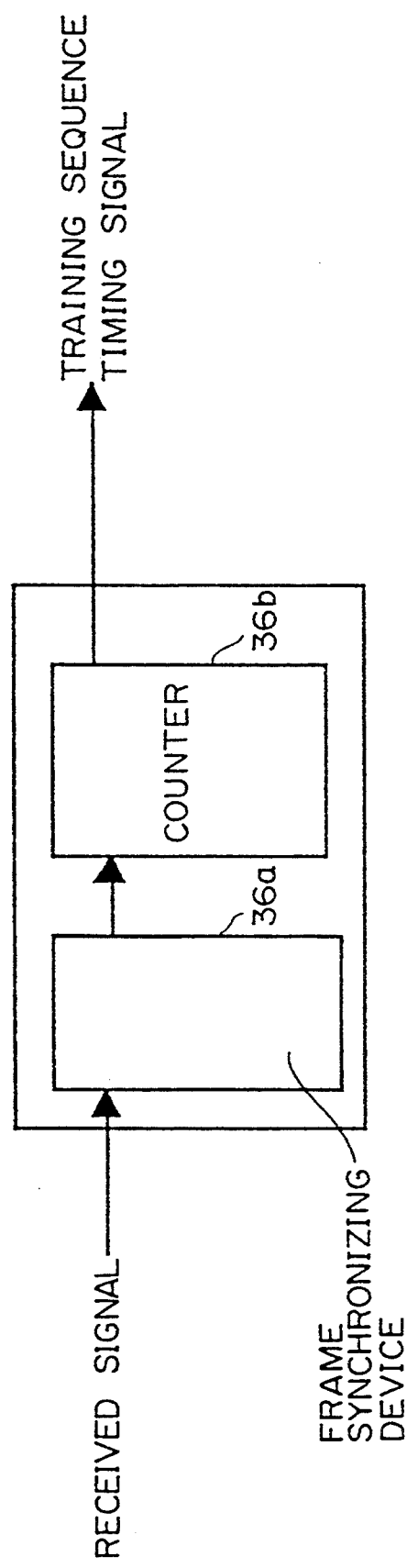
FIG. 13 is a block diagram showing the construction of a training sequence detection portion.

FIG. 13 is a block diagram showing the construction of the training sequence detection portion 36 of the input pattern generation portion 24. In FIG. 13, the training sequence detection portion detects the timings of the beginning and the end of the training sequence. A frame synchronizing device 36a establishes the synchronization of a packet by using a received signal and outputs a reset signal to a counter 36b. With this reset signal, the counter 36b outputs the training sequence timing signal which represents the timings of the beginning and the end of the training sequence of each packet. To establish a frame synchronization, a signal with a strong auto correlation is followed by a packet. On the receiver side, by using such a correlation, the frame synchronization is established. Since this means is out of the scope of the present invention, the description thereof is omitted in this specification.

Figure 14:
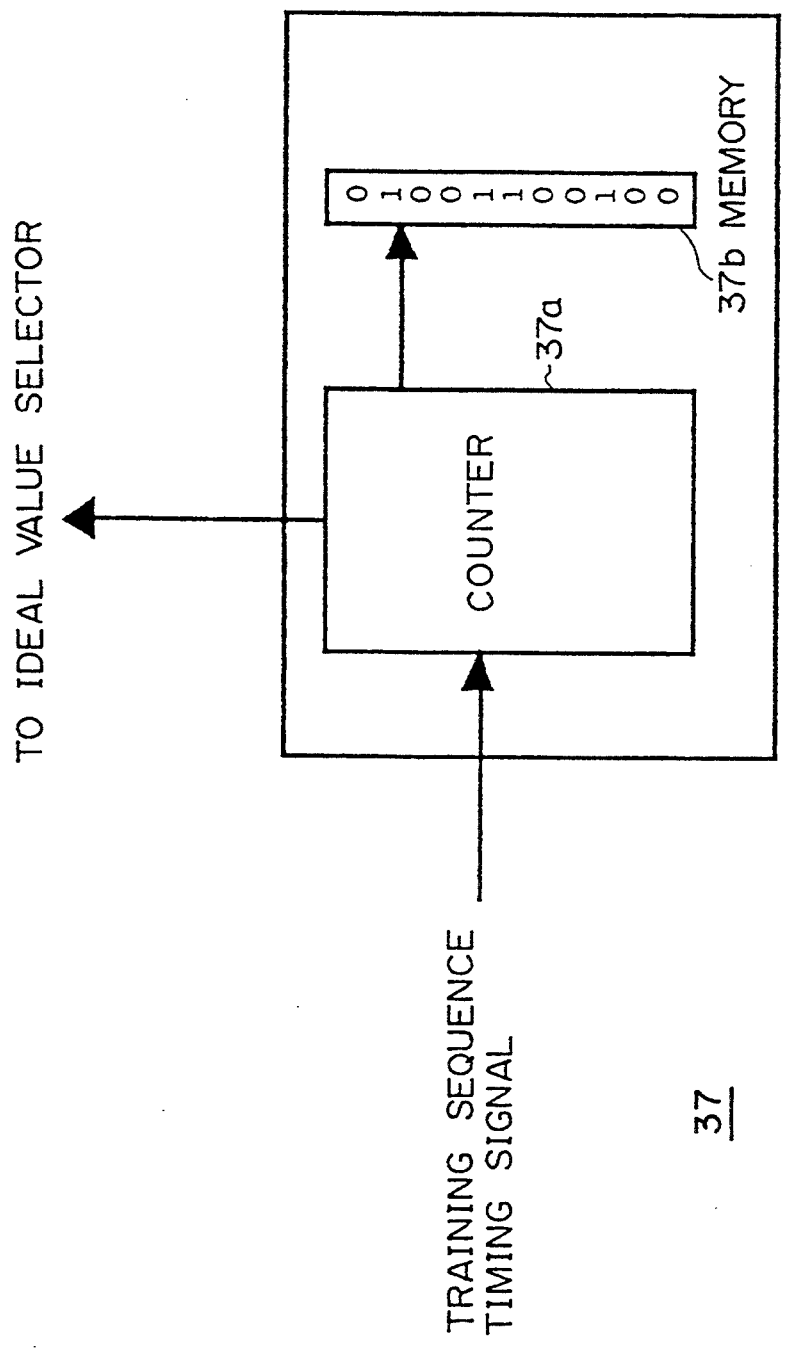
FIG. 14 is a block diagram showing the construction of a training sequence memory.

FIG. 14 is a block diagram showing the construction of the training sequence memory of the input pattern generation portion 24. The training sequence 37 comprises a counter 37a for inputting a training sequence timing signal which is sent from the training sequence detection portion 36 through the synchronizing device 38; and a memory 37b for storing data of the training sequence and, memory from which the stored data is read as an ideal value under the control of the counter 37a.

Figure 15:
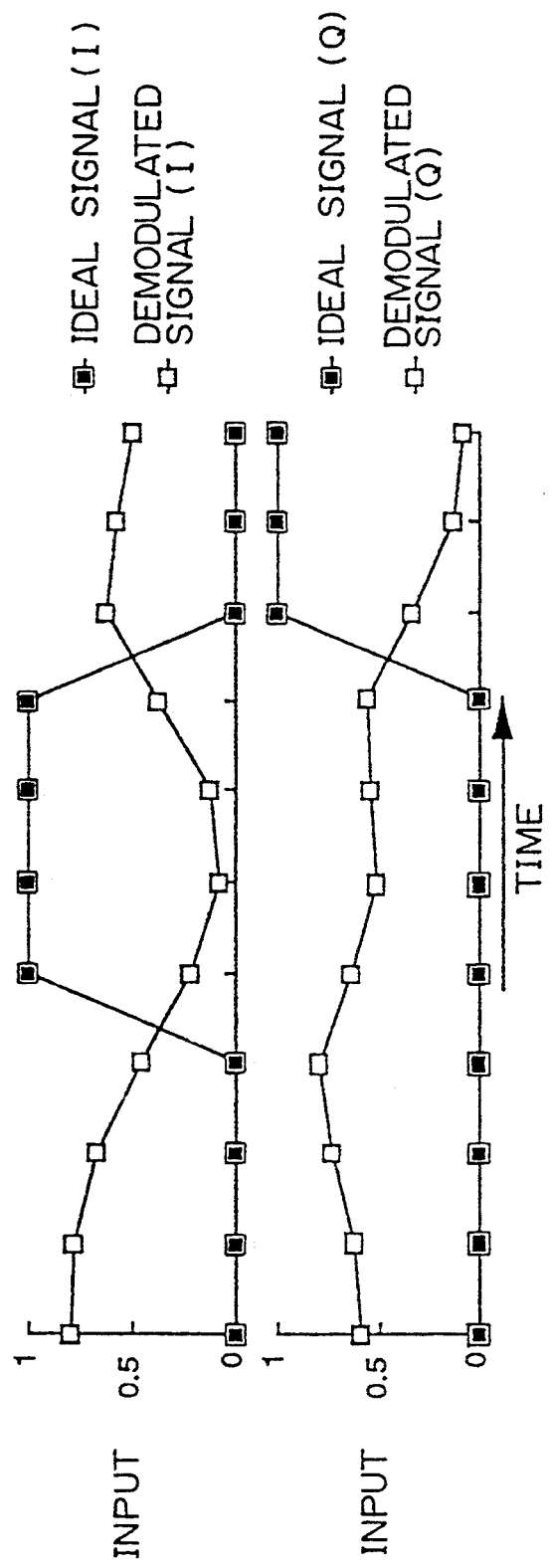
FIG. 15 is a diagram showing input signals of the characteristic detection neural network of FIG. 11.

FIG. 15 is a schematic diagram showing an example of input signals of the characteristic detection neural network of FIG. 11. FIG. 15 shows waveforms of ideal signals and demodulated signals which are actually outputted from the demodulation system 28 on both the I and Q channels. The demodulation system 28 quadruply oversamples one symbol of the original digital signal. Data of eight points for two symbols of ideal values and original digital signals on both the I and Q channels are inputted to the characteristic detection neural network. Thus, the number of input data pieces becomes 32.

When the characteristic detection neural network shown in FIG. 11 is used to detect the transfer function of a transmission line, it is necessary to cause the neural network to learn in advance. This learning process is performed by using values of the real part $X(\omega)$ and the imaginary part $Y(\omega)$ of the transfer function of the transmission line as a teacher signal using for example the back-propagation method.

It is difficult to accurately obtain the transfer function of the real transmission system. In this embodiment, a received signal and the corresponding transfer function are obtained through a simulation. The learning data generation methods are categorized as a first method where computer software for simulating a modulation system, a transmission line, and a demodulation system is created on a computer and then a simulation is executed; and a second method where hardware of modulation and demodulation systems and hardware for simulating the operation of a transmission line model are created and data is experimentally obtained. In this embodiment, the first method using computer simulation is used.

FIG. 16 is a table showing variation of transmission line parameters in the above simulation. FIG. 16 shows variation of $\rho$, $\tau'$, and $\phi'$ in equations (4) and (5). When $\rho=0$, since the effect of a reflected wave can be ignored, there are 25 combinations of $\rho$, $\tau'$, and $\phi'$ of learning data. On the other hand, there are 64 data pieces as combinations of 3-bit data on each channel of I and Q. In addition, since a 1-bit earlier signal value affects the demodulated waveform due to the effect of the reflected wave, all patterns where the bit is varied are generated.

Figure 17:
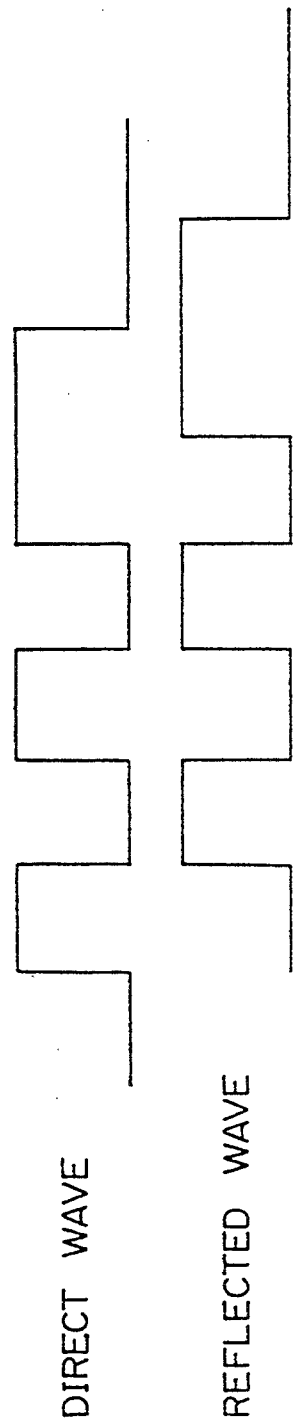
FIG. 17 is a schematic diagram used in describing the necessity to learn all combinations of 3 bits on each channel of I and Q.

FIG. 17 is a schematic for describing the necessity to learn all combinations of 3 bits on each channel of I and Q. In this embodiment, it is supposed that the delay of the reflected wave corresponding to the direct wave is up to 1 bit. The figure also shows digital signals corresponding to the direct wave and the reflected wave where there is a delay of 1 bit. As described above, a received signal of 2 bits is quadruply oversampled on each I and Q channel and then inputted to the characteristic detection neural network. The received signal of 2 bits is affected by the 1 bit that precedes it. Thus, it is necessary to generate all combinations of 3 bits on each I and Q channel and cause the neural network to learn them.

FIG. 18 shows an example of learning data. Since a demodulated signal is oversampled with 4 bits, the same teacher signal is given to four pieces of input data in accordance with said transfer function value at each cycle point. Thus, the total of learning data pieces is $25 \times 64 \times 4 = 6,400$. In addition, as shown in FIG. 19, the learning data is constructed so that it can withstand being out of synchronization.

Figure 20:
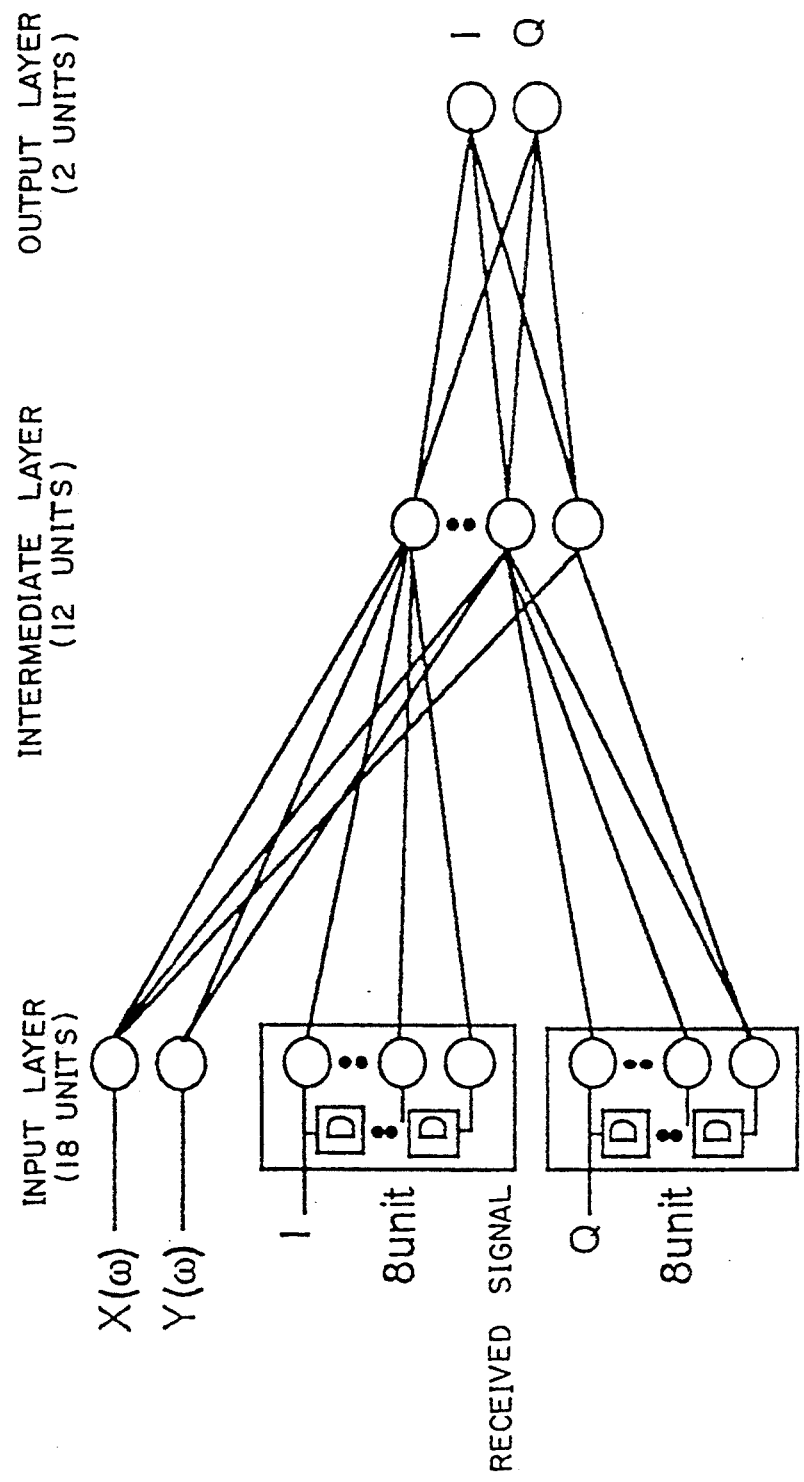
FIG. 20 is a schematic diagram showing an equalizing neural network of an embodiment of the adaptive equalizer of FIG. 6.

FIG. 20 shows an embodiment of the equalizing neural network 30 of FIG. 7A. In FIG. 20, the equalizing neural network is a three-layered hierarchical neural network where each layer is fully linked. The equalizing neural network equalizes an output signal of a demodulation system by a nonlinear process of a neural network so as to remove nonlinear distortions of the transmission line and the demodulation system and to equalize the output signal of the demodulation system to a predetermined value. An output signal of the demodulation system is sent to a low pass filter and then oversampled at a period four times higher than the signal period. Thereafter, the resultant signal is A/D converted and then inputted to each unit in the input layer of the equalizing neural network. In addition, to adaptively compensate variation of the propagation path, the values of the real part and the imaginary part of the transfer function as the transmission line characteristics are inputted. By using these characteristics, the received signal is equalized.

In FIG. 20, there are 18 units in the input layer of the equalizing neural network where 16 units are used for inputting a received signal and two units are used for inputting values of the real part and imaginary part of the transfer function. The output layer has two output units in accordance with the I and Q channels. In addition, the intermediate layer has 12 units which are experimentally determined. The equalizing neural network outputs an ideal center value by using 2-bit data which are quadruply oversampled. Whenever the demodulated signal is sampled, it is shifted and inputted to the equalizing neural network. In addition, whenever the received signal is sampled, the equalized result is continuously outputted. Thus, the data amount of the output signal of each channel of I and Q becomes 1 bit.

Figure 21:
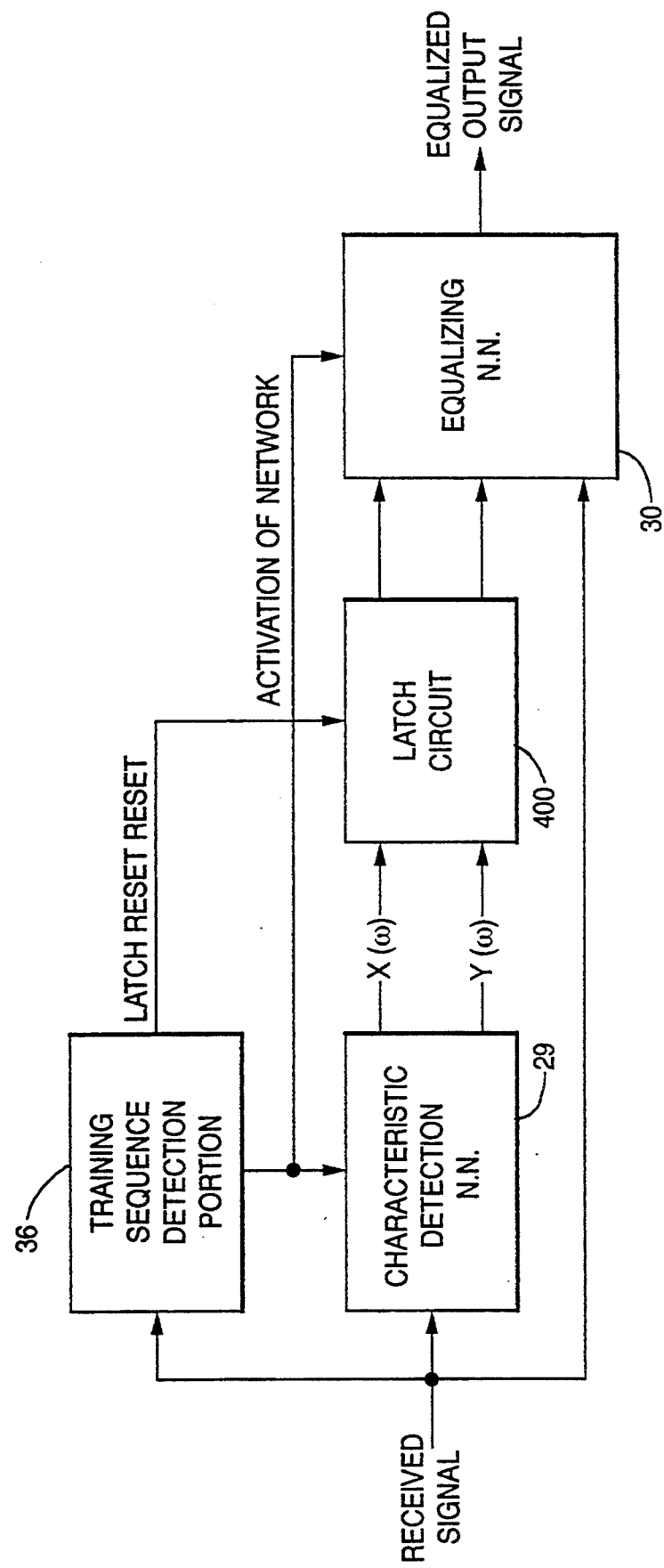
FIG. 21 is a block diagram for describing a data input control system of the equalizing neural network.

FIG. 21 is a schematic diagram describing a control system for inputting data to an equalizing neural network. In FIG. 21, a latch circuit 400, not shown in FIG. 7A, is provided between the characteristic detection neural network 29 and the equalizing neural network 30. The above mentioned training sequence detection portion 36 outputs a latch reset signal to the latch circuit 400. Of course, the training sequence detection portion 36 can be used in common with the training sequence detection portion of the input pattern generation portion of FIG. 12.

Figure 22:
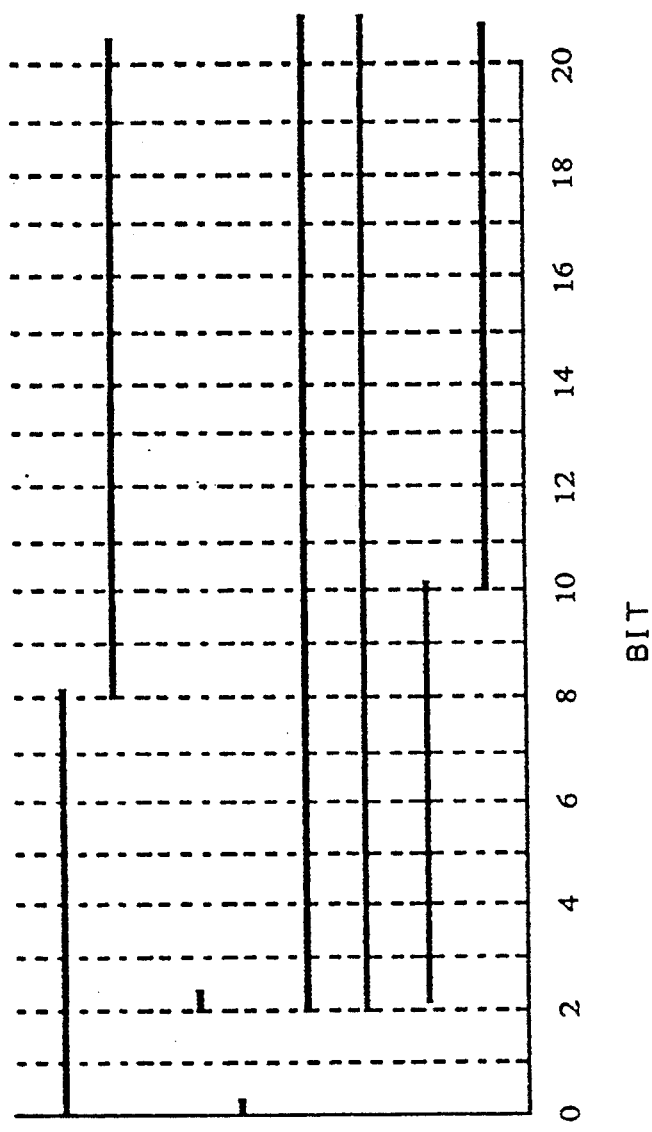
FIG. 22 is a timing chart showing an operation of an embodiment of the equalizing neural network.

FIG. 22 is a timing chart showing an embodiment of the equalizing neural network of the circuit of FIG. 21. Since the timing chart of the I channel is the same as that of the Q channel, the timing chart of one channel is described.

In FIG. 22, the first 8 bits of the received signal represent the output result of the transmission line in accordance with the training sequence of one channel. In addition, the "Information" represents the output result of the transmission line in accordance with unknown input information that follows. First, the latch circuit 400 is reset with a reset signal from the training sequence detection portion 36. The received signal is thereby the inputted to the characteristic detection neural network 29. When the characteristic detection neural network 29 receives 8-bit data quadruply oversampled, which are 2-bit data of the received data in accordance with the training sequence, it outputs the detected characteristics. The result is then latched by the latch circuit 400. At the same time, the equalizing neural network 30 is activated. The received signal in accordance with the training sequence is thereby equalized. After the 8-bit data is completely equalized, the output signal is equalized in accordance with the unknown input information.

Figure 23:
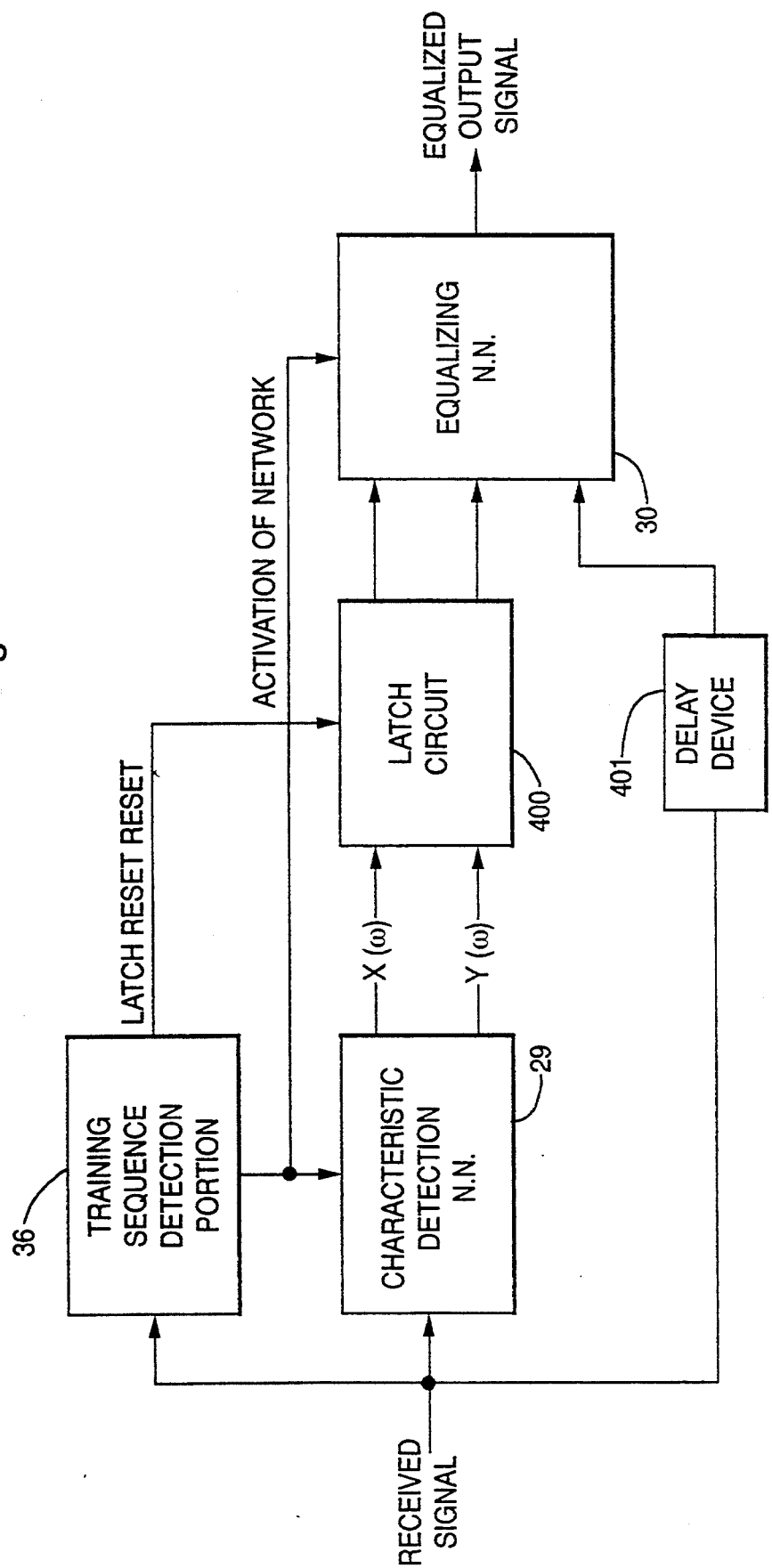
FIG. 23 is a block diagram for describing an operation delay compensation system of the characteristic detection neural network.

In FIGS. 21 and 22, the operation of the equalizing neural network is described assuming that 2-bit data of the training sequence of one channel are used. However, when the characteristics are detected by using more bits of the training sequence, as shown in FIG. 23, to compensate for delay in operation of the characteristic detection neural network 29, the received signal is inputted to the equalizing neural network 30 through a delay device 401.

Figure 24B:
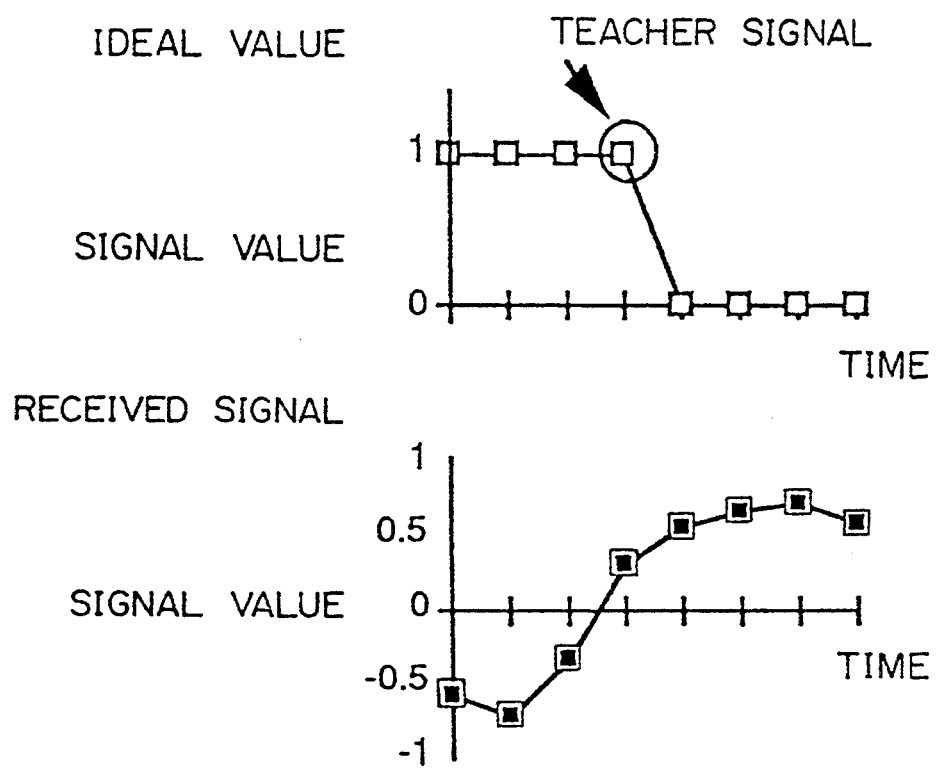
FIG. 24A is a table and 24B is a schematic diagram together used to describe an example of learning data in the equalizing neural network.

FIGS. 24A and 24B show an example of learning data of the equalizing neural network 30. FIG. 24A shows transmission line parameters for learning data of the characteristic detection neural network. The transmission line parameters are data generated in accordance with the parameters of FIG. 16. The values of the real part X and the imaginary part Y of the transfer function are theoretical values obtained from the above equations rather than real output values of the characteristic detection neural network. The total number of learning data pieces is 25×64×4=6400, the same as that of the characteristic detection neural network. The teacher signal uses the value at the middle of 8 points, namely, the value between the fourth and fifth points, in accordance with 2-symbol digital data as shown in FIG. 24B. In other words, to compensate for a delay of one bit, data of 2 bits are inputted and the middle portion thereof is used as the teacher signal. The performance is not remarkably affected by the selection of the fourth point or the fifth point.

Figure 25:
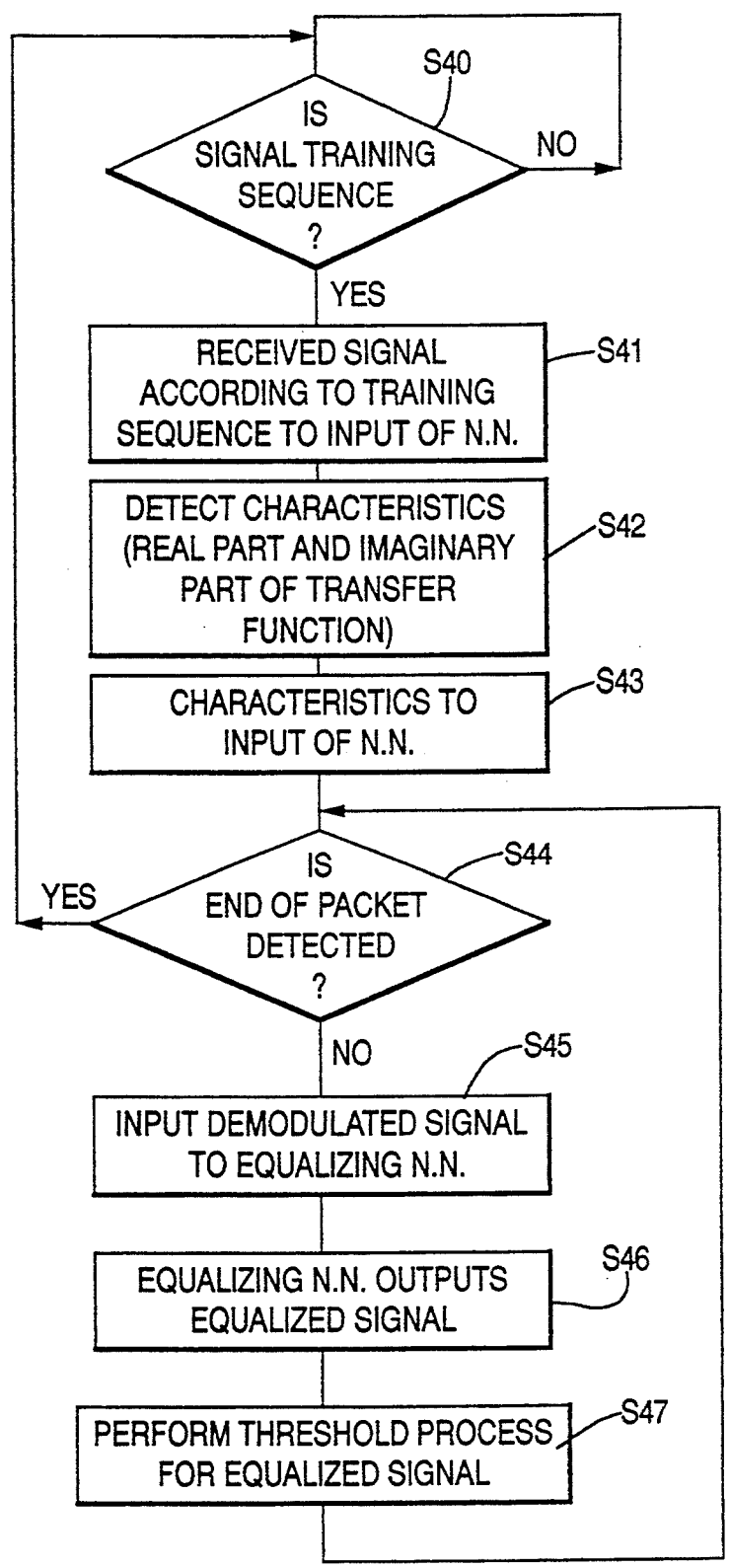
FIG. 25 is a flow chart of an embodiment of the output signal equalizing process in accordance with the first invention.

FIG. 25 is a flow chart of an embodiment of the output signal equalizing process in accordance with the first embodiment of the invention. In FIG. 25, when the process is started, at step S40, a training sequence of a packet is detected. When the training sequence is detected, the bit train of the training sequence and the received signal are stored in each input unit of the characteristic detection neural network at S41. Thereafter, at S42, the real part X and the imaginary part Y of the transfer function are detected as the characteristics of the transmission line.

Thereafter, at S43, the detected characteristic is stored in each input unit of the equalizing neural network. At S44, it is determined whether or not all data of the packet is completely outputted. When all data has not been outputted, at S45, the demodulated signal is stored in each input unit of the equalizing neural network. At S46, the equalizing neural network outputs an equalizing signal. At S47, the threshold process portion 31 shown in FIG. 3 processes the threshold value of the signal and outputs a resultant digital signal. Thereafter, the steps of S44 or later are repeated. At S44, when the end of the packet is detected, the process returns to S40. At this step, the process following the detection of the training sequence in accordance with the next packet is repeated.

Figure 26:
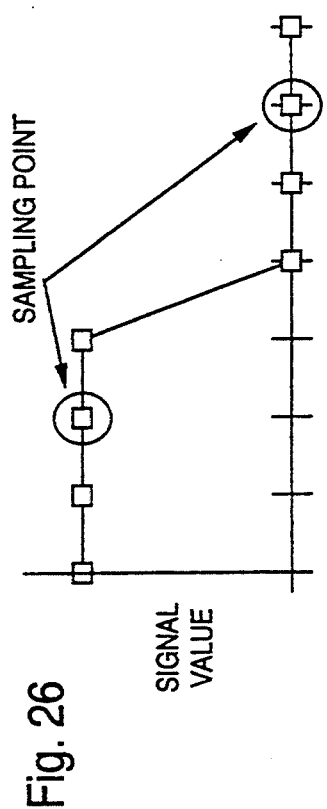
FIG. 26 is a schematic diagram showing sampling points in a signal equalizing experiment in the first embodiment of the invention.

An experimental result of the output signal equalizing process in accordance with the embodiment of FIG. 7A is described in the following. FIG. 26 shows sampling points for use in the experiment. An output signal of the equalizing neural network is sampled at sampling points shown in the figure and then converted into digital data by using a threshold value of 0.5.

Figure 27:
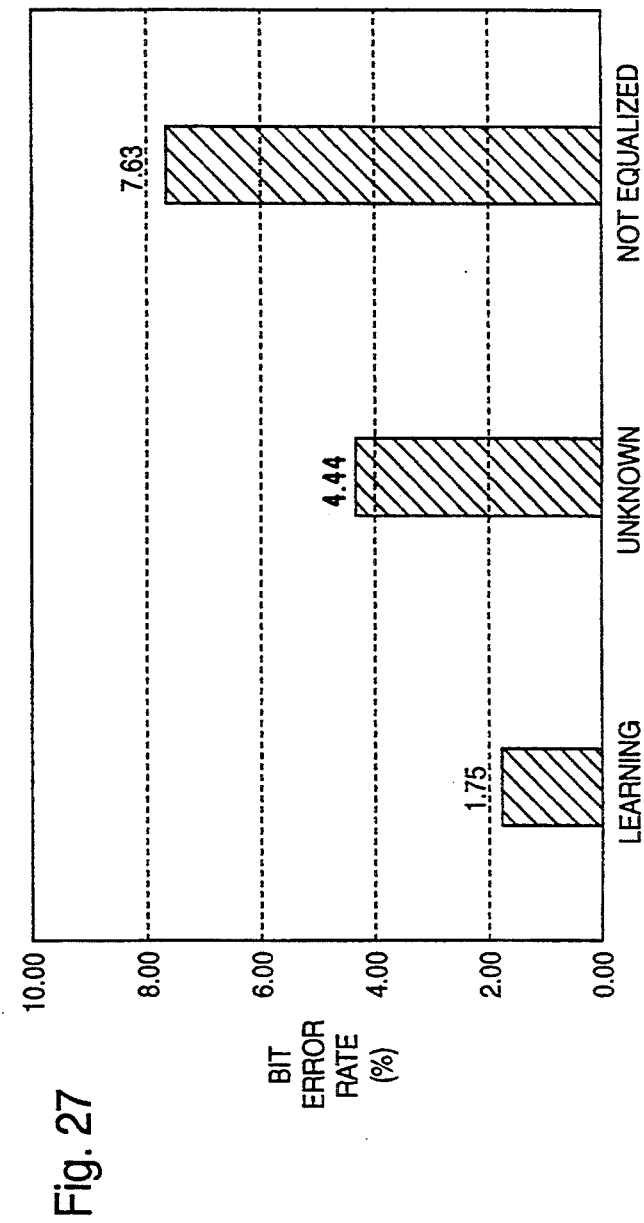
FIG. 27 is a bar chart showing the result of the signal equalizing experiment in the first embodiment of the invention.

FIG. 27 shows a bit error rate of the experimental result. In the figure, "Learning" represents the bit error rate where learning data is equalized in accordance with the present embodiment; "Unknown" represents the bit error rate where unknown data is equalized; and "Not equalized" represents the bit error rate where a received signal is sampled at sampling points shown in FIG. 26 and the threshold process of the signal is performed without the adaptive equalizer in accordance with the present invention.

Figure 28:
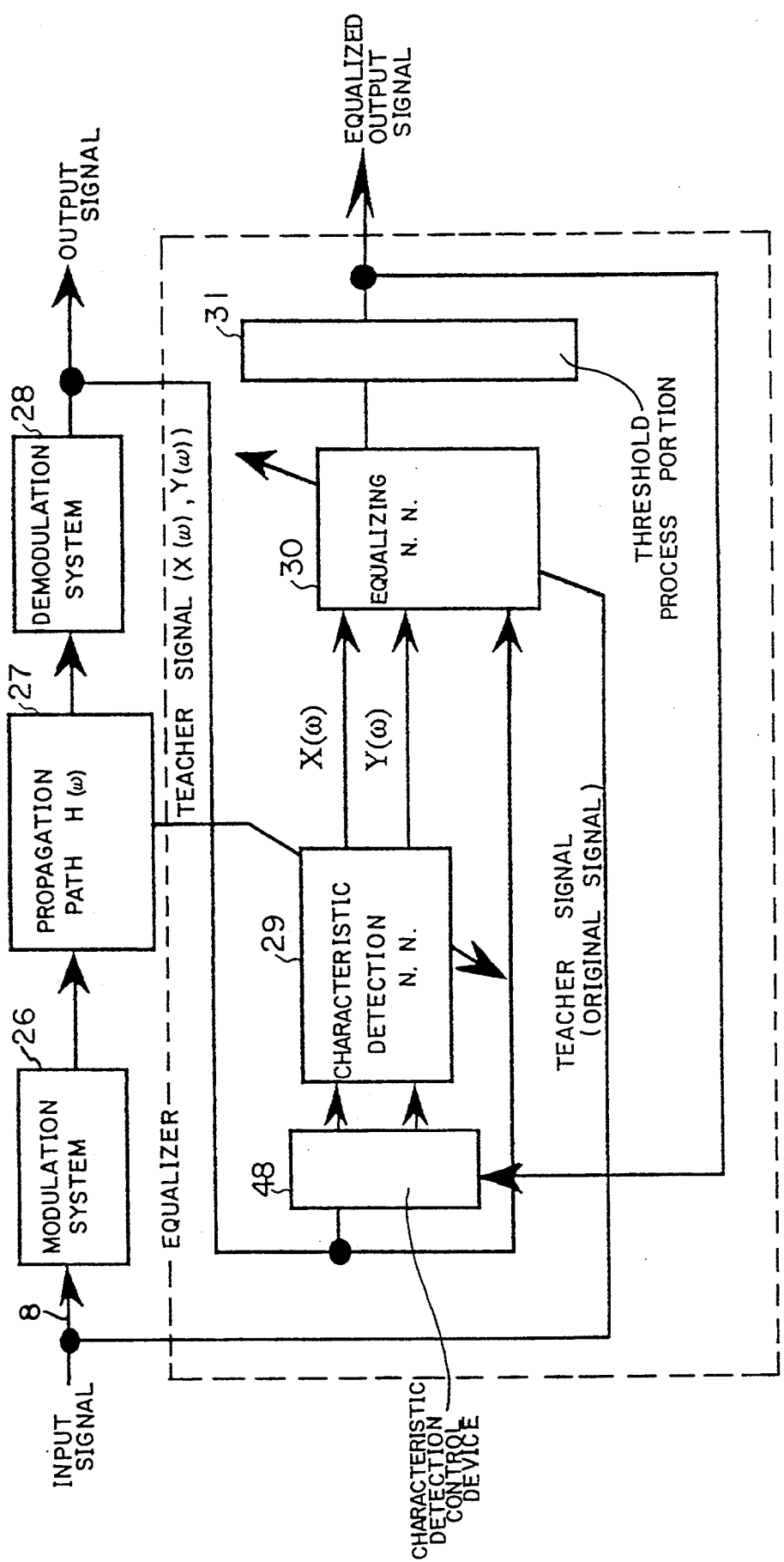
FIG. 28 is a block diagram showing the construction of an embodiment of a feedback type adaptive equalizer in accordance with the first embodiment of the invention.

In the above description, the characteristic detection neural network detects characteristics of a transmission line, for example, a transfer function, by using the first 4 bits (2 bits for each channel of I and Q) of the training sequence at the beginning of a packet. Thereafter, by using the detected result, the equalizing neural network equalizes the remaining portion of the packet, which is an output signal, in accordance with the information portion. However, when the speed of fading is high, even if one packet is received, since the characteristics of the transmission line vary, the packet is not properly equalized. To solve such a problem, a feedback type adaptive equalizer is used. The equalizer treats an equalized output signal, which is output by the equalizing neural network, as a correct input signal, namely a known input signal, after the signal in accordance with the training sequence is received. Thus, the feedback type adaptive equalizer can continue to detect characteristics even after the signal is received. FIG. 28 is a block diagram showing the construction of an embodiment of the feedback type adaptive equalizer.

The construction of the embodiment of FIG. 28 is the same as that of FIG. 6 except that the former is provided with a characteristic detection control device 48, which is a neural network, instead of the input pattern generation portion 24. The characteristic detection control device 48 controls the characteristic detection process of the characteristic detection neural network.

Figure 29:
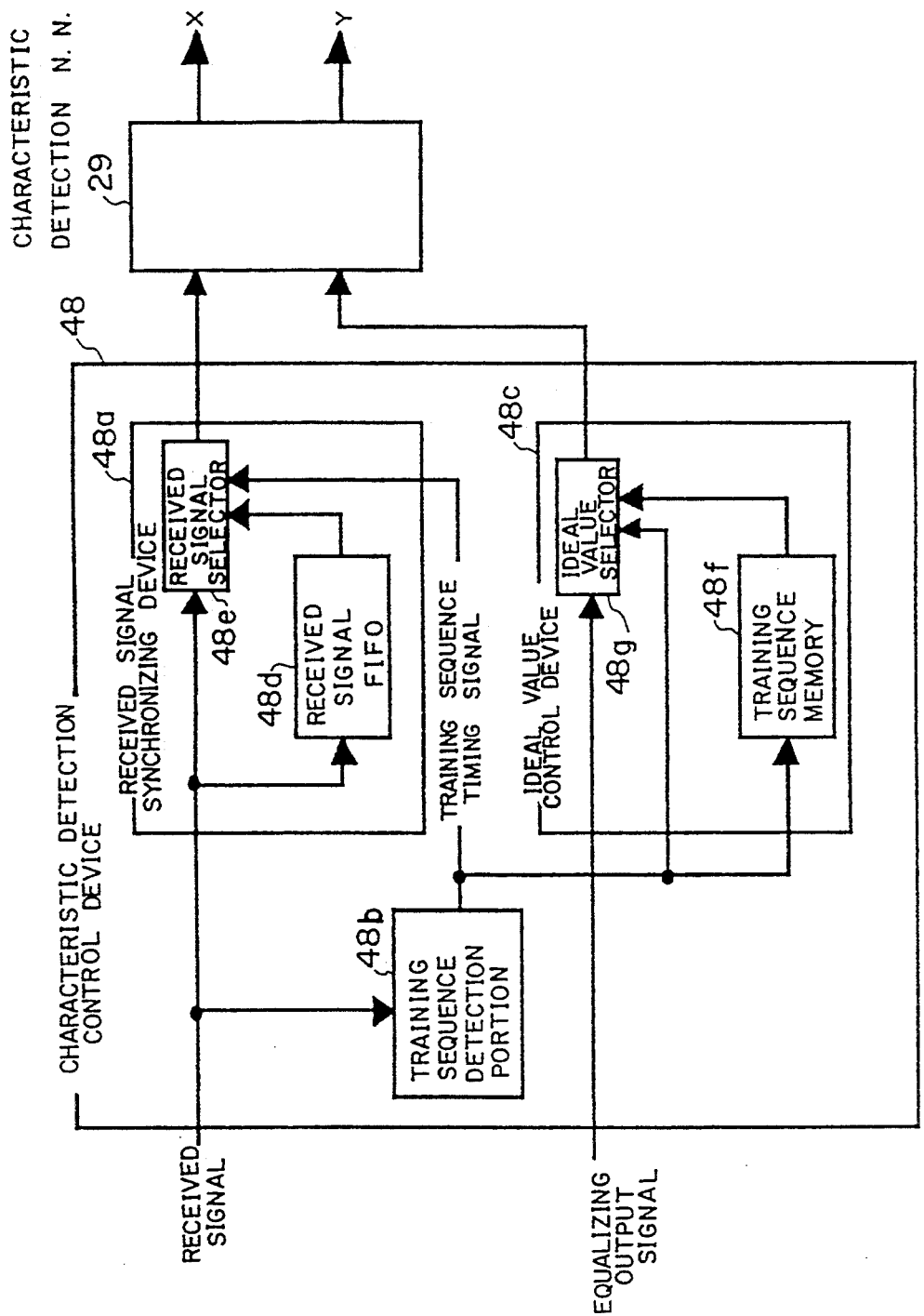
FIG. 29 is a block diagram showing the construction of the characteristic detection control apparatus.

FIG. 29 is a block diagram showing the construction of an embodiment of the characteristic detection control device. In FIG. 29, the characteristic detection control device 48 comprises a received signal synchronizing device 48a for synchronizing a received signal with an ideal value and outputting the received signal to the characteristic detection neural network, a training sequence detection portion 48b for detecting a training sequence from the received signal, and an ideal value control device 48c for outputting an ideal value to the characteristic detection neural network.

The received signal synchronizing device 48a comprises a received signal FIFO 48d for delaying a received signal by 1 bit and an oversampled signal by 4 bits, and a received signal selector 48e for selecting the received signal or the output signal of the received signal FIFO 48d. The ideal value control device 48c comprises a training sequence memory 48f for storing a training sequence, and an ideal value selector 48g for selecting an output signal of the training sequence memory 48f or an equalized output signal and outputting the selected signal. The training sequence detection portion 48b and the training sequence memory 48f of FIG. 29 are the same as those of FIGS. 13 and 14.

Figure 30:
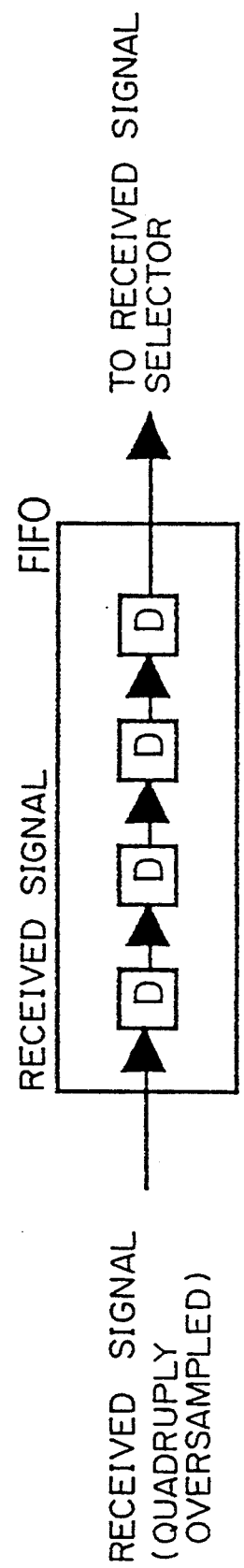
FIG. 30 is a block diagram showing the construction of a received signal FIFO.

FIG. 30 is a block diagram showing the construction of the received signal FIFO 48d of FIG. 29. In the figure, a received signal quadruply oversampled is inputted to the received signal FIFO 48d. The FIFO 48d inputs a quadruply oversampled signal and outputs it to the received signal selector 48e through four delay devices having a ¼ delay period of one bit of the received signal. Then, with reference to FIGS. 29 and 30, the characteristic detection of FIG. 28 is described.

As described above, the training sequence detection portion 48b detects the timings of the beginning and the end of a training sequence and then outputs them to the received signal synchronizing device 48a and the ideal value control device 48c. When the beginning of the training sequence is detected, the received signal selector 48e outputs the received signal by using a timing signal. In addition, the ideal value selector 48g selects the training sequence from the training sequence memory 48f and outputs it. Thus, the characteristic detection neural network treats the training sequence as a known input signal and detects the characteristics of the transmission line.

When the training sequence is completed, the timing signal is outputted once again. At that time, the received signal selector 48e selects the output signal of the received signal FIFO 48d, while the ideal value selector 48g selects the equalized output signal of the equalizing neural network and outputs the signal to the characteristic detection neural network 29. In this case, the delay period of the equalizing operation of the equalizing neural network is one bit of the signal. The received signal FIFO 48d delays the received signal by 1 bit. The delayed signal is outputted to both the equalizing neural network and the characteristic detection neural network 29. Thus, the characteristic detection neural network continues to detect the characteristics of the transmission line by using the equalized output signal instead of the known input signal. Of course, the delay period of the received signal FIFO of FIG. 30 is adjusted in accordance with the delay period of the equalizing neural network.

FIGS. 31A and 31B are timing charts of a signal equalizing process in accordance with the embodiment of FIG. 28. FIG. 31A shows an example of a received signal where the first shadowed portion, or portion from period 0 to period 7, is a training sequence and the portion that follows is an unknown input signal, or a received signal in accordance with the data. Although the received signal is an analog signal, in the figure it is treated as a corresponding digital signal.

As described above, a received signal is quadruply oversampled and then inputted to the adaptive equalizer. Thus, in the time chart shown in FIG. 31B, periods of FIG. 31A are divided into four portions. For example, period 0 is represented by portions 0.0 to 0.3. As shown in FIG. 11, 2 bits of a received signal for each channel of I and Q, or 8 bits of an oversampled signal, are inputted to eight units in the input layer. The eight input signals are represented by t0 to t7, respectively. The shaded signals represent those in accordance with a training sequence like the case shown in FIG. 31A.

The training sequence has 8 bits. Between the periods 7.3 and 8.0, a signal in accordance with a training sequence is switched to that in accordance with the data. At that time, a training sequence (TS) timing signal is outputted. Thereafter, the received signal selector and the ideal value selector shown in FIG. 29 are switched. Thus, the received signal with a delay of 1 bit and the equalized output signal of the equalizing neural network are inputted to the characteristic detection neural network. As shown in FIGS. 24A and 24B, when the equalizing neural network outputs a digital signal in accordance with t4 to the input layer, the equalized output signal can be treated as an ideal value of the received signal.

After a received signal corresponding to a training sequence is received, if the characteristic detection neural network continues to detect characteristics, when the bit error rate of the equalized output signal is low or normal, the characteristics are correctly detected. Thus, errors are not cumulated. When a bit error occurs, the characteristics may not be correctly detected. However, the advantage of follow-up of variation of characteristics of a transmission line is much higher than such a disadvantage.

Figure 32:
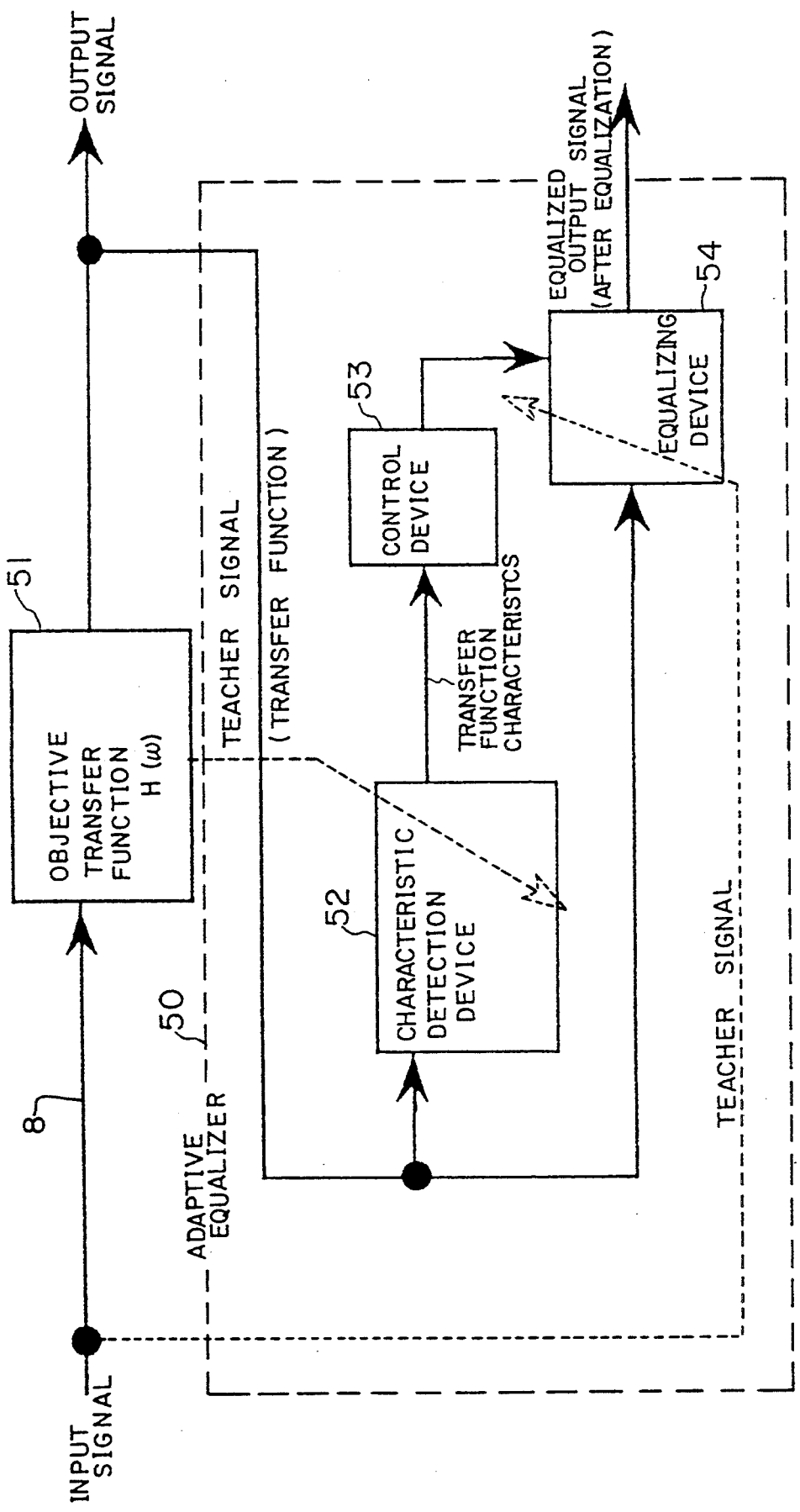
FIG. 32 is a block diagram for explaining the theory of an adaptive equalizer in accordance with the second invention.

FIG. 32 is a block diagram showing a theory of a construction of an adaptive equalizer in accordance with a second embodiment of the invention. The construction of the second embodiment of the invention shown in FIG. 32 is the same as that of the first embodiment of the invention shown in FIG. 5 except that the adaptive equalizer of the second embodiment of the invention is provided with a control device 53 between a characteristic detection device 52 and an equalizing device 54, the control device 55 outputting a control signal for controlling the equalizing operation of an output signal of the equalizing device 54 by using transfer function characteristics detected by the characteristic detection device 52.

Figure 33:
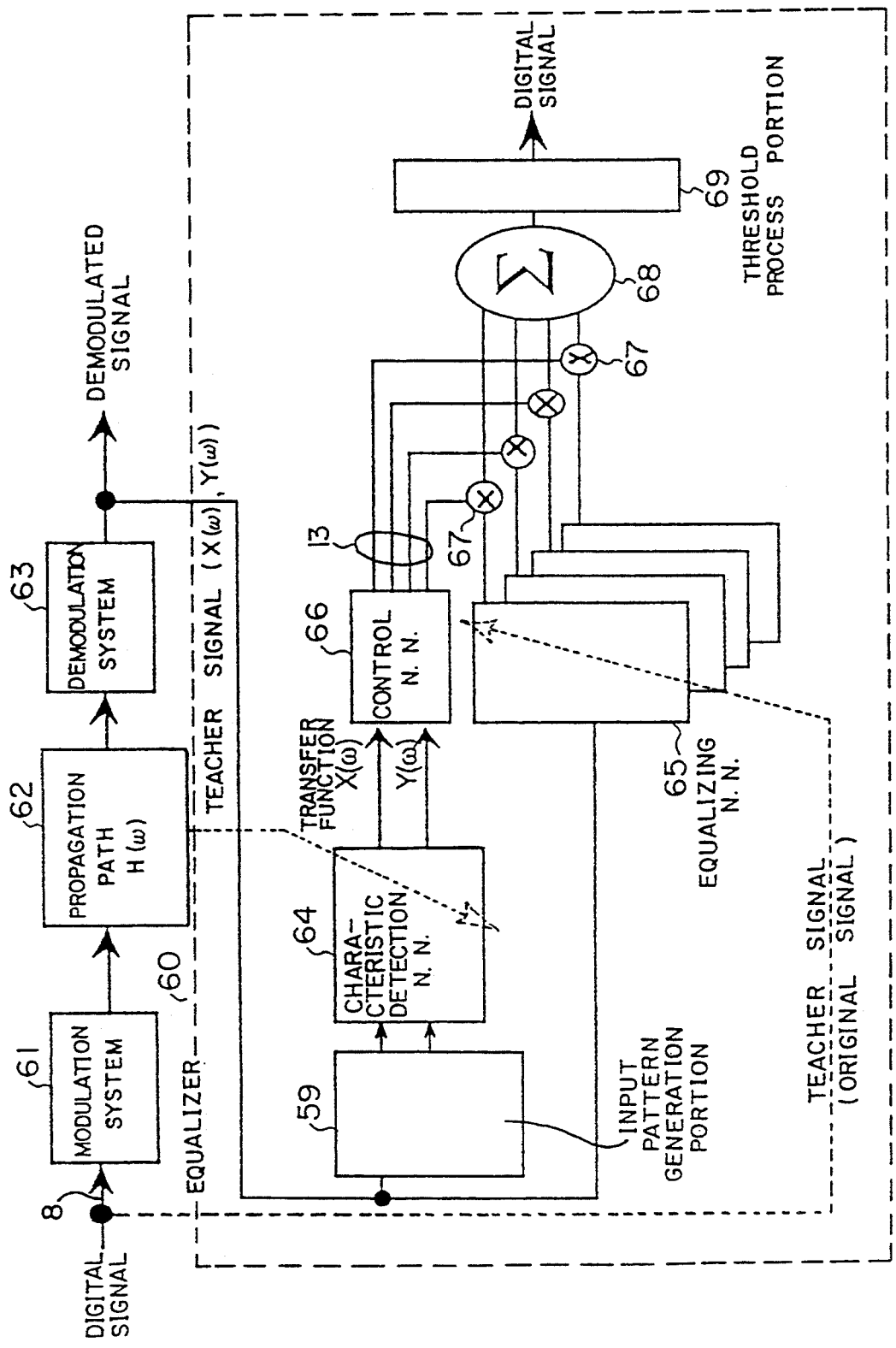
FIG. 33 is a block diagram showing the construction of an embodiment of an adaptive equalizer in accordance with the second invention.

FIG. 33 is a block diagram showing the construction of an adaptive equalizer in accordance with the second embodiment of the invention. The construction of the adaptive equalizer in accordance with the second embodiment of the invention shown in FIG. 33 is the same as that of the adaptive equalizer in accordance with the first embodiment of the invention shown in FIG. 6 except that the adaptive equalizer shown in the second embodiment of the invention is provided with a plurality of equalizing neural networks 65, an output of each equalizing neural network being weighted by a multiplier 67 by using a weighting signal which is outputted from a control neural network 66, each output signal being added by an adder 68 and inputted to a threshold process portion 69.

Since the transmission line model, the modulation system, the demodulation system, the packet format, the characteristic detection neural network, and the learning data of the second embodiment of the invention are the same as those of the first embodiment, they are omitted.

Figure 34:
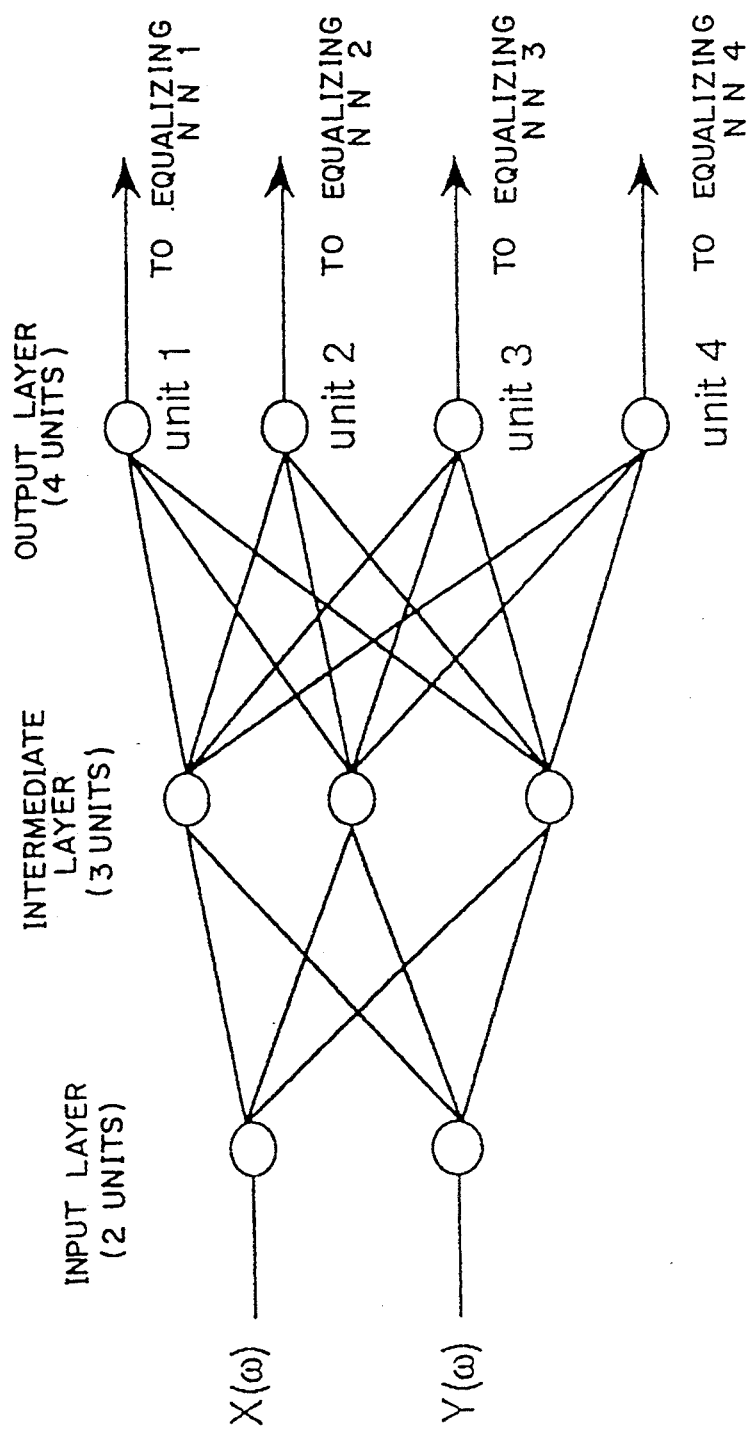
FIG. 34 is a schematic diagram showing a control neural network of an embodiment of the adaptive equalizer of FIG. 33.

FIG. 34 is a diagram schematic showing a control neural network 66 for the second embodiment of the adaptive equalizer illustrated in FIG. 33. In the embodiment shown in FIG. 34, four equalizing neural networks are employed.

In FIG. 34, the input layer of the control neural network has two units for inputting the real part X and the imaginary part Y of the transfer function of the characteristic detection neural network 64. The output layer has four units for outputting weighting signals to the four equalizing neural networks 65. In addition, the intermediate layer has three units.

FIG. 35 is a table showing an example of learning data for use in a control neural network. The four equalizing neural networks of FIG. 33 are used in accordance with respective values of phase difference between a direct wave and reflected wave, namely 0, $\pi/2$, $\pi$, and 3 $\pi/2$. The control neural network performs a learning operation in the following manner. When the phase difference is 0, the output signal of the unit 1 in the output layer of the control neural network is set to 1. When the phase difference is $\pi/2$, the output signal of the unit 2 is set to 1. When the phase difference is $\pi$, the output signal of the unit 3 is set to 1. When the phase difference is 3 $\pi/2$, the output signal of the unit 4 is set to 1.

As described with reference to equations (4) and (5), since the characteristics actually detected by the characteristic detection neural network are phase difference and amplitude ratio, the control neural network weights output signals of the plurality of neural networks for equalizing signals in accordance with a predetermined phase difference.

FIG. 36 is a table showing an example of a learning of data of a control neural network where amplitude ratio $\rho$ and phase difference $\phi$ are varied. In this case, since the neural network is used as a control device, even if X and Y, corresponding to the amplitude ratio and the phase difference which are not learned are inputted, it is expected that a proper weighting signal will be outputted by an interpolation function. For example, when the amplitude ratio is 0.8 and the phase difference is $\pi/4$, it is expected that the output values of units 1 and 2 will be 0.5 and the output values of the units 3 and 4 will be 0.

Figure 37:
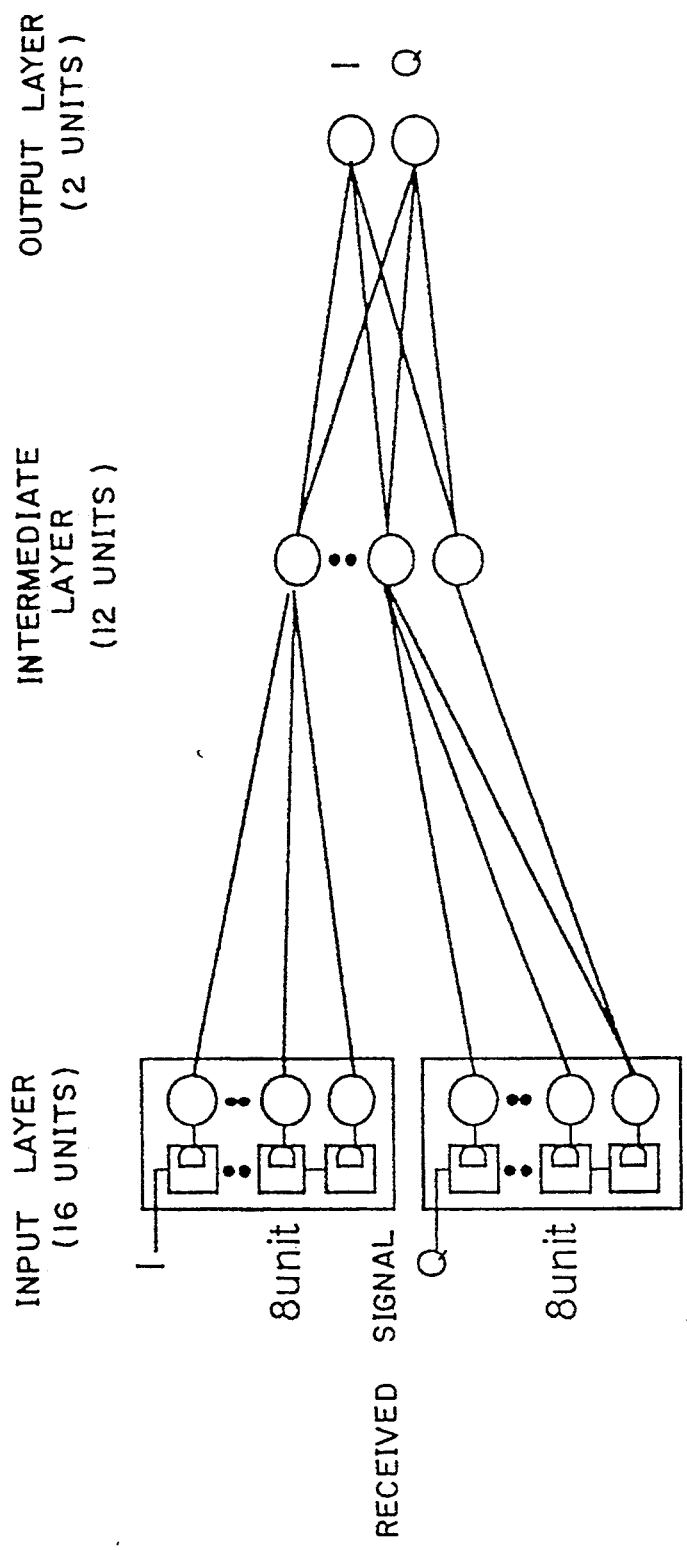
FIG. 37 is a schematic diagram showing an equalizing neural network of an embodiment of an adaptive equalizer of FIG. 33.

FIG. 37 is a schematic diagram showing an equalizing neural network 65 of an embodiment in accordance with the second embodiment of the invention. In the second embodiment of the invention, output signals of a plurality of equalizing neural networks 65 are weighted by using an output signal of the control neural network 66. The output signals are weighted in accordance with the values of the real part X and the imaginary part Y of a transfer function as output signals of a plurality of equalizing neural networks 65. Thus, unlike the equalizing neural network according to the first embodiment of the invention shown in FIG. 20, it is not necessary to input the real part X and the imaginary part Y of the transfer function to the equalizing neural networks 65.

Figure 38:
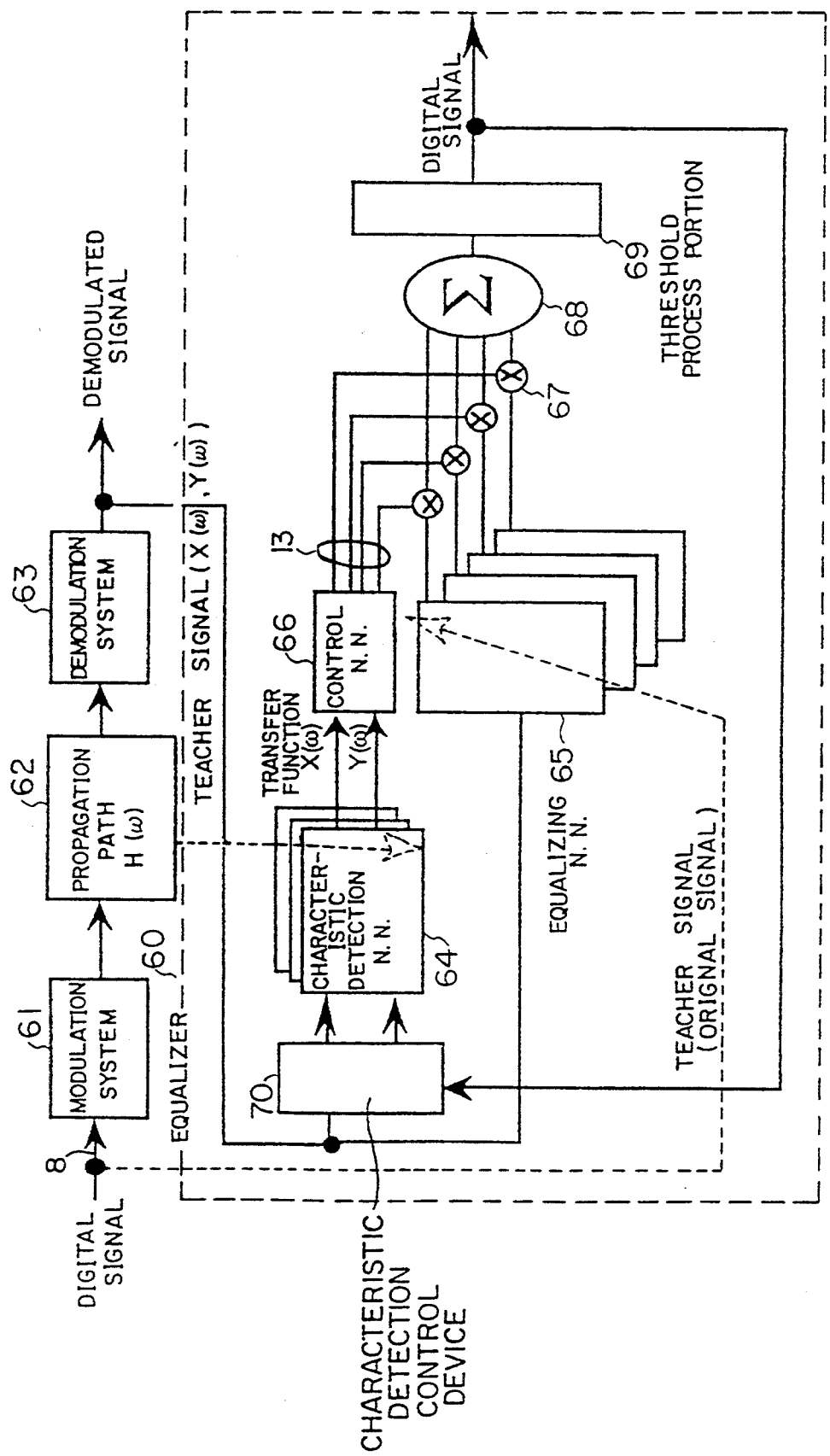
FIG. 38 is a block diagram showing the construction of an embodiment of a feedback type equalizer in accordance with the second embodiment of the invention.

FIG. 38 is a block diagram showing the construction of a feedback type equalizer in accordance with the second embodiment of the invention. The feedback type equalizer continues to detect characteristics even after a signal in accordance with a training sequence is received. The construction of the feedback type equalizer shown in FIG. 38 is the same as that shown in FIG. 33 except that the former feedback type equalizer is provided with a characteristic detection control device 70 instead of the input pattern generation portion. The operation of this characteristic detection control device is the same as that shown in FIGS. 28 through 31A and 31B.

Figure 39:
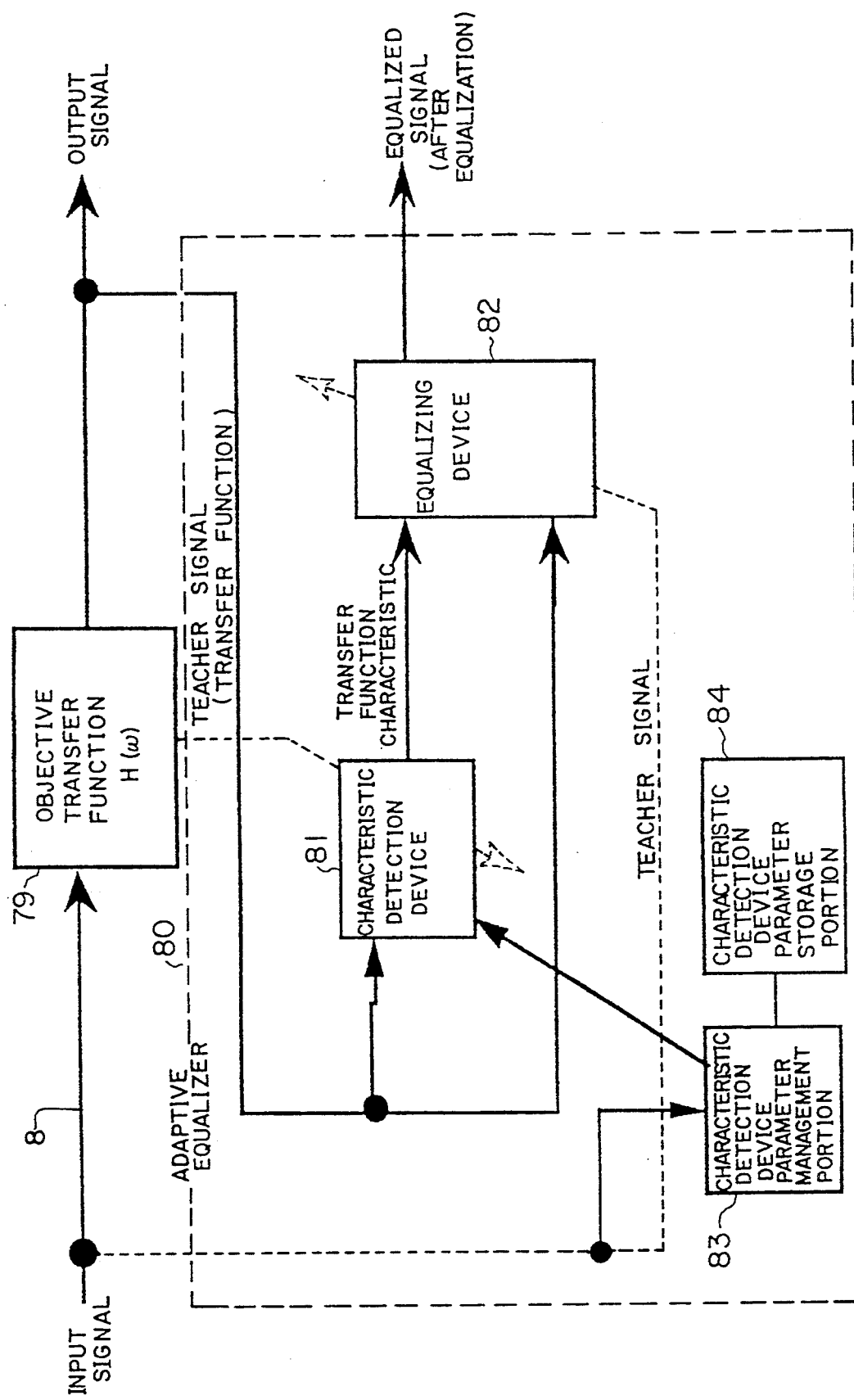
FIG. 39 is a block diagram showing the construction of an adaptive equalizer in accordance with the third embodiment of the invention.

FIG. 39 is a block diagram showing the construction of an adaptive equalizer in accordance with the third embodiment of the invention. In FIG. 39, the adaptive equalizer 80 comprises a characteristic detection device 81 for detecting transfer characteristics of an object to be equalized 79, for example a transfer function H ($\omega$); an equalizing device 82 for equalizing an output signal of the object to be equalized 79 by using the transfer function characteristics being detected; a characteristic detection device parameter management portion 83 for managing parameters for detecting the characteristics; and a characteristic detection device parameter storage portion 84 for storing the parameters.

In FIG. 39, the characteristic detection device 81 and the equalizing device 82 are for example neural networks. The characteristic detection device 81 learns a transfer function of the object to be equalized 79 as a teacher signal. The equalizing device 82 learns a signal which is inputted to the object to be equalized 79 as a teacher signal.

Figure 40:
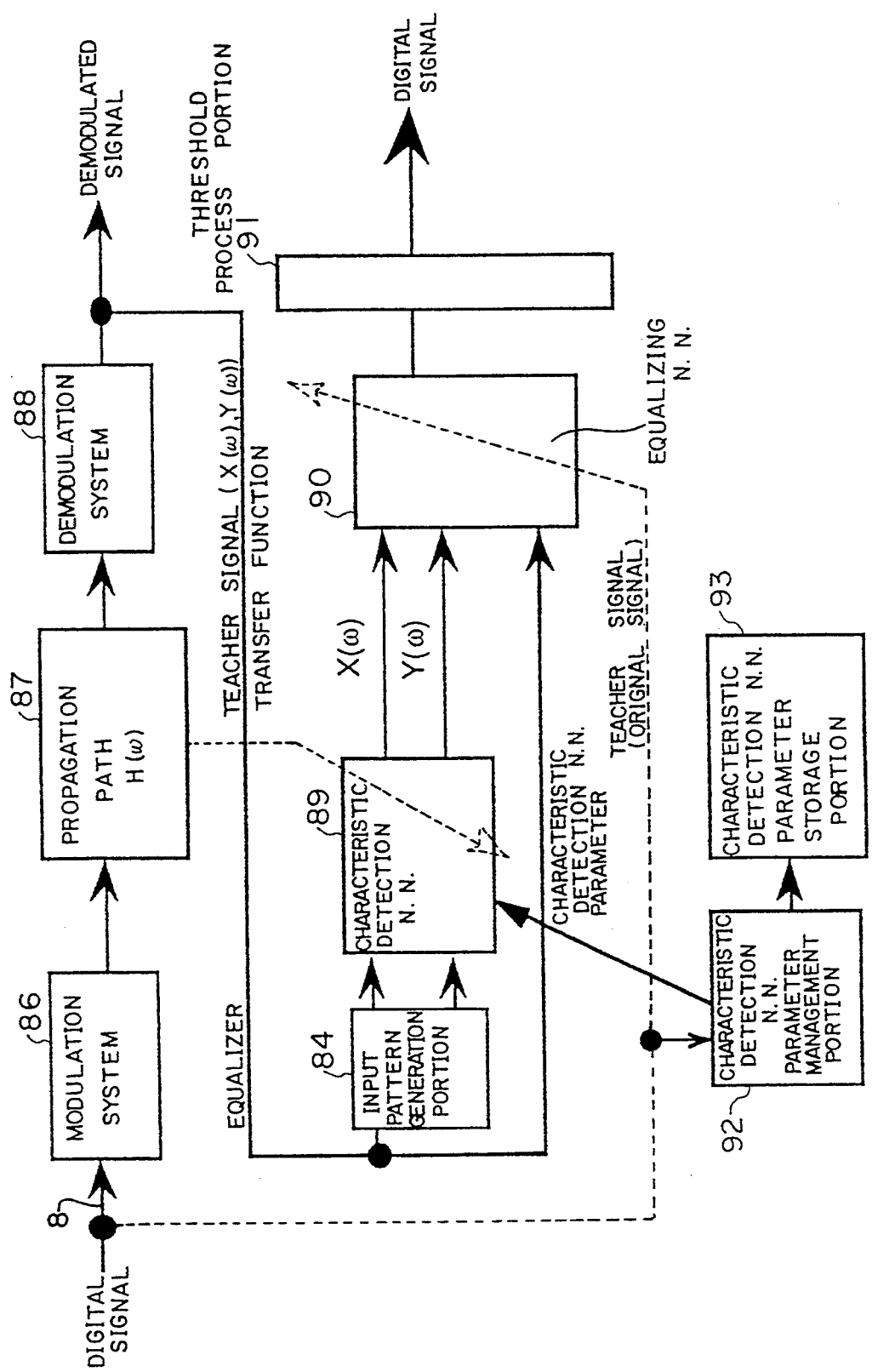
FIG. 40 is a block diagram showing the construction of an embodiment of an adaptive equalizer in accordance with the third embodiment of the invention.

FIG. 40 is a block diagram showing the construction of an adaptive equalizer in accordance with the third embodiment of the invention. In FIG. 40, an object to be equalized 79 comprises a modulation system 86, a propagation path 87, and a demodulation system 88. The adaptive equalizer 80 comprises an input pattern generation portion 84 which is described in the first embodiment of the invention and shown in FIG. 12; a characteristic detection neural network 89, which is equivalent to the characteristic detection device 81 of FIG. 39; an equalizing neural network 90, which is equivalent to the equalizing device 82 of FIG. 39; a threshold process portion 91; a characteristic detection neural network parameter management portion 92, which is equivalent to the characteristic detection device parameter management portion 83; and a characteristic detection neural network parameter storage portion 93, which is equivalent to the characteristic detection device parameter storage portion 84 thereof.

The equalizing operation of a received signal shown in FIG. 40 is the same as that shown in FIG. 6 except that characteristics are detected by the characteristic detection neural network 89 with a bit pattern of a training sequence as will be described later. The characteristic detection neural network parameter management portion 92 and the characteristic detection neural network parameter storage portion 93 are described in detail later.

Since the transmission line model, the modulation system, the demodulation system, and the packet format of the third embodiment of the invention are the same as those of the first embodiment of the invention, their description is omitted.

Figure 41:
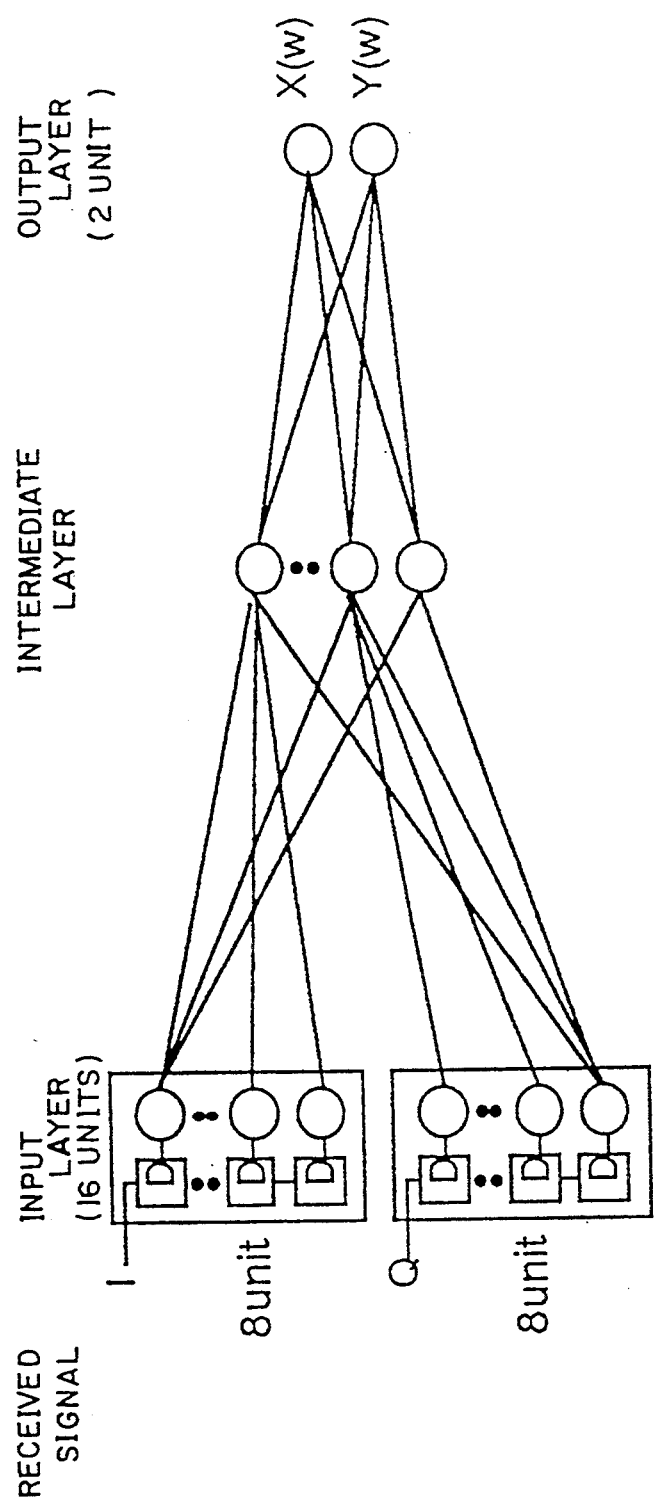
FIG. 41 is a schematic diagram showing a characteristic detection neural network of an embodiment of the adaptive equalizer of FIG. 40.

FIG. 41 is a schematic diagram showing an embodiment of the characteristic detection neural network 89 of FIG. 40. In FIG. 41, the characteristic detection neural network 89 is a three-layered hierarchical neural network in which each layer is fully linked. There are 16 input units to which an actual received signal is input as an output signal of demodulation system 88. The output layer has two units which output values of the real part and the imaginary part of a transfer function of a transmission line. The number of units in the intermediate layer is determined through an experiment or the like.

In FIG. 41, a bit train of a received signal is inputted to each unit on each channel of I and Q in the input layer through a delay device (shift register) D, the bit train having 8 bits. In accordance with the input pattern, by using the internal state value according to the bit pattern of a known training sequence, or a weight of linkage, the characteristic detection neural network detects a transfer function of a transmission line and then outputs the values of the real part X ($\omega$) and the imaginary part Y ($\omega$) thereof.

The signal which is inputted to the characteristic detection neural network is only a demodulated signal of the first embodiment of the invention shown in FIG. 15. Since the number of points of the signal is 8 for each channel of I and Q, the total number of points of input data is 16.

Figure 42:
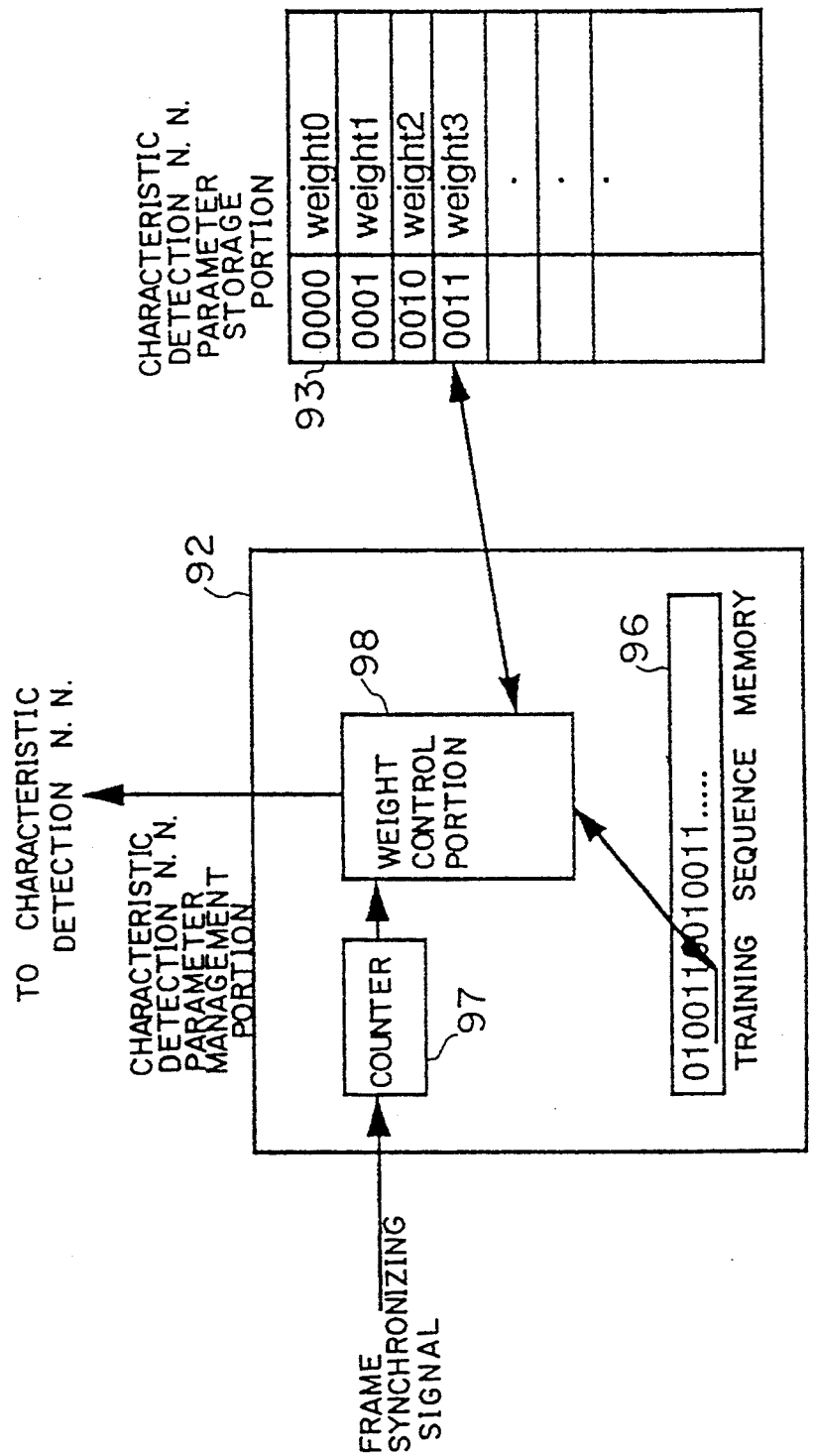
FIG. 42 is a block diagram showing the construction of an embodiment of the characteristic detection neural network parameter management portion.

FIG. 42 is a block diagram showing the construction of an embodiment of the characteristic detection neural network parameter management portion 92. In FIG. 42, the characteristic detection neural network parameter management portion 92 comprises a training sequence memory 96 for storing a training sequence; a counter 97 for receiving a frame synchronizing signal, which represents the beginning of a training sequence, and outputting a counted value; and a weight control portion 98 for retrieving a weight in accordance with a bit train stored in the training sequence memory 96 in accordance with the counted value output from the counter and outputting the weight to the characteristic detection neural network.

In this embodiment, a digital signal and a training sequence are successively assigned to each channel as IQIQIQ . . . and orthogonally modulated. Thus, I and Q accord with 01 and 01, respectively, of the underlined bit train 0011 stored in the training sequence memory 96 of FIG. 42. In this embodiment, 16 parameters for detecting the characteristics are generated in accordance with 16 types of detection patterns of I=00 and Q=00; I=00 and Q=01, . . . , I=11 and Q=11. These parameters are stored in the characteristic detection neural network parameter storage portion 93.

In FIG. 42, the counter 97 is reset by a frame synchronizing signal supplied from the outside. Thereafter, the counter value increases in accordance with the signal frequency. This value is sent to the weight control portion 98. The weight control portion 98 reads a bit pattern in accordance with the counter value from the training sequence memory 96. In accordance with the bit pattern, the weight control portion 98 outputs the weight of the internal linkage of the characteristic detection neural network to the characteristic detection neural network as a parameter of the characteristic detection neural network. The characteristic detection neural network thereby detects the characteristics of the transmission line by using the weight value in accordance with the current input bit pattern (2 bits for each channel of I and Q).

Figure 43:
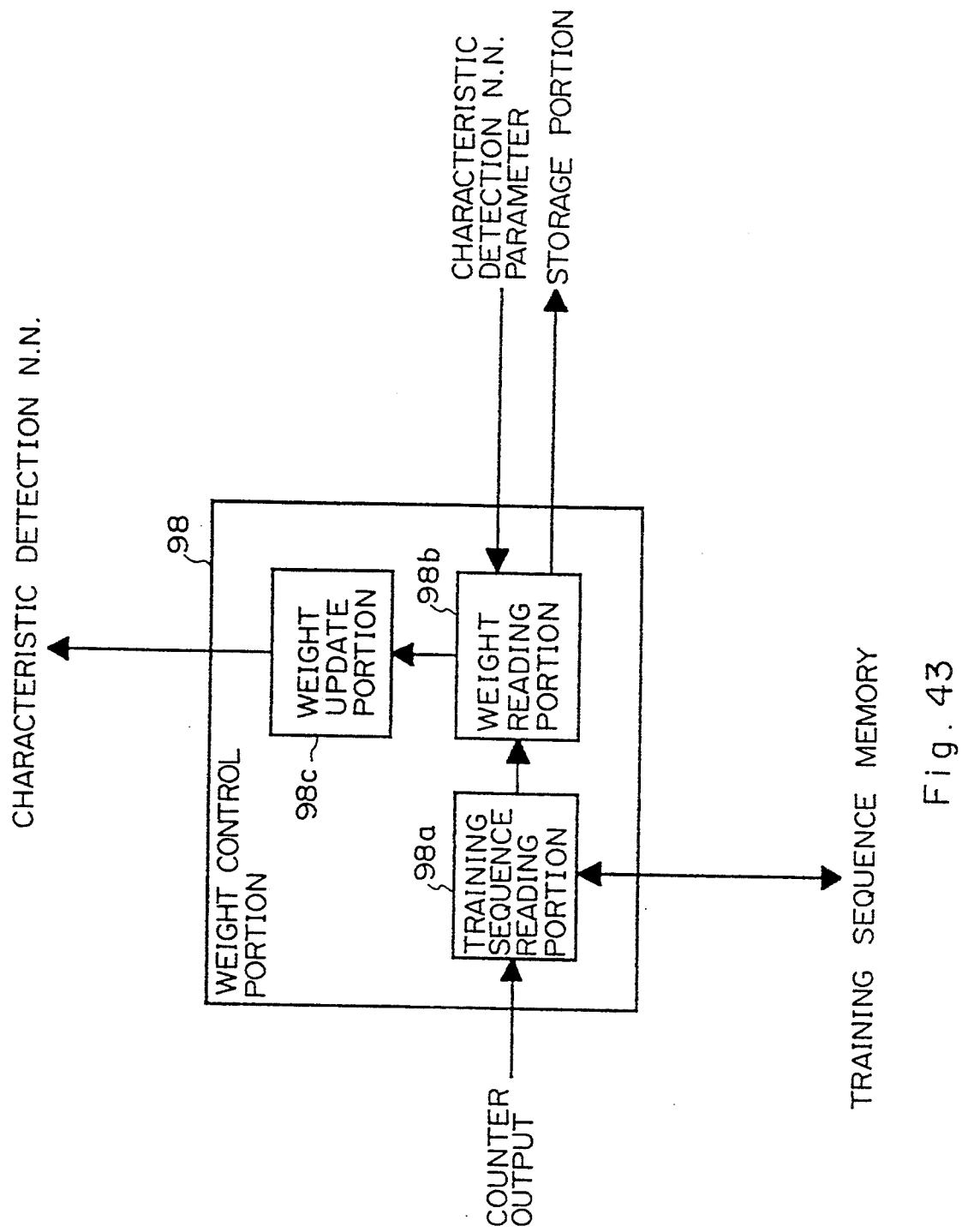
FIG. 43 is a block diagram showing the construction of the weight control portion.

FIG. 43 is a block diagram showing the construction of the weight control portion of FIG. 42. In FIG. 43, the weight control portion 98 comprises a training sequence reading portion 98a for reading the content of a training sequence memory in accordance with an output signal of a counter; a weight reading portion 98b for reading a characteristic detection neural network parameter, or a weight, which is in accordance with 4 bits of a training sequence sent from the characteristic detection neural network parameter storage portion; and a weight update portion 98c for updating a weight of the characteristic detection neural network by using an output signal of the weight reading portion 98b.

Since the simulation of the transfer function of the transmission line and the parameter of the transmission line, and so forth of the third embodiment of the invention are the same as those of the first embodiment of the invention, their description is omitted.

The learning data of the characteristic detection neural network of FIG. 44 is the same as that of FIG. 18 except that the former learning data does not include an ideal signal which represents a training sequence as an input signal. In addition, the learning data of FIG. 44 has a countermeasure against out-of-synchronization like that in FIG. 19.

Since the equalizing neural network, the learning data, and the flow chart of the output signal equalizing process of the third embodiment of the invention are the same as those of the first embodiment of the invention, their description is omitted. However, in the flow chart of the equalizing process, at S41 of FIG. 25 in accordance with the first embodiment of the invention, a neural network parameter in accordance with a training sequence rather than the training sequence itself is stored in the characteristic detection neural network.

Figure 45:
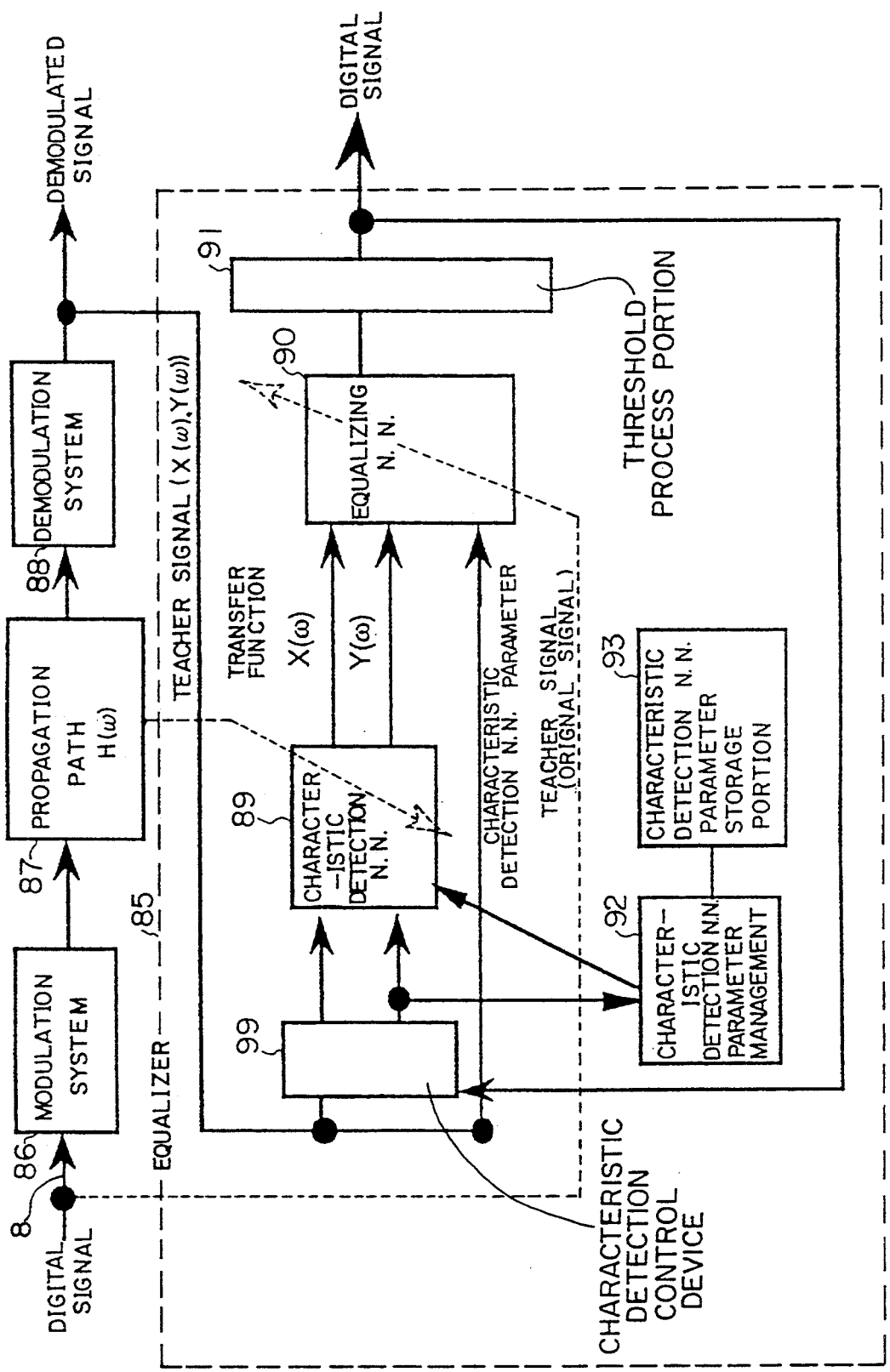
FIG. 45 is a block diagram showing the construction of a feedback type adaptive equalizer in accordance with the third embodiment of the invention.

FIG. 45 is a block diagram showing the construction of an embodiment of a feedback type equalizer. The feedback equalizer continues to detect characteristics after a signal in accordance with a training sequence is received. In FIG. 45, the characteristic detection control device is provided with a characteristic detection control device 99 instead of the input pattern generation portion like that in FIGS. 28 and 38. The operation of the characteristic detection control device of FIG. 45 is the same as that of FIG. 28.

Figure 46:
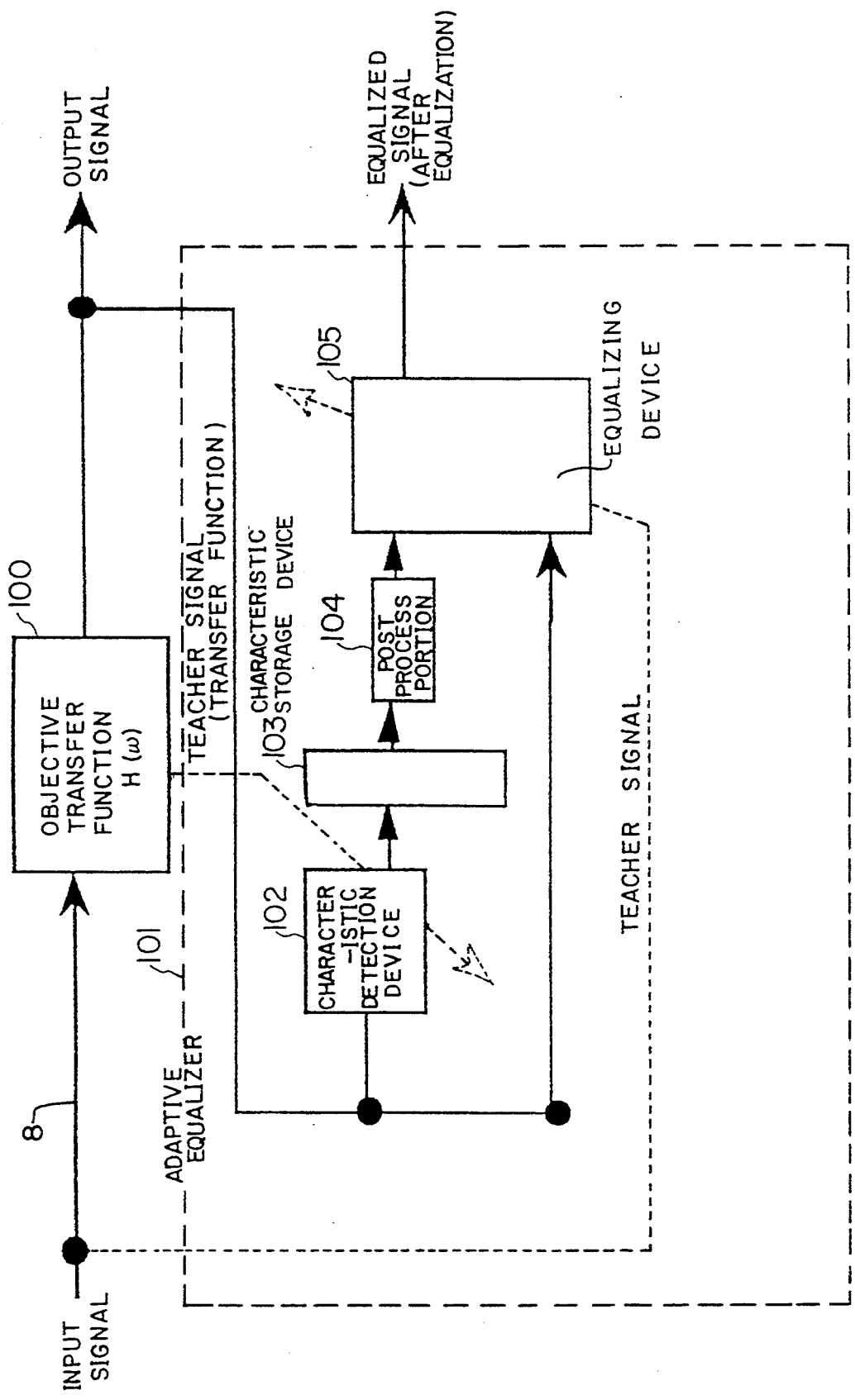
FIG. 46 is a block diagram showing the construction of an adaptive equalizer in accordance with the fourth embodiment of the invention.

FIG. 46 is a block diagram showing the construction of an adaptive equalizer in accordance with the fourth embodiment of the invention whose theory is illustrated in FIG. 3. The construction of the adaptive equalizer of the fourth embodiment of the invention is the same as that of the third embodiment of the invention except that in the former construction a characteristic storage device 103 and a post-process portion 104 are provided between a characteristic detection device 102 and an equalizing device 105 and that the characteristic detection device parameter management portion 83 and the storage portion 84 are not provided.

The characteristic detection device 102 shifts the above training sequence, for example bit by bit, and detects transfer function characteristics of an object to be equalized by using a signal which is outputted therefrom in a time series manner. Thereafter, the characteristic detection device 102 outputs the result to the characteristic storage device 103. The characteristic storage device 103 is for example a shift register. The characteristic storage device 103 shifts and stores the result until the detected result of the characteristics is outputted from the characteristic detection device 102 a predetermined number of times. After the detected characteristic is stored the predetermined number of times, the post-process portion 104 performs a post-process, for example a statistical process, in accordance with the detected result. By averaging the errors of the detected result, the characteristics are stably and accurately detected.

Figure 47:
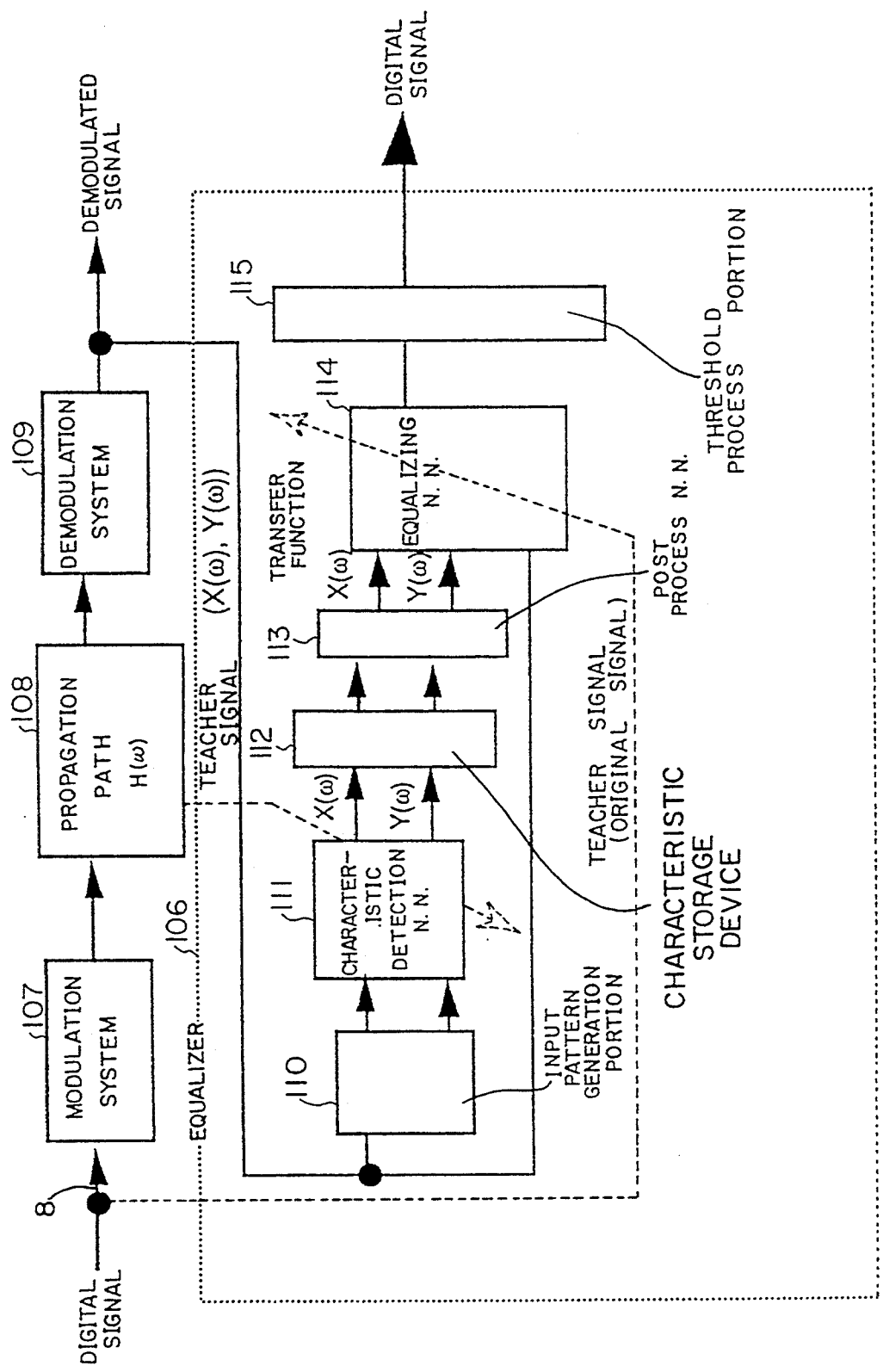
FIG. 47 is a block diagram showing the construction of an embodiment of an adaptive equalizer in accordance with the fourth embodiment of the invention.

FIG. 47 is a block diagram showing the construction of the adaptive equalizer in accordance with the fourth embodiment of the invention. The construction of FIG. 47 in accordance with the fourth embodiment of the invention is the same as that of FIG. 40 in accordance with the third embodiment of the invention except that in the former construction a characteristic storage device 112 and a post-process neural network 113 are provided between a characteristic detection neural network 111 and an equalizing neural network 114 and that the characteristic detection neural network parameter management portion and the storage portion thereof are not provided. The equalizing neural network 114 equalizes a demodulated signal which is outputted from the demodulation system 109 by using the values of the real part $X(\omega)$ and the imaginary part $Y(\omega)$ which are outputted from the post-process neural network 113.

Figure 48:
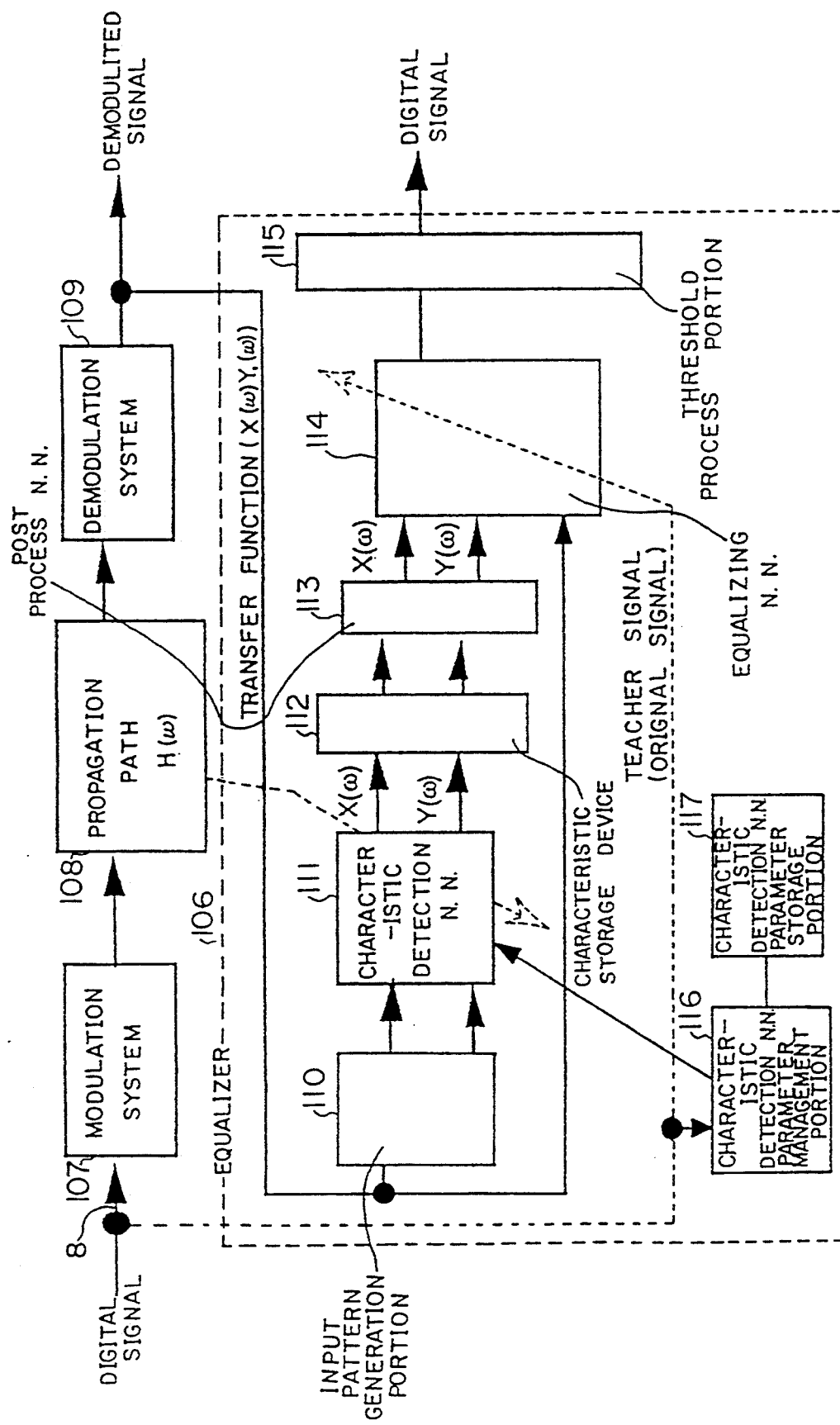
FIG. 48 is a block diagram showing the construction of an embodiment of an adaptive equalizer using characteristic detection parameters according to a bit pattern in accordance with the fourth embodiment of the invention.

Like the third embodiment of the invention, according to the fourth embodiment of the invention, the characteristic detection neural network 111 can detect characteristics by using a detected parameter, which is a weight value, in accordance with the bit pattern of a signal. FIG. 48 is a block diagram showing the construction of an adaptive equalizer in accordance with the fourth embodiment of the invention. The adaptive equalizer uses a characteristic detection parameter corresponding to a bit pattern. As in the construction of FIG. 40 in accordance with the third embodiment of the invention, the characteristic detection neural network 111 of the fourth embodiment of the invention is provided with a characteristic detection neural network parameter management portion 116 for outputting a weight value to the characteristic detection neural network 111; and a characteristic detection neural network parameter storage portion 117.

In FIG. 48, for example 4 bits of training sequence are retrieved from the beginning thereof at a time and the corresponding characteristic detection parameter is used. Characteristic detection parameters corresponding to bit trains in the order of 0100 (where I=00 and Q=10), 1001, 0011, ... etc. are used.

Next, the difference between the fourth embodiment of the invention and the third embodiment of the invention is described.

Figure 49:
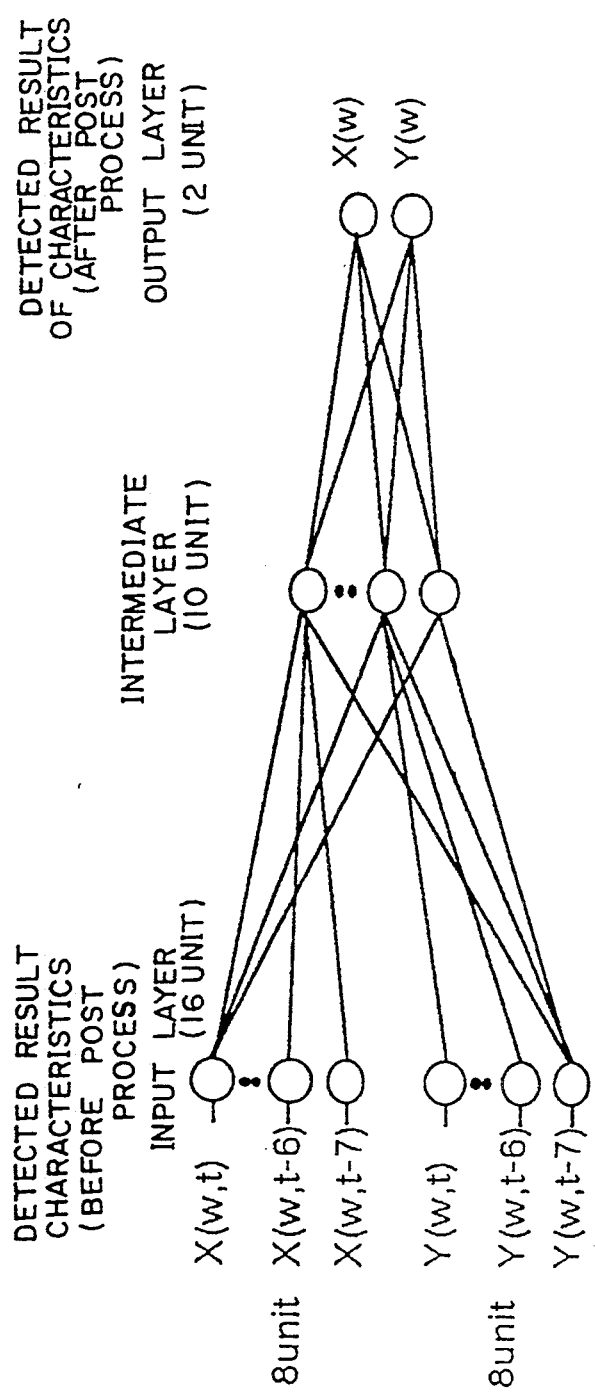
FIG. 49 is a schematic diagram showing an embodiment of a post-process neural network.

FIG. 49 is a schematic diagram showing an embodiment of a post-process neural network. The post-process neural network has three layers: an input layer, an intermediate layer, and an output layer. The input layer has 16 input units for inputting the values of the real part $X(\omega)$ and the imaginary part $Y(\omega)$ of the transfer function for the present period and the past 7 periods (t−7). The intermediate layer has 10 units. The output layer has two units for outputting the values of the real part X and the imaginary part Y of the transfer function. The post process neural network uses output signals at the present period t and the past periods of the characteristic detection neural network 111 and outputs for example an average value of the values of the real part and the imaginary part of the transfer function. The post-process neural network thereby determines the characteristics of the transmission line at the period t.

In FIG. 49, the values of the real part and the imaginary part at the present period t and the past 7 periods are used. However, the number of periods depends on the storage capacity and the calculation time. Thus, of course the number of periods is not limited to 8.

FIG. 50 is a table showing an example of learning data of the post-process neural network. When the post-process neural network executes a learning process, it inputs a periodic pattern of the characteristics of the transmission line detected by the characteristic detection neural network and outputs theoretical values of the characteristics as a teacher signal. As shown in FIG. 50, the characteristic detection neural network does not always output correct characteristics. Rather, the accuracy of detected characteristics is improved through the learning process.

The learning data of the post-process neural network is generated as follows. At the first, a received signal corresponding to a training sequence is inputted to the characteristic detection neural network and then characteristic values are outputted. Thereafter, the periodic pattern of the output characteristic values is inputted as learning data. Thereafter, the corresponding ideal characteristic values are treated as a teacher signal.

Figure 51:
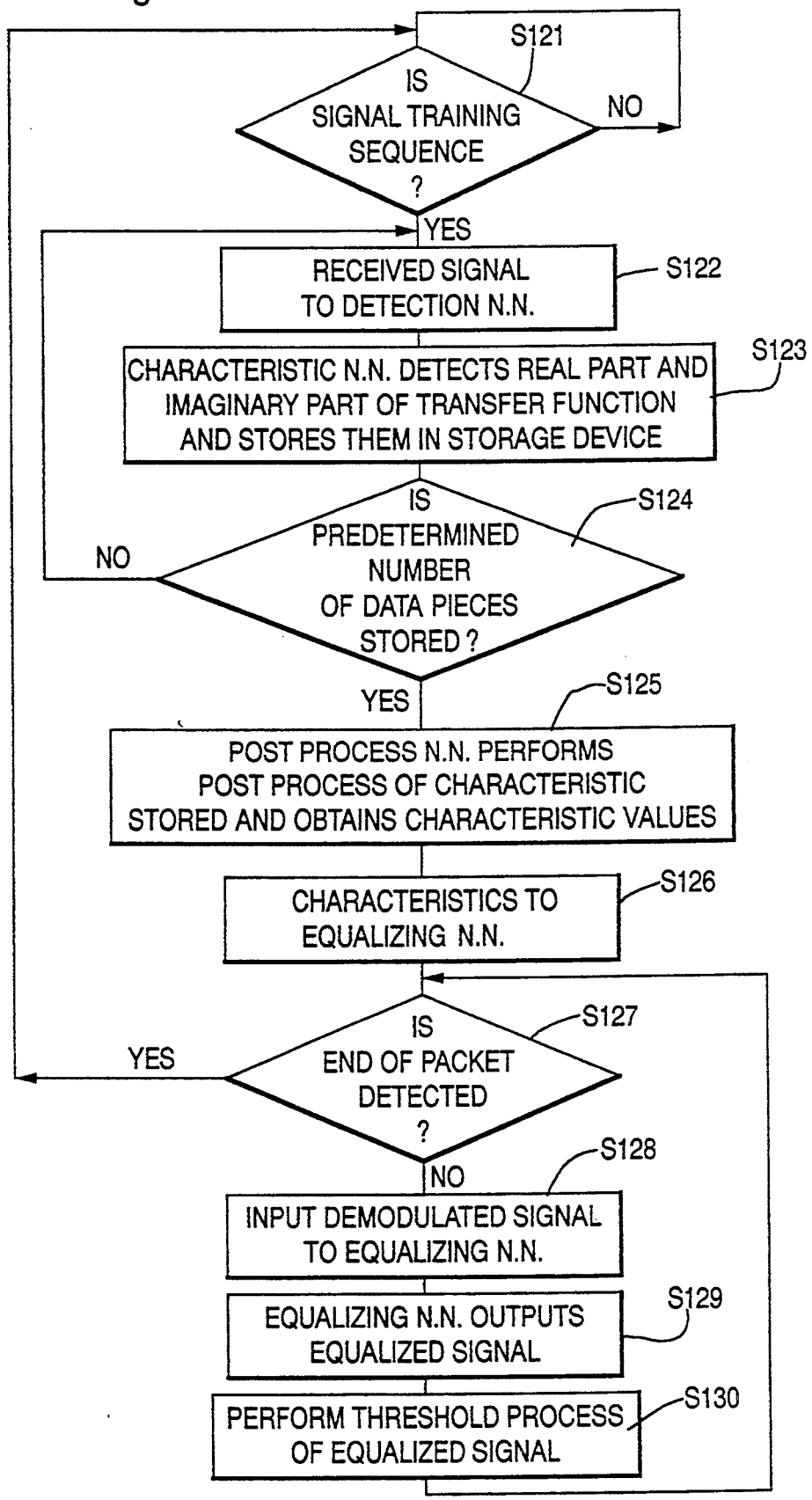
FIG. 51 is a flow chart showing an embodiment of a signal equalizing process in accordance with the fourth embodiment of the invention.

FIG. 51 is a flow chart showing a signal equalizing process in accordance with the fourth embodiment of the invention. In FIG. 51, as in S40 of FIG. 25, at S121 it is determined whether or not the signal is a training sequence. When the signal is a training sequence, at S122 it is stored in each input unit of the detection neural network. At S123, the characteristic detection neural network detects the real part and the imaginary part of the transfer function. The result is stored in the characteristic storage device. At S124, it is determined whether or not the predetermined data pieces are stored. When not stored, the steps at S122 or later are repeated.

When it is determined that the predetermined data pieces are stored at S124, the post-process neural network performs the post-process of the characteristics stored at S125 and obtains the characteristic values. Thereafter, at S126, the post-process neural network stores the characteristics in each input unit of the equalizing neural network. Thereafter, at S127 to S130, the received signal is equalized in the same manner as at S44 to S47 of FIG. 25.

Figure 52:
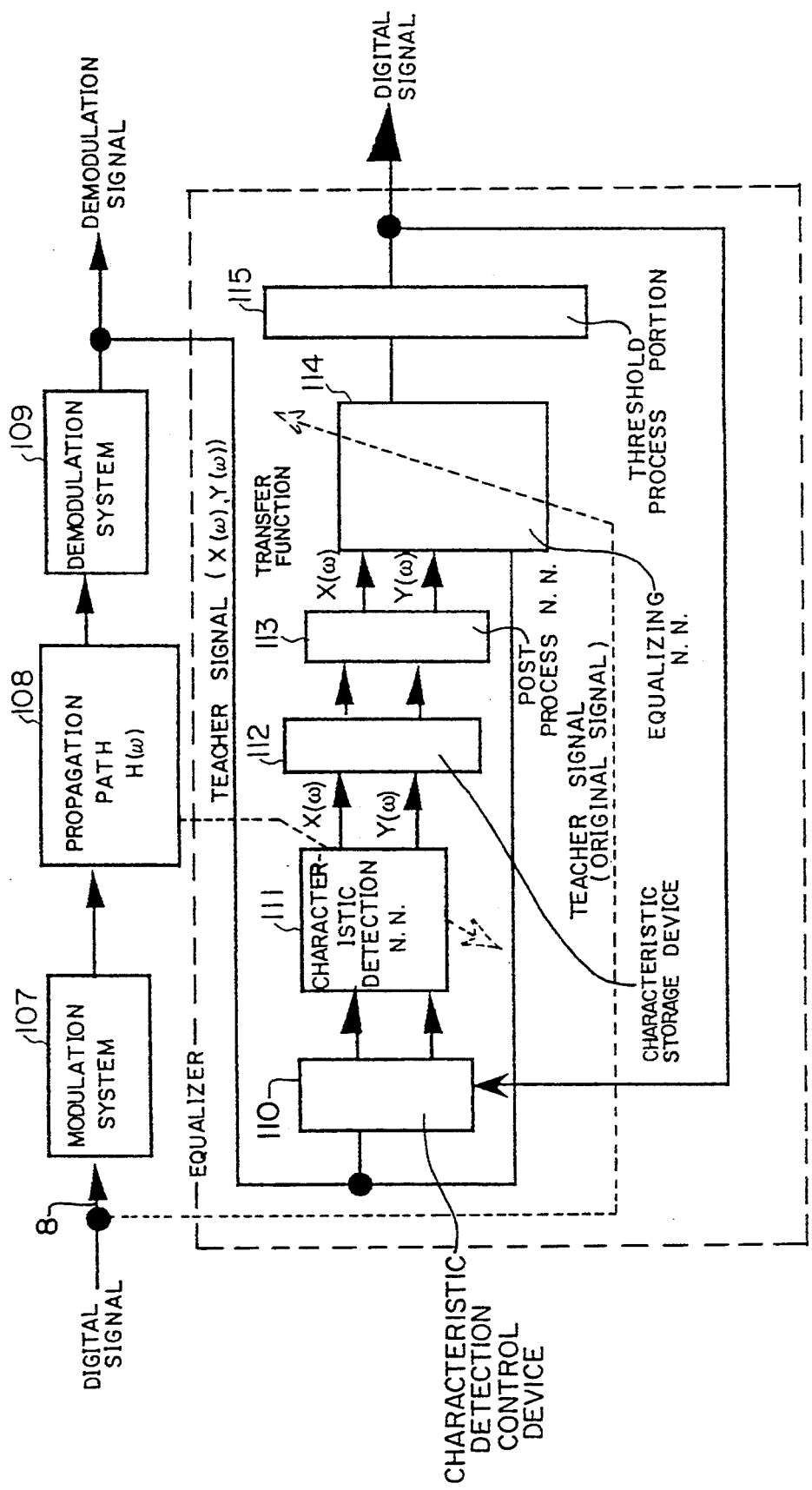
FIG. 52 is a block diagram showing the construction of an embodiment of a feedback type adaptive equalizer (No. 1)
Figure 53:
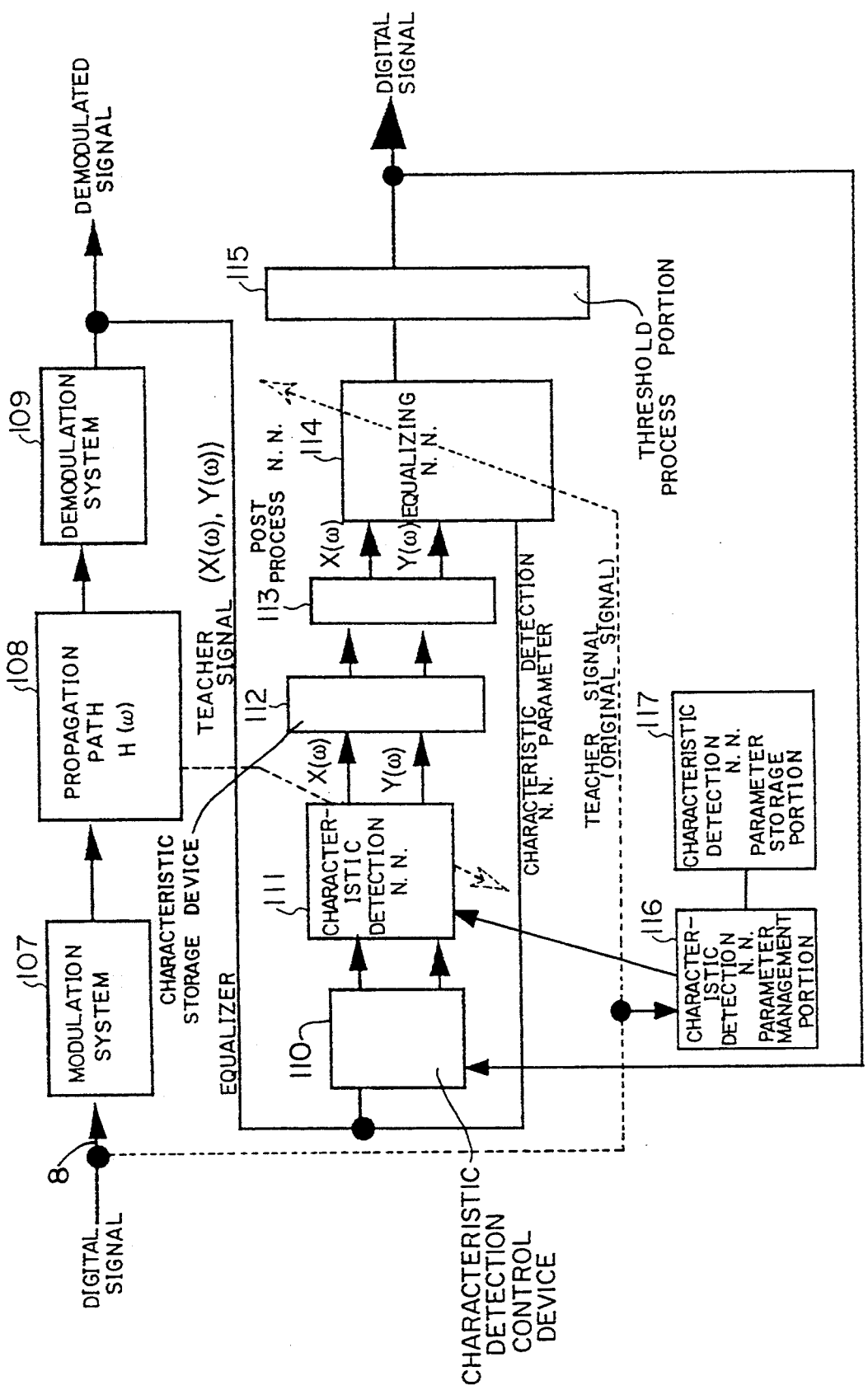
FIG. 53 is a block diagram showing the construction of an embodiment of a feedback type adaptive equalizer (No. 2)

FIGS. 52 and 53 are block diagrams of embodiments of feedback type adaptive equalizers. These feedback type adaptive equalizers continue to detect characteristics even after a signal corresponding to a training sequence is received. These feedback type adaptive equalizers of FIGS. 52 and 53 are of a construction in which input pattern generation portion of FIGS. 47 and 48 is substituted by the characteristic detection control device. The operation of the characteristic detection control devices of FIGS. 52 and 53 are the same as those of FIG. 28.

Figure 54:
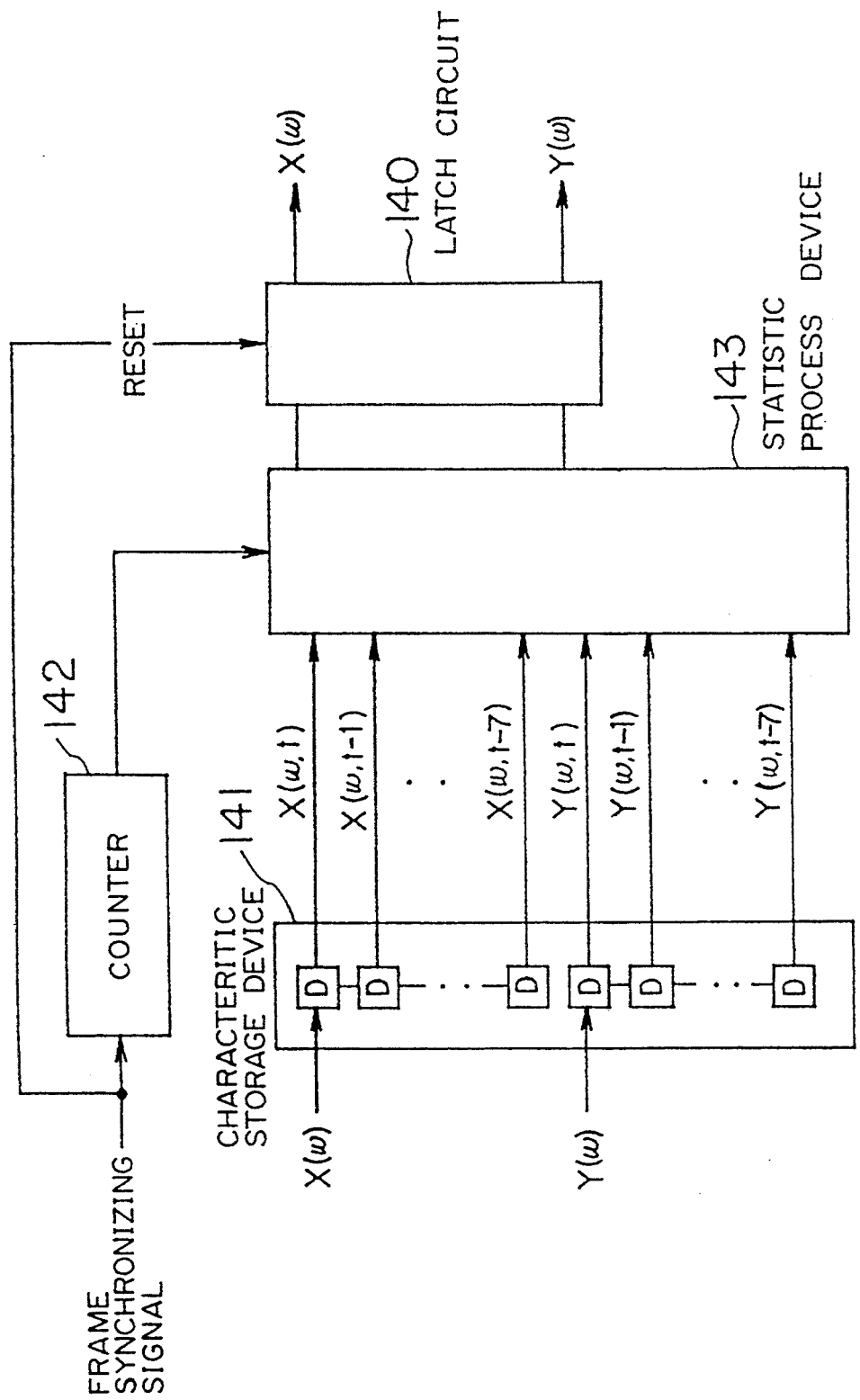
FIG. 54 is a block diagram showing the construction of a characteristic storage device and a statistical process device in accordance with the fourth embodiment of the invention.

FIG. 54 is a block diagram showing the construction of a characteristic storage device and a statistical process device in accordance with the fourth embodiment of the invention. In FIG. 54, a latch circuit 140 is reset with a frame synchronous signal. Thereafter, output data of the characteristic detection neural network, which is the real part and the imaginary part of the transfer function, is stored in a characteristic storage device 141. The characteristic storage device 141 is constructed of shift registers for storing eight detected results of the real part and the imaginary part of the transfer function. A counter 142 counts the period until these shift registers store the detected results of the characteristics. After the counter 142 has counted the period, it activates a statistical process device 143. The processed result of the statistical process is held in a latch circuit 140 and then outputted to the equalizing neural network.

The statistical process device performs the following statistical process represented by the following equations by using characteristic values $X(\omega, t-i)$ and $Y(\omega,$ t−i) which are outputted from the characteristic storage device. For example, when λ(t) is 1/n, simple mean values are obtained.

$$X(\omega) = \sum_{i=0}^{n} \lambda(t) X(\omega, t - i)$$

$$Y(\omega) = \sum_{i=0}^{n} \lambda(t) Y(\omega, t - i)$$

Figure 55:
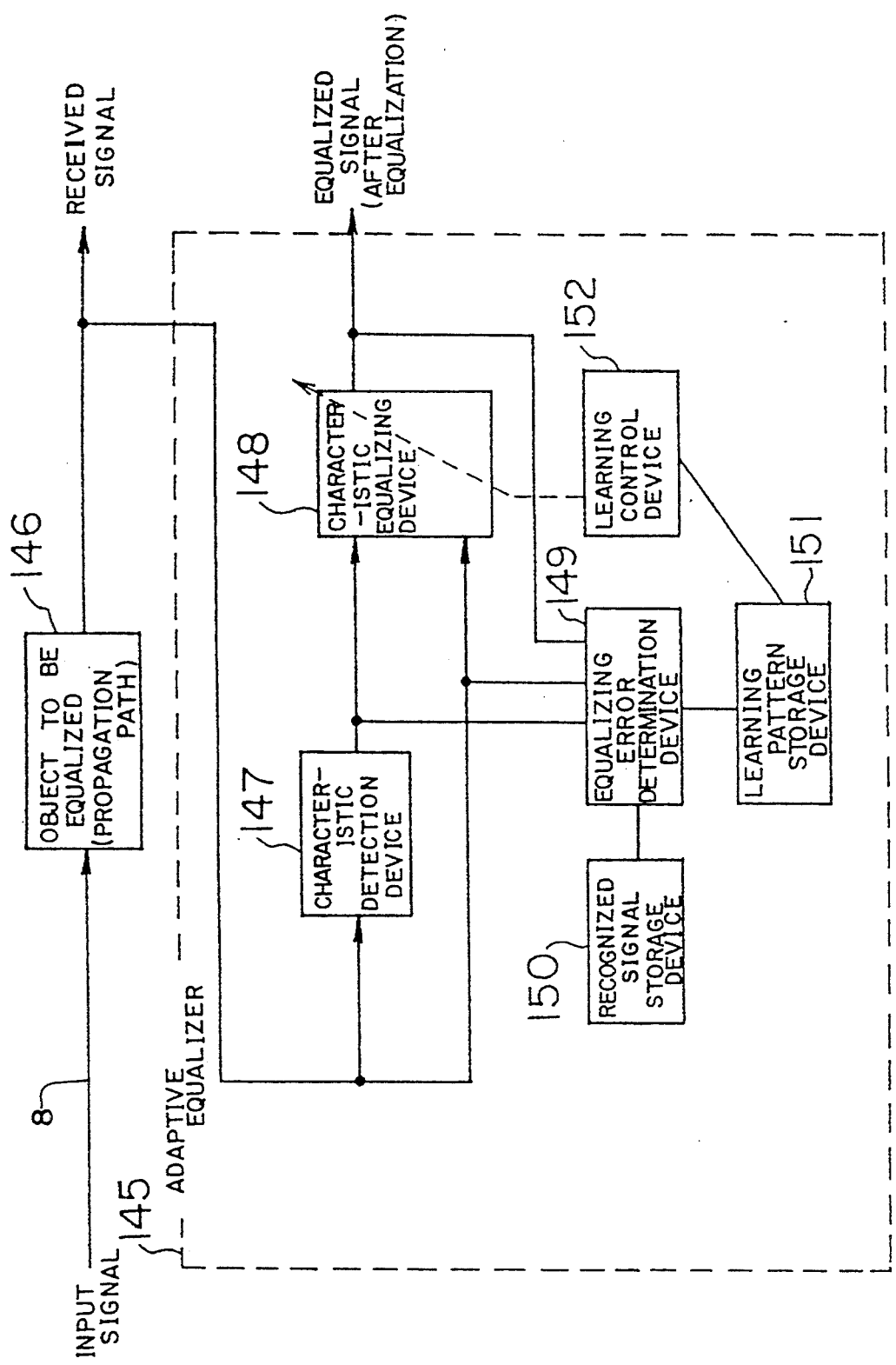
FIG. 55 is a block diagram showing the construction of an adaptive equalizer in accordance with the fifth embodiment of the invention.

FIG. 55 is a block diagram showing the construction of an adaptive equalizer in accordance with the fifth embodiment of the invention. In FIG. 55, an adaptive equalizer 145 comprises a characteristic detection device 147, an equalizing device 148, an equalizing error determination device 149, a recognition signal storage device 150, a learning pattern storage device 151, and a learning pattern control device 152. The characteristic detection device 147 is for detecting transfer characteristics, for example, transfer function H (ω), of an object to be equalized 146. The equalizing device 148 is for equalizing an output signal of the object to be equalized 146 by using the transfer function characteristics being detected. The equalizing error determination device 149 is for comparing a known input signal of the object to be equalized 146 with an output signal of the equalizing device 148 and for stabilizing the equalizing error. The recognition signal storage device 150 is for storing a known bit train of an input signal, for example a training sequence, which is used by the equalizing error determination device 149. The learning pattern storage device 151 is for storing an output signal of the object to be equalized 146 where the equalizing error determination device 149 determines an equalizing error, a detected result of the characteristic detection device 147, and a known signal of the object to be equalized 146, which is a correct output signal of the equalizing device 148, as a learning pattern. The learning control device 152 causes the equalizing device 148 to learn a learning pattern stored in the learning pattern storage device 151 where the transmission line is not used as the object to be equalized.

Figure 56:
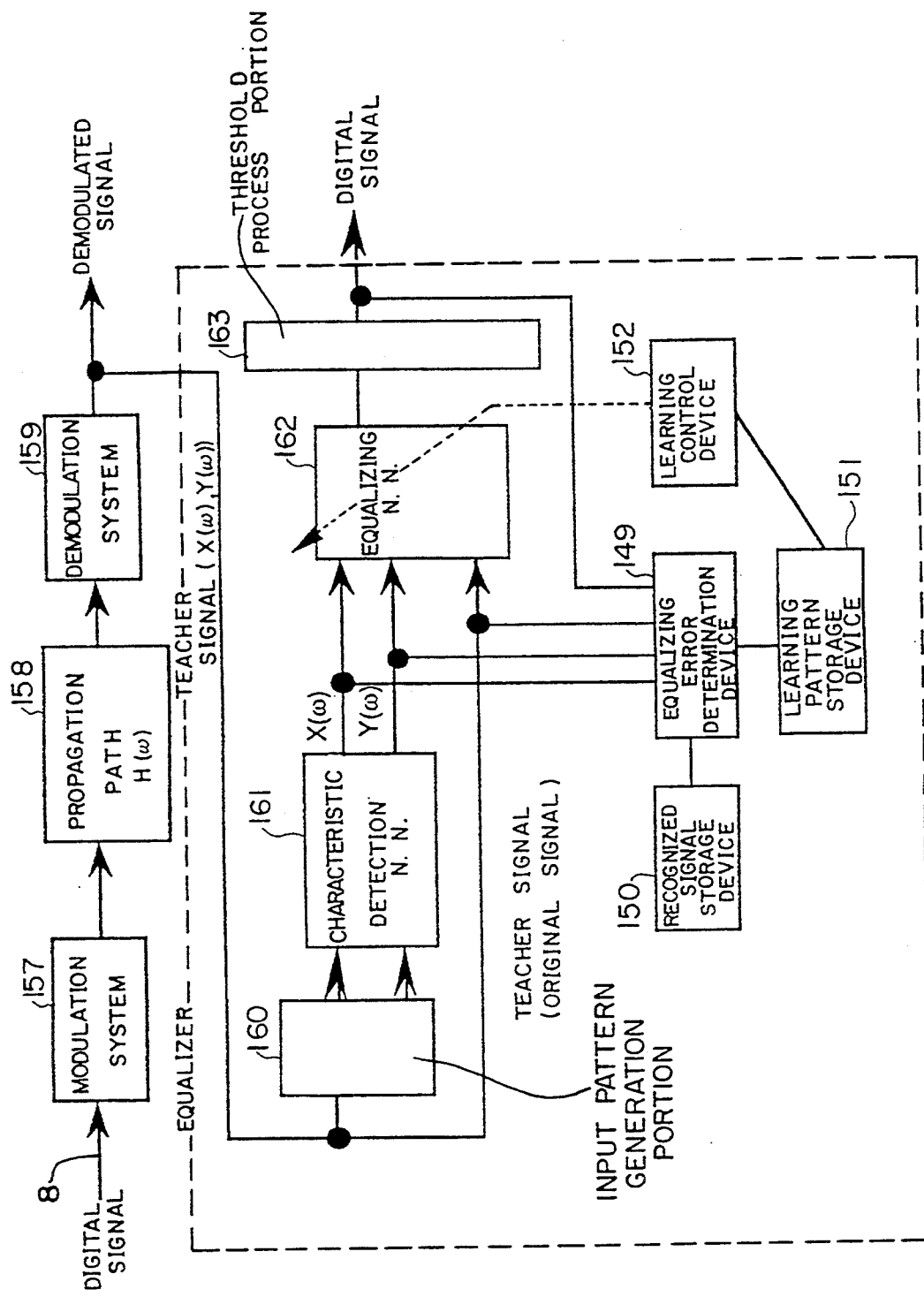
FIG. 56 is a block diagram showing the construction of an embodiment of the adaptive equalizer in accordance with the fifth embodiment of the invention.

FIG. 56 is a block diagram showing the construction of the adaptive equalizer in accordance with the fifth embodiment of the invention. The construction of the portions from the input pattern generation portion to the threshold process portion shown in FIG. 56 is the same as that shown in FIG. 7A. The difference between the fifth and first embodiments of the invention is described below.

The adaptive equalizer in accordance with the fifth embodiment of the invention shown in FIG. 56 compares a processed result of a threshold process portion 163 as an output signal of an equalizing neural network 162 with a training sequence, which is a recognition signal stored in a recognition signal storage device 150 and determines whether or not an equalizing error takes place. In other words, the adaptive equalizer determines whether or not the training sequences of the I and Q channels at any period are the same as the values of the equalized bit patterns of the I and Q channels, respectively. When at least one of these combinations is not satisfied, it is determined that an equalizing error has taken place.

FIG. 57 shows an example of determining an equalizing error. In FIG. 57, the values of the training sequences of the I and Q channels at any period are compared with the values of the equalized digital signals of the I and Q channels, respectively. When the values of the training sequence of the I and Q channels are equal to the values of the digital signals of the I and Q channels, respectively, "0", representing that the determined result is correct, is outputted. When at least one combination is not satisfied, as the determined result, "1" is outputted.

When an equalizing error is detected in a particular period, the equalizing error determination device 149 collects input values of the input units of the equalizing neural network 162, these values being the real part X (ω) and the imaginary part Y (ω) of the transfer function which are outputted from the characteristic detection neural network 161 and eight input values of each of the I and Q channels. In addition, the equalizing error determination device 149 stores the values of the bit patterns I and Q of the training sequence in the same period along with the above input values as a set to the learning pattern storage device 151. The bit patterns I and Q of the training sequence become teacher signals which are sent to the output units of the equalizing neural network.

FIG. 58 shows an example of a learning pattern generated by the determination of an equalizing error. This learning pattern is added as learning data of the equalizing neural network along with the learning data shown in FIGS. 24A and 24B. The learning pattern storage device 151 which has stored the learning data shown in FIGS. 24A and 24B causes the equalizing neural network 162 to learn during a non-busy period before the next packet is received.

Figure 59:
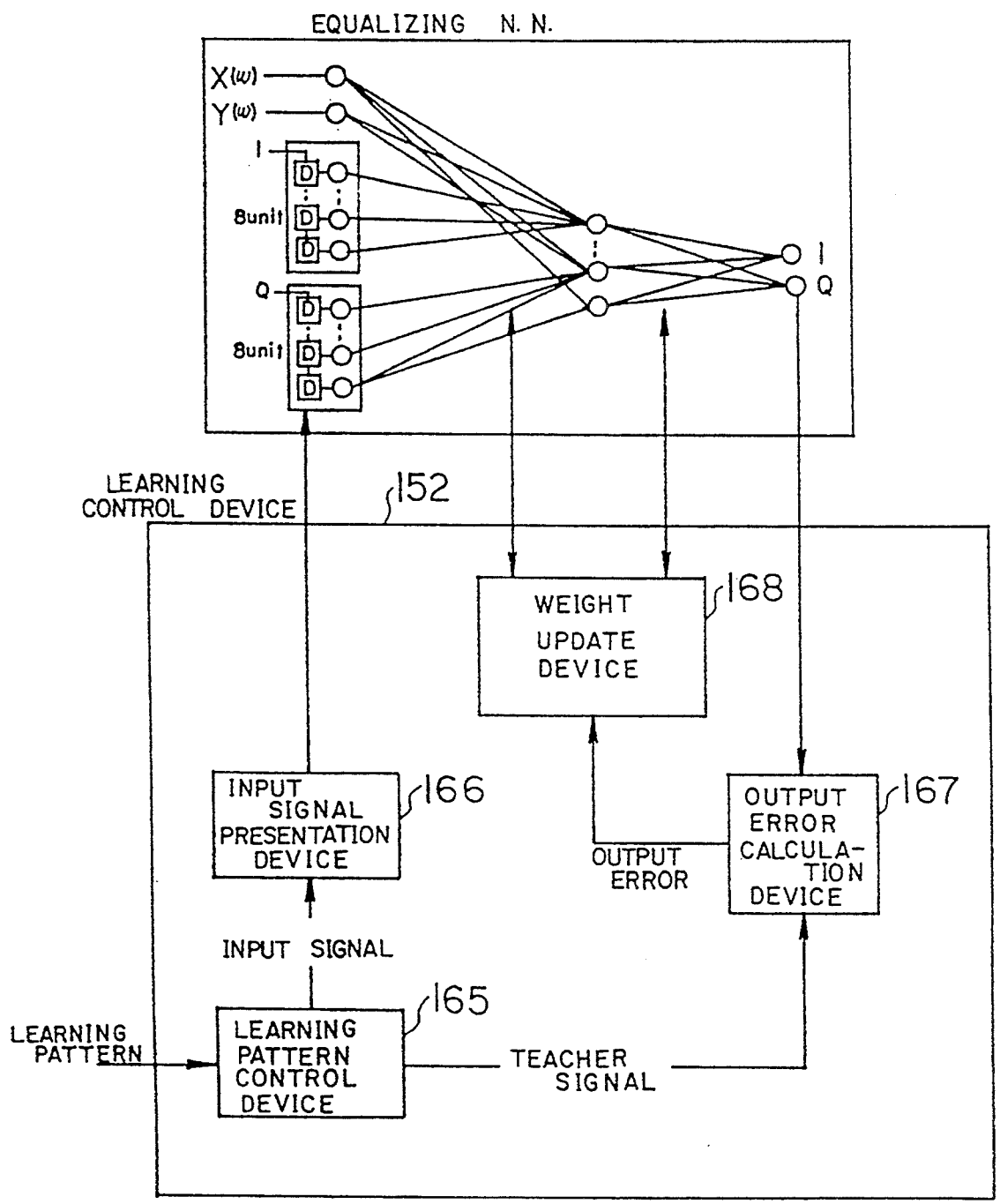
FIG. 59 is a block diagram showing the construction of an embodiment of the learning control device of FIG. 56.

FIG. 59 is a block diagram showing the construction of the learning control device of FIG. 56. In FIG. 59, a learning pattern control device 165 reads a learning pattern from a learning pattern storage device and divides it into an input signal and a teacher signal. An input signal presentation device 166 outputs an input signal supplied from a learning pattern control device 165 to each input unit of an equalizing neural network. The equalizing neural network executes a forward calculation in accordance with the input signal and then outputs the resultant signal to an output error calculation device 167. The output error calculation device 167 calculates an error between an output signal of the equalizing neural network and a teacher signal supplied from the learning pattern control device 165 and supplies the error to a weight update device 168. The weight update device 168 updates the weight of the internal linkage of the equalizing neural network by using for example a back-propagation method. This operation is repeated until the error between the teacher signal and the output signal of each learning pattern converges on a predetermined level or below.

Figure 60:
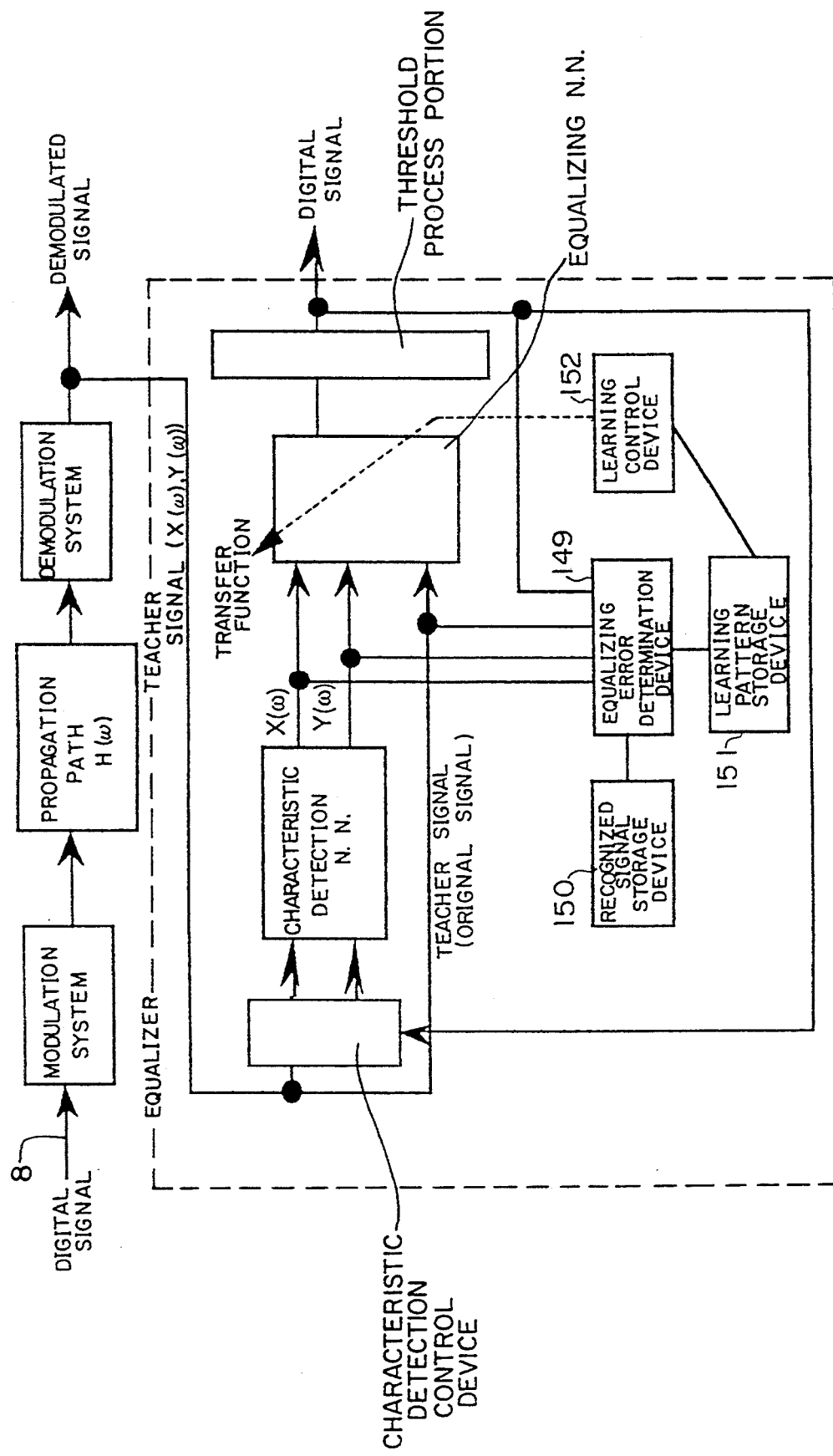
FIG. 60 is a block diagram showing the construction of an embodiment of a feedback type adaptive equalizer in accordance with the fifth embodiment of the invention.

FIG. 60 is a block diagram showing the construction of a feedback type adaptive equalizer in accordance with the fifth embodiment of the invention. The feedback type adaptive equalizer continues to detect characteristics after a signal corresponding to a training sequence is received. The construction of FIG. 60 is the same as that of FIG. 56 except that the feedback type adaptive equalizer of FIG. 60 is provided with a characteristic detection control device instead of an input pattern generation portion. The operation of the characteristic detection control device of FIG. 60 is the same as that of FIG. 45. In FIG. 60, learning patterns stored in the learning pattern storage device only relate to a training sequence since the equalized result of signals preceded by the training sequence cannot be determined.

Figure 61:
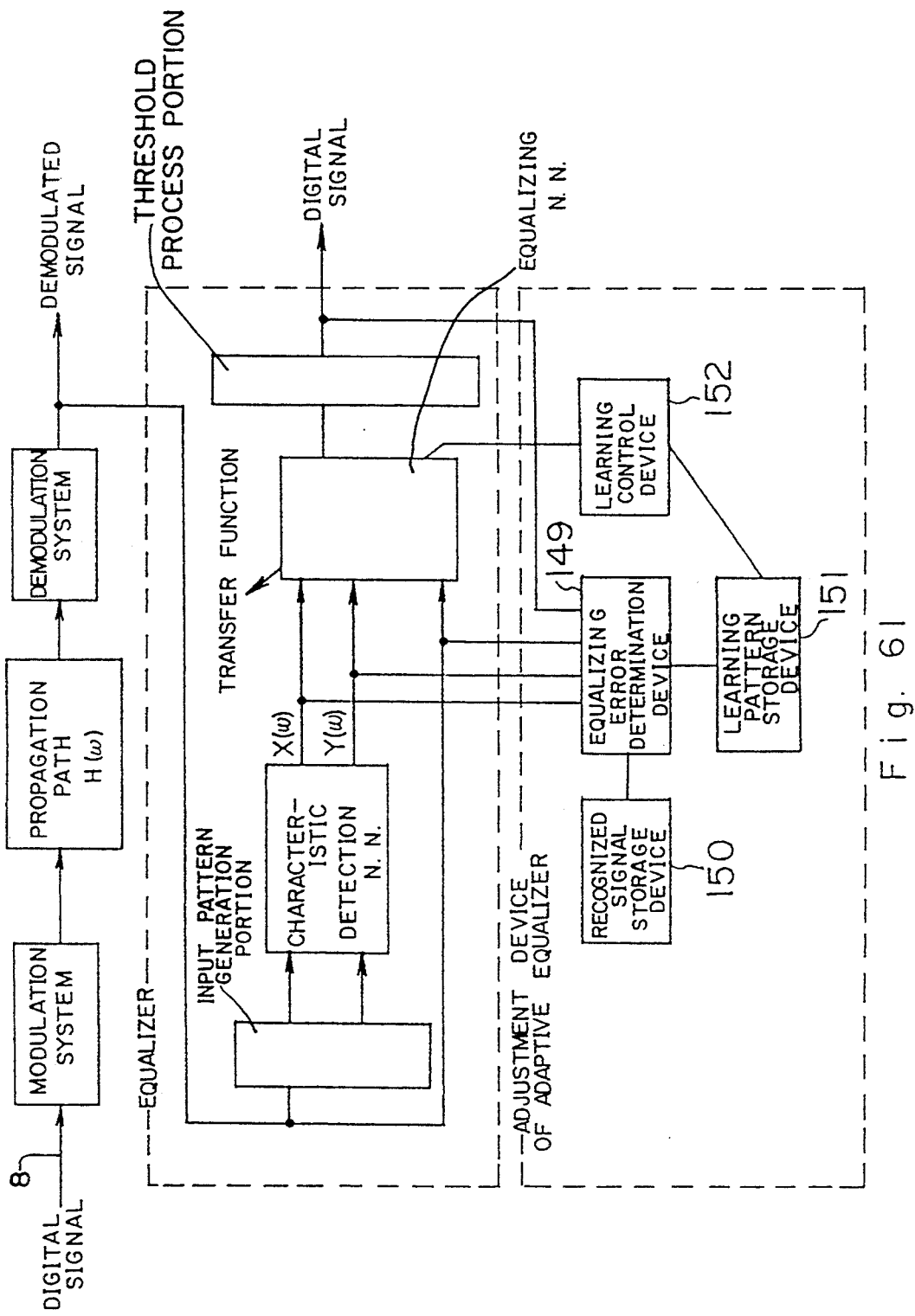
FIG. 61 is a block diagram showing the construction of an embodiment where an adjustment device of the adaptive equalizer is separately provided.

FIG. 61 is a block diagram showing the construction of an embodiment where an adjustment device of the adaptive equalizer is separately provided. Although the construction of FIG. 61 is the same as that of the embodiment of FIG. 56, the adjustment device which is constructed of an equalizing error determination device 149, a recognition signal storage device 150, a learning pattern storage device 151, and a learning control device 152 is separated from the adaptive equalizer. This adjustment device is connected to the adaptive equalizer.

In the first to fifth embodiments of the invention, neural networks are used as characteristic detection devices, equalizing devices, equalizing control devices, and post-process devices. However, it is possible to use other devices such as transversal type equalizers. Moreover, in the above embodiments, a hierarchical network is used as a neural network. However, it is also possible to use a network model having a recurrent linkage from a unit in an intermediate layer of the hierarchical network to a unit in the input layer thereof, namely, a recurrent network.

In these embodiments, values of the real part and the imaginary part of a transfer function are used as characteristics of a transmission line. However, it is possible to use other characteristic values such as an amplitude frequency characteristic or an envelope characteristic of a transfer function. In the case of a two-wave model, the amplitude frequency characteristic A ($\omega$) and the envelope characteristic D ($\omega$) are obtained from the following equations.

$$A(\omega) = A\{1 + \rho^2 + 2\rho \cos(\omega\tau - \phi)\} \quad (6)$$

$$D(\omega) = \frac{\rho\tau\{\rho + \cos(\omega\tau - \phi)\}}{1 + 2\rho\cos(\omega\tau - \phi) + \rho^2} \quad (7)$$

In this embodiment, it is assumed that the phase difference between a reflected wave and a direct wave is one symbol or less of a digital signal. To detect at least one symbol that precedes, data of two symbols is quadruply oversampled and inputted to an equalizing neural network or the like as data of 8 bits. However, by further increasing the number of bits, the present embodiment can be applied to large delay.

As described above, according to the present invention, by detecting for example a transfer function as transfer characteristics of a transmission system and by using the result, a signal can be equalized flexibly in accordance with periodic variation of transmission characteristics. Moreover, in accordance with a transfer function being detected, by outputting control signals as weight signals corresponding to output signals of a plurality of equalizing circuits, an equalizer having an adaptive equalizing function can be constructed. Furthermore, by using a neural network which can effectively learn with detection parameters in accordance with a bit pattern of a training sequence, an equalizer having a function for detecting transmission characteristics can be constructed. In addition, by causing an equalizing device to learn a learning pattern of received signals containing errors, transmission characteristics being detected and the relation between received signals and correct signals, the performance of the equalizer can be improved while the system is operating.

Thus, the present invention remarkably improves the transmission characteristics.

What is claimed is:

1. An adaptive equalizer to compensate for deterioration of an output signal from an object to be equalized, comprising:
   characteristic detection means for detecting a characteristic of the object to be equalized to compensate for deterioration by using a known input signal and a first output signal of the object to be equalized corresponding to the known input signal;
   equalizing means for equalizing a second output signal of the object to be equalized corresponding to an unknown input signal using the characteristic detected by said characteristic detection means and for outputting an equalized output signal corresponding to the second output signal from the object to be equalized; and
   a characteristic detection control device, operatively connected to the object to be equalized, said equalizing means and said characteristic detection means, for initially supplying the known input signal and the first output signal to said characteristic detection means while the known input signal is inputted to the object to be equalized and for subsequently supplying the equalized output signal from said equalizing means and the second output signal to said characteristic detection means when the unknown input signal is inputted to the object to be equalized, to successively detect characteristics.

2. An adaptive equalizer to compensate for deterioration of an output signal from an object to be equalized, comprising:
   characteristic detection means, formed of one of a neural network and a learning device, for detecting a characteristic of the object to be equalized to compensate for deterioration by using a known input signal and a first output signal of the object to be equalized corresponding to the known input signal and for obtaining a characteristic detecting function by learning predetermined data presented thereto; and
   equalizing means for equalizing a second output signal of the object to be equalized corresponding to an unknown input signal using the characteristic detected by said characteristic detection means.

3. The adaptive equalizer as set forth in claim 2, wherein said characteristic detection means detects one of a transfer function of the object to be equalized and values of a real part and an imaginary part of the transfer function.

4. The adaptive equalizer as set forth in claim 2, wherein said characteristic detection means detects values of an amplitude frequency characteristic and an envelope characteristic of a transfer function of the object to be equalized.

5. An adaptive equalizer to compensate for deterioration of an output signal from an object to be equalized, comprising:
   characteristic detection means for detecting a characteristic of the object to be equalized to compensate for deterioration by using a known input signal and a first output signal of the object to be equalized corresponding to the known input signal; and
   equalizing means, formed of one of a neural network and a learning device, for equalizing a second output signal of the object to be equalized corresponding to an unknown input signal using the characteristic detected by said characteristic detection means and for obtaining a characteristic detecting function by learning predetermined data presented thereto.

6. An adaptive equalizer to compensate for deterioration of an output signal from an object to be equalized, comprising:

characteristic detection means for detecting a characteristic of the object to be equalized to compensate for deterioration by using a known input signal and a first output signal of the object to be equalized corresponding to the known input signal;

equalizing control means for outputting at least one control signal to control equalization of a second output signal of the object to be equalized corresponding to an unknown input signal using the characteristic detected by said characteristic detection means;

equalizing means for equalizing the second output signal of the object to be equalized in accordance with the control signal output by said equalizing control means and for outputting an equalized output signal corresponding to the second output signal from the object to be equalized; and a characteristic detection control device, operatively connected to the object to be equalized, said equalizing means and said characteristic detection means, for initially supplying the known input signal and the first output signal to said characteristic detection means while the known input signal is inputted to the object to be equalized and for subsequently supplying the equalized output signal from said equalizing means and the second output signal to said characteristic detection means when the unknown input signal is inputted to the object to be equalized, to successively detect characteristics.

7. An adaptive equalizer to compensate for deterioration of an output signal from an object to be equalized, comprising:

characteristic detection means for detecting a characteristic of the object to be equalized to compensate for deterioration by using a known input signal and a first output signal of the object to be equalized corresponding to the known input signal;

equalizing control means for outputting a plurality of control signals providing weighting signals to control equalization of a second output signal of the object to be equalized corresponding to an unknown input signal, in accordance with the characteristic detected by said characteristic detection means; and equalizing means, including a plurality of equalizing circuits operatively connected to receive the control signals, respectively, from said equalizing control means, for equalizing the second output signal of the object to be equalized in accordance with the control signals output by said equalizing control means; and means for producing an equalized output signal by adding the outputs of the equalizing circuits after weighting according to the control signals from said equalizing control means.

8. An adaptive equalizer to compensate for deterioration of an output signal from an object to be equalized, comprising:

characteristic detection means, formed of one of a neural network and a learning device, for detecting a characteristic of the object to be equalized to compensate for deterioration by using a known input signal and a first output signal of the object to be equalized corresponding to the known input signal, and for obtaining a characteristic detecting function by learning predetermined data presented thereto;

equalizing control means for outputting at least one control signal to control equalization of a second output signal of the object to be equalized corresponding to an unknown input signal using the characteristic detected by said characteristic detection means; and equalizing means for equalizing the second output signal of the object to be equalized in accordance with the control signal output by said equalizing control means.

9. The adaptive equalizer as set forth in claim 8, wherein said characteristic detection means detects one of a transfer function of the object to be equalized and values of a real part and an imaginary part of the transfer function.

10. The adaptive equalizer as set forth in claim 8, wherein said characteristic detection means detects values of an amplitude frequency characteristic and an envelope characteristic of a transfer function of the object to be equalized.

11. An adaptive equalizer to compensate for deterioration of an output signal from an object to be equalized, comprising:

characteristic detection means for detecting a characteristic of the object to be equalized to compensate for deterioration by using a known input signal and a first output signal of the object to be equalized corresponding to the known input signal;

equalizing control means, formed of one of a neural network and a learning device, for outputting at least one control signal to control equalization of a second output signal of the object to be equalized corresponding to an unknown input signal using the characteristic detected by said characteristic detection means, and for obtaining a characteristic detecting function by learning predetermined data presented thereto; and equalizing means for equalizing the second output signal of the object to be equalized in accordance with the control signal output by said equalizing control means.

12. An adaptive equalizer to compensate for deterioration of an output signal from an object to be equalized, comprising:

characteristic detection means for detecting a characteristic of the object to be equalized to compensate for deterioration by using a known input signal and a first output signal of the object to be equalized corresponding to the known input signal;

equalizing control means for outputting at least one control signal to control equalization of a second output signal of the object to be equalized corresponding to an unknown input signal using the characteristic detected by said characteristic detection means; and equalizing means for equalizing the second output signal of the object to be equalized in accordance with the control signal output by said equalizing control means, said equalizing means a plurality of equalizing circuits, including one of a neural network and learning devices for performing the equalizing after learning predetermined data presented thereto.

13. An adaptive equalizer to compensate for deterioration of an output signal from an object to be equalized, comprising:
characteristic detection means for detecting a characteristic of the object to be equalized to compensate for deterioration from a first output signal of the object to be equalized corresponding to a known input signal by using a detection parameter corresponding to a signal pattern of the known input signal;
equalizing means for equalizing a second output signal of the object to be equalized corresponding to an unknown input signal using the characteristic detected by said characteristic detection means and for outputting an equalized output signal corresponding to the second output signal from the object to be equalized; and
a characteristic detection control device, operatively connected to the object to be equalized, said equalizing means and said characteristic detection means, for initially supplying the known input signal and the first output signal to said characteristic detection means while the known input signal is inputted to the object to be equalized and for subsequently supplying the equalized output signal from said equalizing means and the second output signal to said characteristic detection means when the unknown input signal is inputted to the object to be equalized, to successively detect characteristics.

14. An adaptive equalizer to compensate for deterioration of an output signal from an object to be equalized, comprising:
characteristic detection means, formed of one of a neural network and a learning device, for detecting a characteristic of the object to be equalized to compensate for deterioration from a first output signal of the object to be equalized corresponding to a known input signal by using a detection parameter corresponding to a signal pattern of the known input signal and for obtaining a characteristic detecting function by learning predetermined data presented thereto; and
equalizing means for equalizing a second output signal of the object to be equalized corresponding to an unknown input signal using the characteristic detected by said characteristic detection means.

15. The adaptive equalizer as set forth in claim 14, wherein said characteristic detection means detects one of a transfer function of said object to be equalized and values of a real part and an imaginary part of the transfer function.

16. The adaptive equalizer as set forth in claim 14, wherein said characteristic detection means detects values of an amplitude frequency characteristic and an envelope characteristic of a transfer function of the object to be equalized.

17. An adaptive equalizer to compensate for deterioration of an output signal from an object to be equalized, comprising:
characteristic detection means for detecting a characteristic of the object to be equalized to compensate for deterioration from a first output signal of the object to be equalized corresponding to a known input signal by using a detection parameter corresponding to a signal pattern of the known input signal; and
equalizing means, formed of one of a neural network and a learning device, for equalizing a second output signal of the object to be equalized corresponding to an unknown input signal using the characteristic detected by said characteristic detection means and for obtaining a characteristic detecting function by learning predetermined data presented thereto.

18. An adaptive equalizer to compensate for deterioration of an output signal from an object to be equalized, comprising:
characteristic detection means for detecting a characteristic of the object to be equalized to compensate for deterioration by using a known input signal and a first output signal of the object to be equalized corresponding to the known input signal;
post-process means for storing characteristics detected previously by said characteristic detection means and for modifying the characteristic presently detected by said characteristic detection means using the characteristics detected previously by said characteristic detection means to produce a modified result; and
equalizing means for equalizing a second output signal of the object to be equalized corresponding to an unknown input signal using the modified result of said post-process means.

19. The adaptive equalizer as set forth in claim 18,
wherein said equalizing means outputs an equalized output signal corresponding to the second output signal from the object to be equalized, and
wherein said adaptive equalizer further comprises a characteristic detection control device, operatively connected to the object to be equalized, said equalizing means and said characteristic detection means, for initially supplying the known input signal and the first output signal to said characteristic detection means while the known input signal is inputted to the object to be equalized and for subsequently supplying the equalized output signal from said equalizing means and the second output signal to said characteristic detection means when the unknown input signal is inputted to the object to be equalized, to successively detect characteristics.

20. The adaptive equalizer as set forth in claim 18, wherein said characteristic detection means detects the characteristic of the object to be equalized using a detection parameter in accordance with a signal pattern of the known input signal.

21. The adaptive equalizer as set forth in claim 18, wherein said characteristic detection means is one of a neural network and a learning device for obtaining a characteristic detecting function by learning predetermined data presented thereto.

22. The adaptive equalizer as set forth in claim 18, wherein said equalizing means is one of a neural network and a learning device for obtaining an equalizing function by learning predetermined data presented thereto.

23. The adaptive equalizer as set forth in claim 18, wherein said post-process means is a statistical process device.

24. The adaptive equalizer as set forth in claim 18, wherein said post-process means is one of a neural network and a learning device for obtaining a post-process function by learning predetermined data presented thereto.

25. The adaptive equalizer as set forth in claim 18, wherein said characteristic detection means detects one of a transfer function of the object to be equalized and values of a real part and an imaginary part of the transfer function.

26. The adaptive equalizer as set forth in claim 18, wherein said characteristic detection means detects values of an amplitude frequency characteristic and an envelope characteristic of a transfer function of the object to be equalized.

27. An adaptive equalizer to compensate for deterioration of an output signal from an object to be equalized, comprising:

characteristic detection means for detecting a characteristic of the object to be equalized to compensate for deterioration by using a known input signal and a first output signal of the object to be equalized corresponding to the known input signal;

equalizing means for equalizing a second output signal of the object to be equalized corresponding to an unknown input signal using the characteristic detected by said characteristic detection means and for outputting first and second equalized output signals respectively corresponding to the first and second output signals;

equalizing error detection and learning pattern storage means for detecting an equalizing error between the known input signal and the first equalized output signal and for storing the known input signal as a correct output signal, the first equalized output signal and the characteristic detected by said characteristic detection means, to provide a learning pattern when the equalizing error is detected; and learning control means for allowing said equalizing means to learn using the learning pattern when the object to be equalized is not outputting a signal.

28. The adaptive equalizer as set forth in claim 27, wherein said adaptive equalizer comprises an adjustment device, including a characteristic detection device forming said characteristic detection means;

an equalizing device forming said equalizing means;

a recognition signal storage device, an equalizing error determination device, and a learning pattern storage device forming said equalizing error detection and learning pattern storage means; and a learning control device forming said learning control means.

29. The adaptive equalizer as set forth in claim 27, wherein said adaptive equalizer further comprises a characteristic detection control device, operatively connected to the object to be equalized, said equalizing means and said characteristic detection means, for initially supplying the known input signal and the first output signal to said characteristic detection means while the known input signal is inputted to the object to be equalized and for subsequently supplying the second equalized output signal from said equalizing means and the second output signal to said characteristic detection means when the unknown input signal is inputted to the object to be equalized, to successively detect characteristics.

30. The adaptive equalizer as set forth in claim 27, wherein said characteristic detection means is one of a neural network and a learning device for obtaining a characteristic detecting function by learning predetermined data presented thereto.

31. The adaptive equalizer as set forth in claim 27, wherein said equalizing means is one of a neural network and a learning device for obtaining a characteristic detecting function by learning predetermined data presented thereto.

32. The adaptive equalizer as set forth in claim 27, wherein said characteristic detection means detects one of a transfer function of the object to be equalized and values of a real part and an imaginary part of the transfer function.

33. The adaptive equalizer as set forth in claim 27, wherein said characteristic detection means detects values of an amplitude frequency characteristic and an envelope characteristic of a transfer function of the object to be equalized.

* * * * *